United States Patent [19]

Mimura

[11] Patent Number: 5,740,309
[45] Date of Patent: Apr. 14, 1998

[54] RECORDING SIGNAL CONTROL APPARATUS CAPABLE OF OPTIMIZING RECORDING CONDITIONS FOR MAGNETIC RECORDING MEDIUM

[75] Inventor: Yoshiaki Mimura, Nagaokakyo, Japan

[73] Assignee: Mitsubishi Denki Kabushiki Kaisha, Tokyo, Japan

[21] Appl. No.: 625,049

[22] Filed: Mar. 29, 1996

Related U.S. Application Data

[62] Division of Ser. No. 134,005, Oct. 12, 1993, Pat. No. 5,579,119.

[30] Foreign Application Priority Data

| Oct. 19, 1992 | [JP] | Japan | 4-279753 |
| Oct. 19, 1993 | [JP] | Japan | 5-260202 |

[51] Int. Cl.$^6$ .................. H04N 5/923; H04N 5/782
[52] U.S. Cl. .................. 386/93; 386/46
[58] Field of Search .................. 386/46, 93, 95, 386/113, 114; 360/25, 27, 31; H04N 5/76, 5/782, 5/923

[56] References Cited

U.S. PATENT DOCUMENTS

| 4,422,108 | 12/1983 | Sampei et al. | 360/65 |
| 4,611,253 | 9/1986 | Kamei et al. | 360/66 |
| 4,807,054 | 2/1989 | Sasaki et al. | 360/104 |
| 5,077,623 | 12/1991 | McSweeney | 360/31 |
| 5,083,211 | 1/1992 | Dugan et al. | 386/9 |
| 5,257,109 | 10/1993 | Minakawa | 386/21 |
| 5,296,929 | 3/1994 | Morimoto | 386/93 |
| 5,311,373 | 5/1994 | Mucabayashi et al. | 386/104 |

FOREIGN PATENT DOCUMENTS

| 0241227 | 10/1987 | European Pat. Off. |
| 241227 | 10/1987 | European Pat. Off. |
| 0393955 | 10/1990 | European Pat. Off. |
| 2933004 | 3/1980 | Germany |
| 62-222403 | 9/1987 | Japan |
| 2-187902 | 7/1990 | Japan |
| 467302 | 3/1992 | Japan |

OTHER PUBLICATIONS

Japanese article entitled "Nyuumon VTR (Introduction to VTR)" by Kotaro Yokokawa, Tokyo Electrical engineering University Press, pp. 74–79, published on Mar. 30, 1985, and English language translation thereof.
Patent Abstracts of Japan, vol. 16, No. 266 (P–1371), Jun. 16, 1992, & JP 4–67302.
Patent Abstracts of Japan, vol. 12, No. 90 (P–679) (2937), Mar. 24, 1988, & JP 62–222403.

Primary Examiner—Thai Tran
Assistant Examiner—Huy Nguyen

[57] ABSTRACT

A plurality of test signals of different frequencies are recorded on a magnetic recording medium while gradually increasing or decreasing recording current, and the variation of the level of each of the replayed test signals and the variation of the recording current are stored in a memory. From these variations, the amount of detail emphasis and/or the frequency characteristic of a recording equalizer and/or the recording current value for optimum recording of video signals are calculated and stored in another memory, and based on the thus stored optimum data for the magnetic recording medium displayed on display means, a detail emphasis circuit, a recording equalizer frequency correction circuit, and a recording current value setting circuit are controlled singly or in any combination thereof, thereby controlling one or any combination of three factors, i.e. the amount of detail emphasis that the detail emphasis circuit applies, the frequency characteristic of the recording equalizer, and the gain of a recording amplifier for FM signal recording.

36 Claims, 86 Drawing Sheets

Fig. 15

```
PLEASE SELECT RECORD TAPE No.
SELECT No. BY ▲ ▼ KEYS

No.   MAKER    TYPE(VHS/SVHS)
01    SCOTCH   XT        (SVHS)
02    MAXELL   XR        (SVHS)
03    TDK      XP        (SVHS)
04    VICTOR   XZ        (SVHS)
05    FUJI     DC        (SVHS)
06    SCOTCH   HG        (VHS)
07    SONY     V-BS      (VHS)
08    AXIA     DC HG     (VHS)
09    TDK      HIFI      (VHS)
10    PANASO   GT        (VHS)

DECIDE SELECTED TAPE BY ■ KEY
```

Fig. 16

SELECTED TAPE IS AS FOLLOWS

05 FUJI DC (SVHS)

PLEASE INSERT TAPE

RETURN TO ORIGINAL SCREEN AFTER CASSETTE LOADING

Fig. 18

```
PLEASE SELECT RECORD TAPE No.
SELECT No. BY ▲ ▼ KEYS

No.    MAKER     TYPE(VHS/SVHS)
21     SCOTCH    5527XTS    (SVHS)
22     MAXELL    XR-BS      (SVHS)
23     TDK       XP HIFI    (SVHS)
24     SONY      VXST-V     (SVHS)
25     FUJI      DC-PRO     (SVHS)
26     VICTOR    TOUGH HG   (VHS)
27     SONY      V-BS HG    (VHS)
28     AXIA      DC HIFI    (VHS)
29     TDK       HG         (VHS)
[3][0] [NO RELEVANT TAPE]

DECIDE SELECTED TAPE BY ■ KEY
```

Fig. 19

```
NO RELEVANT TAPE IS REGISTERED
    RECORD UNDER INITIAL SET CONDITION

PLEASE INSERT TAPE

RETURN TO ORIGINAL SCREEN AFTER CASSETTE
LOADING
```

Fig. 23

```
TAPE AFTER SIMULATION IS
REGISTERED IN No.30
───────────────────────────────────
No.   MAKER     TYPE(VHS/SVHS)
21    SCOTCH    5527XTS    (SVHS)
22    MAXELL    XR-BS      (SVHS)
23    TDK       XP HIFI    (SVHS)
24    SONY      VXST-V     (SVHS)
25    FUJI      DC-PRO     (SVHS)
26    VICTOR    TOUGH HG   (VHS)
27    SONY      V-BS HG    (VHS)
28    AXIA      DC HIFI    (VHS)
29    TDK       HG         (VHS)
30    ×××××     ×××××      (VHS)
───────────────────────────────────
```

Fig. 24

```
        PLEASE SELECT RECORD TAPE No.
        SELECT No. BY ▲ ▼ KEYS
       ─────────────────────────────────
       No.    MAKER      TYPE(VHS/SVHS)
       ─────────────────────────────────
       [0][1] [F][U][J][I]  [D][C]     ([S][V][H][S])
        0 2   SCOTCH     XT          (SVHS)
        0 3   MAXELL     XR          (SVHS)
        0 4   TDK        XP          (SVHS)
        0 5   VICTOR     XZ          (SVHS)
        0 6   SCOTCH     HG          (VHS)
        0 7   SONY       V-BS        (VHS)
        0 8   AXIA       DC HG       (VHS)
        0 9   TDK        HIFI        (VHS)
        1 0   PATASO     GT          (VHS)
       ─────────────────────────────────
        DECIDE SELECTED TAPE BY ■ KEY
```

Fig. 25

```
      PLEASE SELECT RECORD TAPE No.
      SELECT No. BY ▲ ▼ KEYS
    ─────────────────────────────────────
     No.    MAKER    TYPE(VHS/SVHS)
     [01]   [xxxxx]  [xxxxx]      [(SVH)]
     02     SCOTCH   XT           (SVHS)
     03     MAXELL   XR           (SVHS)
     04     TDK      XP           (SVHS)
     05     VICTOR   XZ           (SVHS)
     06     SCOTCH   HG           (VHS)
     07     SONY     V-BS         (VHS)
     08     AXIA     DC HG        (VHS)
     09     TDK      HIFI         (VHS)
     10     PANASO   GT           (VHS)
    ─────────────────────────────────────
      DECIDE SELECTED TAPE BY ■ KEY
```

Fig. 42(a) ROTARY MAGNETIC HEAD CHANGE-OVER TIMING

Fig. 42(b) RECORD/REPRODUCTION MODE

Fig. 42(c) O.R.C. RECORDING CURRENT

Fig. 42(d) REPRODUCTION LEVEL OF TEST SIGNAL f1

Fig. 42(e) REPRODUCTION LEVEL OF TEST SIGNAL f2

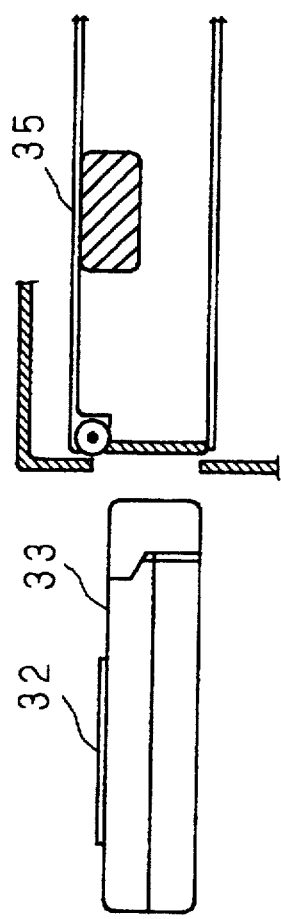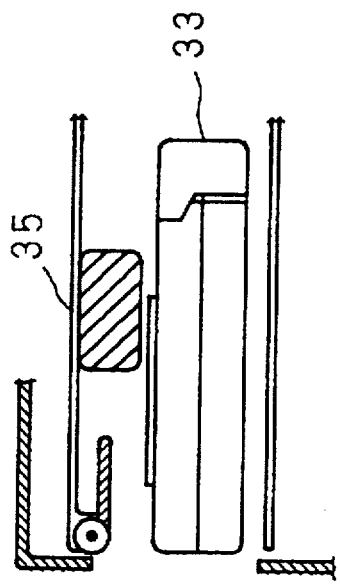
Fig. 50(a)
Fig. 50(b)

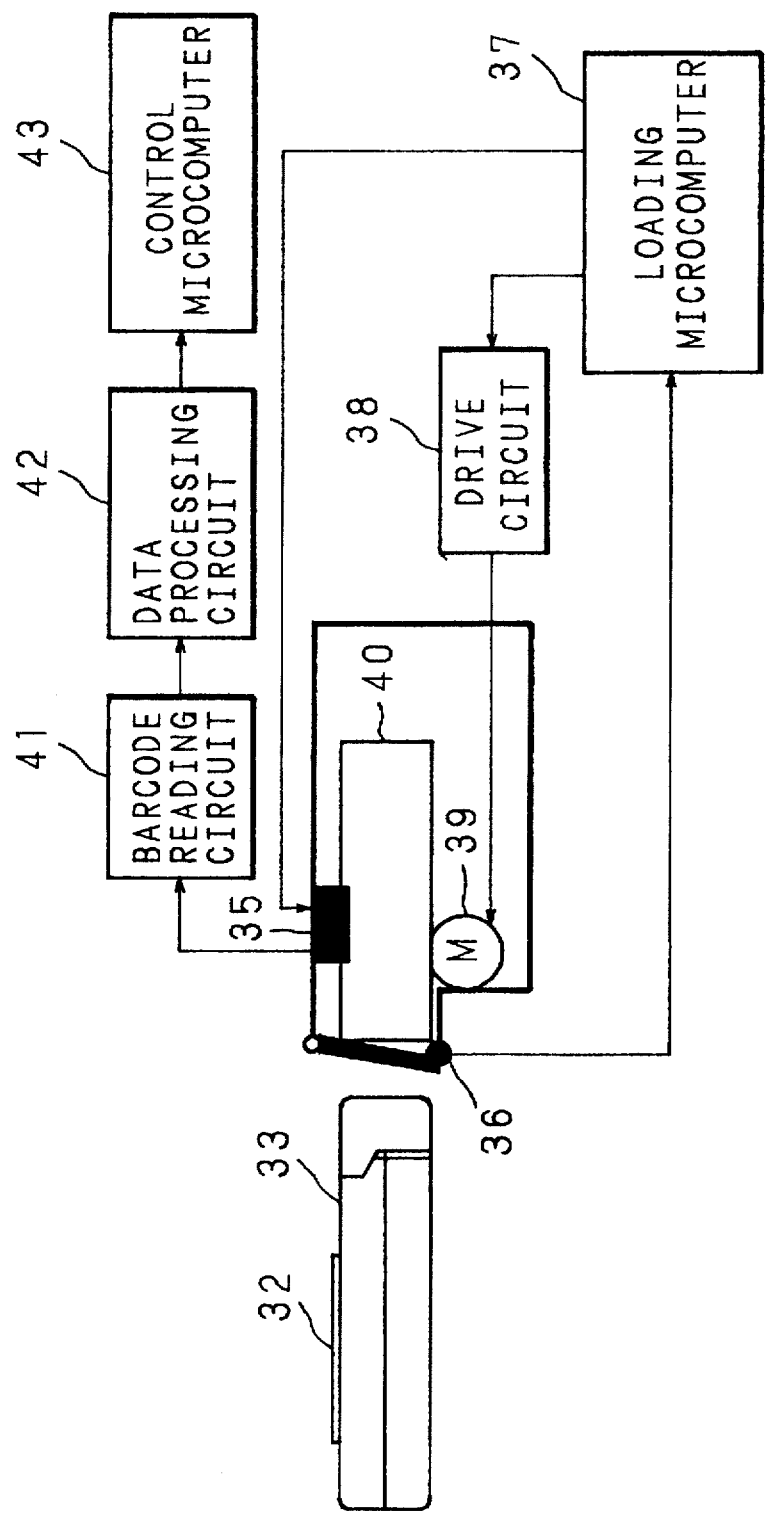

Fig. 78(a)

RECORDING TAPE IS AS FOLLOWS

05   FUJI    DC      (SVHS)

RECORDING SIGNAL CONTROL APPARATUS CAPABLE OF OPTIMIZING RECORDING CONDITIONS FOR MAGNETIC RECORDING MEDIUM

This application is a divisional of application Ser. No. 08/134,005, filed on Oct. 12, 1993, U.S. Pat. No. 5,579,119, the entire contents of which are hereby incorporated by reference.

BACKGROUND OF THE INVENTION

1. Field of the Invention

The present invention relates to a recording signal control apparatus capable of optimizing recording conditions for a magnetic recording medium, wherein when controlling signal recording conditions, for recording on a particular magnetic recording medium in a magnetic recording and reproduction apparatus, the characteristics of video signal recording and processing circuitry are controlled in such a manner as to match the performance of the magnetic recording medium.

2. Description of Related Art

Usually, in home video tape recorders (hereinafter called VTRs), recording current adjusting means is provided that controls the recording current fed to the recording head coils at an optimum value in order to obtain the maximum playback voltage, as described in "Nyuumon VTR (Introduction to VTR)" by Kotaro Yokokawa, Tokyo Electrical Engineering University Press, pp. 75–78. The recording current value necessary to obtain the maximum playback voltage, i.e., the optimum recording current value, is hereinafter abbreviated as O.R.C.

However, the O.R.C. value varies due to variations in the magnetic tape and head characteristics from one VTR to another. Furthermore, even in the same VTR, the O.R.C. value changes depending on the magnetic tape used, i.e., on the magnetic recording medium used. The O.R.C. value also varies as the characteristics of the magnetic tape and head vary with time. Moreover, depending on the characteristics of the magnetic tape used, the O.R.C. value varies with frequencies of recorded signals.

In a previously practiced method of setting the recording current characteristic, an average O.R.C. value is obtained by considering the various factors for the above variations as much as possible, and the thus obtained average O.R.C. value is applied indiscriminately for volume-produced VTRs. To overcome such a problem with the prior art, Japanese Patent Application Laid-Open No. 2-187902 (1990) discloses a recording current control apparatus such as shown in FIG. 1.

In FIG. 1, the reference numeral 59 designates a recording head for recording a signal for the detection of O.R.C., 9 represents a magnetic tape, and 60 and 65 indicate rotary transformers. Further, the numeral 61 denotes a recording amplifier, while 62 designates a gain switching controller for controlling the switching of the gain of the recording amplifier 61. The numeral 64 is a playback head gor playing back signals recorded on the magnetic tape 9, and the numeral 66 is a front-end playback amplifier for amplifying the playback signal played back by the playback head 64 and input via the rotary transformer 65. The numeral 67 is a detector for smoothing the playback signal amplified by the front-end playback amplifier 66, and converting it to a d.c. voltage. The numeral 63 is a comparison/decision unit for comparing the magnitudes of multiple d.c. voltages output from the detector 67 and, based on the result of the comparison, issuing an instruction to the gain switching controller 62 for gain setting. The gain switching controller 62 controls the gain of the recording amplifier 61 in accordance with the gain setting instruction given from the comparison/decision unit 63.

FIG. 2 is a characteristic diagram showing an example of a playback head output frequency (f) characteristic for each of tapes A and B having different characteristics. FIG. 3 is a characteristic diagram showing an example of a reproduced video signal frequency characteristic for each of the tapes A and B when video signals are recorded and played back using the tapes, A and B, having the video head output frequency characteristics shown in FIG. 2.

The operation of the above control apparatus will now be described. In recording, signals input to the recording amplifier 61 are amplified by the recording amplifier 61 and applied via the rotary transformer 60 to the recording head 59 for recording on the magnetic tape 9. Recording is performed with a plurality of recording currents of different values based on the instructions given from the gain switching controller 62. In playback, the signals recorded on the magnetic tape 9 are played back by the playback head 64 and supplied via the rotary transformer 65 to the front-end amplifier 66 for amplification. The playback signals amplified by the front-end amplifier 66 are fed to the detector 67 where the signals are smoothed. The plurality of signals smoothed by the detector 67 are input to the comparison/decision unit 63 where the magnitudes of the plurality of input signal voltages are compared to determine the O.R.C. value.

Conventional VTRs are designed to the lowest grade of magnetic tape to prevent magnetic reversion (which leads to recording errors) and secure a sufficient signal-to-noise ratio for any grade of magnetic tape. As a result, when a high-grade magnetic tape is used, the recorded picture is only excellent in the signal-to-noise ratio although such a tape could record finer details without degrading the signal-to-noise ratio.

Furthermore, with the recording current control apparatus of FIG. 1 having the configuration described above, the O.R.C. value can be accurately measured for each individual magnetic tape, but since the O.R.C. value is measured at a single predetermined frequency, no correction is made for the frequency characteristic of the magnetic tape. The sideband recording and reproduction levels of the frequency-modulated wave of the recorded and reproduced video signal vary depending on the characteristics of the various magnetic tapes, as shown in FIG. 2, causing such problems as variations in picture quality when the video signal is reproduced, as can be seen from the reproduced video frequency characteristics shown in FIG. 3.

Moreover, since the recording current control apparatus of the above configuration does not have means for storing magnetic tape characteristics measured, it is necessary to make the measurement over again even when using a magnetic tape of the same grade.

SUMMARY OF THE INVENTION

It is an object of the invention to provide a recording signal control apparatus capable of optimizing recording conditions for a magnetic recording medium, wherein for any grade of magnetic tape, the video signal can be recorded with the best characteristic that the magnetic tape can provide.

It is another object of the invention to provide a recording signal control apparatus capable of optimizing recording conditions for a magnetic recording medium, wherein despite variations in the performance from one recording medium to another, no variations are caused in the quality of picture reproduced from the recorded video signal.

It is a further object of the invention to provide a recording signal control apparatus capable of optimizing recording conditions for a magnetic recording medium, wherein characteristic data for various magnetic tapes are prestored and are used to control recording characteristics when recording video signals, thereby preventing the quality of picture reproduced from recorded video signals from varying due to variations in the performance from one magnetic recording medium to another.

It is a still further object of the invention to provide a recording signal control apparatus capable of optimizing recording conditions for a magnetic recording medium, wherein for a magnetic tape for which no data is prestored, test recording is done and the obtained data, concerning the kind and the characteristic of the magnetic tape, is stored in memory to eliminate the need to make the measurement over again in the future, thereby preventing the quality of picture reproduced from recorded video signals from varying from one kind of magnetic tape to another.

According to a recording signal control apparatus of the invention capable of optimizing recording conditions for a magnetic recording medium, a plurality of test signals of different frequencies are recorded on video tracks of a magnetic recording medium while Gradually increasing or decreasing the recording current value, and after recording for a predetermined length of time, the test signals are replayed and the varying levels of the test signals are the variation of the recording current are stored in a memory; from variations in these two factors, the amount of detail emphasis and/or the frequency characteristic of a recording equalizer and/or the recording current value for optimum recording of video signals are calculated and stored in another memory, and based on the thus stored optimum data for the magnetic recording medium displayed on display means, a detail emphasis circuit, a recording equalizer frequency correction circuit, and a recording current value setting circuit are controlled singly or in any combination thereof, thereby controlling one or other or any combination of three factors, i.e. the amount of detail emphasis that the detail emphasis circuit applies, the frequency characteristic of the recording equalizer, and the gain of a recording amplifier for FM signal recording.

According to another recording signal control apparatus of the invention capable of optimizing recording conditions for a magnetic recording medium, information indicating the kind of the magnetic tape is read into the VTR from the barcode or the like carried on the packaging of the tape cassette, and based on this information along with characteristic data of various magnetic tapes previously stored in memory, a detail emphasis circuit, a recording equalizer frequency correction circuit, and a recording current value setting circuit are controlled singly or in any combination thereof, thereby controlling one or other or any combination of three factors, i.e. the amount of detail emphasis that the detail emphasis circuit applies, the frequency characteristic of a recording equalizer, and the gain of a recording amplifier for FM signal recording.

Accordingly, whatever the performance of the magnetic performance, it is possible to prevent magnetic reversion and produce a picture of good signal-to-noise ratio.

The above and further objects and features of the invention will more fully be apparent from the following detailed description with accompanying drawings.

BRIEF DESCRIPTION OF THE DRAWINGS

FIG. 15 is a diagram for explaining a tape menu screen from which to select a magnetic tape for use;

FIG. 16 is a diagram showing a screen showing the tape selected from the tape menu;

FIG. 18 is a diagram for explaining a tape menu screen that is displayed when the magnetic tape selected for recording is not registered;

FIG. 19 is a diagram for explaining an example of a screen that is displayed when "NO RELEVANT TAPE" is selected;

FIG. 23 is a diagram for explaining an example of a screen showing a newly registered magnetic tape after tape simulation;

FIG. 24 is a diagram for explaining an example of a tape menu screen on which the last designated magnetic tape is displayed at the top of the menu;

FIG. 25 is a diagram for explaining an example of a tape menu screen on which the magnetic tape used for simulation is displayed at the top of the menu.

FIGS. 50(a) and 50(b) are diagrams showing how the magnetic tape cassette with a barcode attached thereon is inserted into a loading device in the VTR machine;

FIG. 51 is a diagram showing the configuration of a circuit for reading the barcode when the magnetic tape cassette is loaded into the machine;

FIGS. 78(a) and 78(b) are diagrams showing examples of a monitor screen display.

DESCRIPTION OF THE PREFERRED EMBODIMENTS

The preferred embodiments of the invention will now be described in detail with reference to the accompanying drawing.

Embodiment 1

Figure 1:
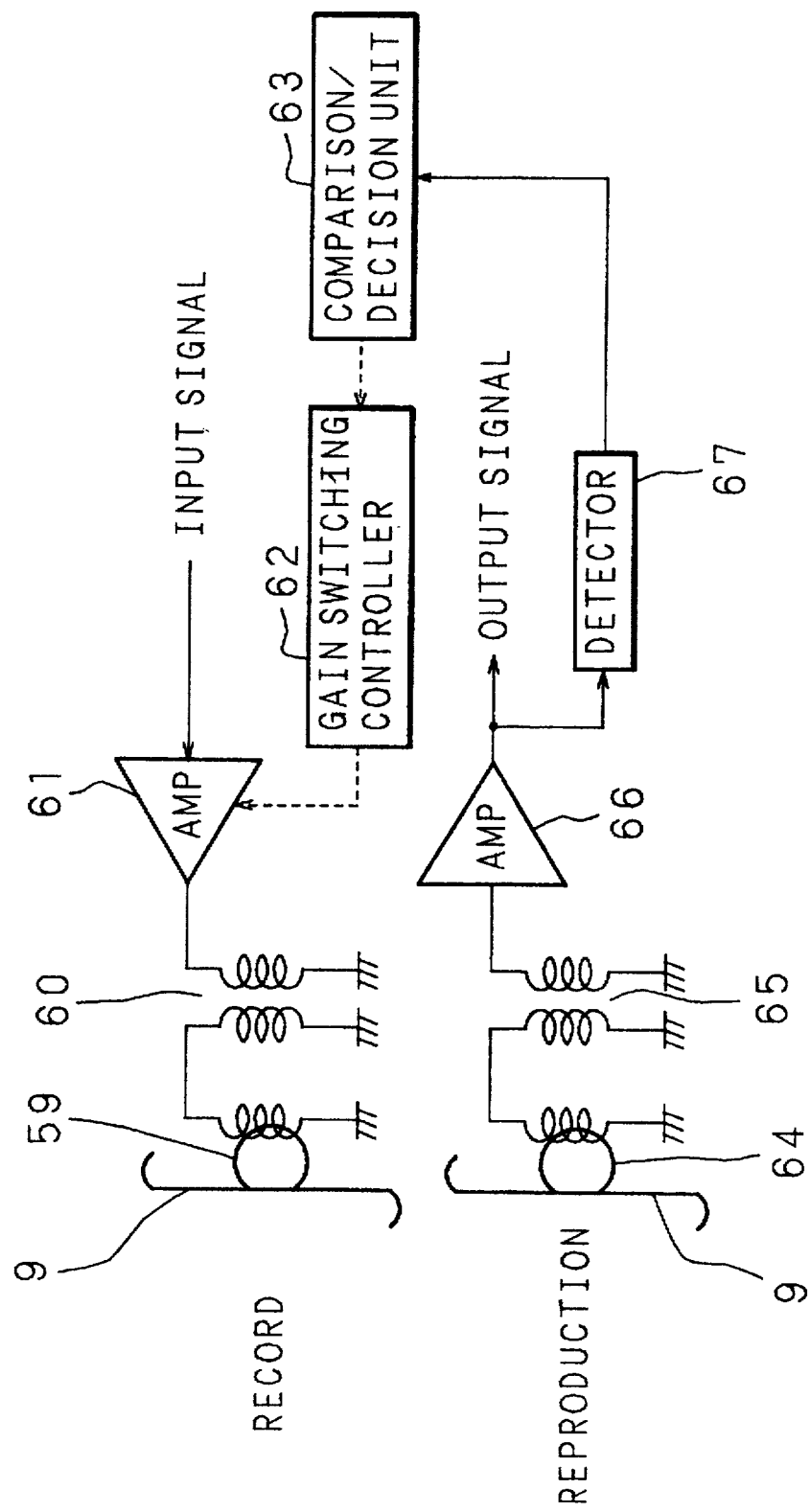
FIG. 1 is a block diagram showing the configuration of a prior art recording signal control apparatus.
Figure 4:
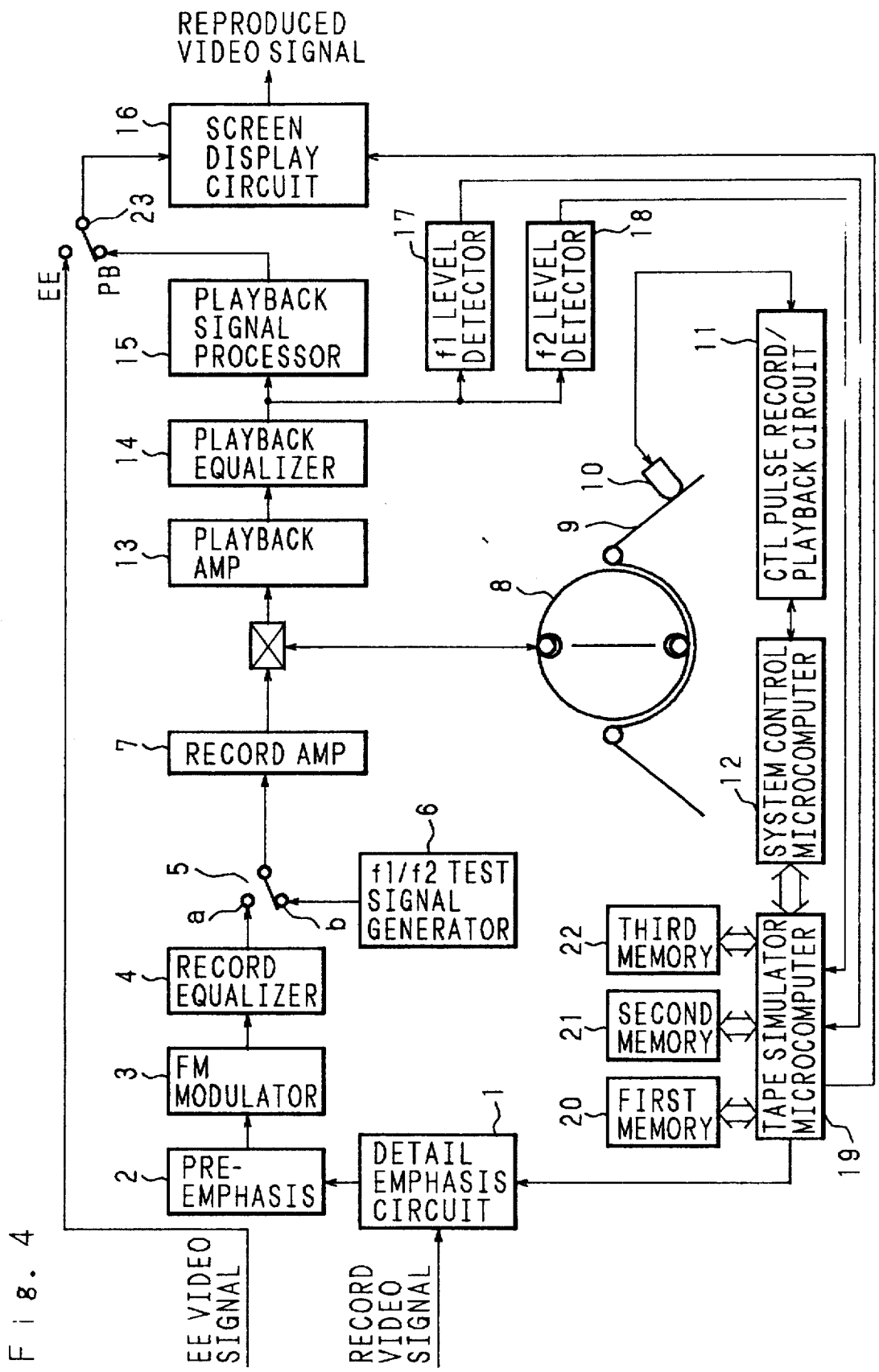
FIG. 4 is a block diagram showing the configuration of a recording signal control apparatus according to the present invention.

FIG. 4 is a block diagram showing the configuration of one embodiment of the invention. In FIG. 4, the same parts as those described in the prior art of FIG. 1 are designated by the same reference numerals. In FIG. 4, the reference numeral 1 designates a detail emphasis circuit that applies an optimum amount of emphasis to a video signal input for recording. The numeral 2 is a pre-emphasis circuit that applies recording pre-emphasis to an output signal of the detail emphasis circuit 1, and the numeral 3 is an FM modulator for frequency-modulating the output of the pre-emphasis circuit 2.

Furthermore, the numeral 4 is a recording equalizer for correcting the frequency characteristic of an output signal fed from the FM modulator 3, and the numeral 5 is a switch for switching its input between an output of the recording equalizer 4 and an output of an f1/f2 test signal generator 6. The f1/f2 test signal generator 6 generates test signals having two different frequency spectra, f1 and f2. Output signals from the f1/f2 test signal generator 6 are applied to a fixed terminal "b" of the switch 5. On the other hand, an output signal from the recording equalizer 4 is applied to a fixed terminal "a" of the switch 5. The switch 5 has a moving terminal which is set to contact one or other of the fixed terminals, "a" or "b", to select the output signal of the recording equalizer 4 or the output signal of the f1/f2 test signal generator 6 for input to a recording amplifier 7.

The recording amplifier 7 outputs a recording current which is fed to a rotating magnetic head 8. The rotating magnetic head 8 is used for recording and playback on a magnetic tape 9, a magnetic recording medium. The numeral 10 indicates a control head for recording and playing back an index signal and a control signal on the control track of the magnetic tape 9. The numeral 11 is a CTL pulse record/playback circuit that transmits signals to and from the control head 10, and the numeral 12 is a system control microcomputer that controls the entire operation of the VTR.

The numeral 13 is a playback amplifier for amplifying the playback signal read from the magnetic tape 9 by the magnetic head 8, the numeral 14 is a playback equalizer, and the numeral 15 is a playback signal processor which accepts the playback signal output from the playback equalizer 14 at its input and processes it to output a reproduced video signal. The numeral 23 indicates a switch whose input is switched between the EE video signal and the playback video signal output from the playback signal processor 15, to direct the selected signal to a screen display circuit 16. The screen display circuit 16 outputs character data at a video signal output.

The numeral 17 is an f1 level detector which accepts an output of the playback equalizer 14 at its input and detects the level of the f1 test signal of frequency f1 played back from the magnetic tape 9, and the numeral 18 is an f2 level detector which also accepts an output of the playback equalizer 14 and detects the level of the f2 test signal of frequency f2 played back from the magnetic tape 9. The numeral 19 designates a tape simulator microcomputer which stores the level detection results of the f1 level detector 17 and f2 level detector 18 into a third memory 22 and which controls the detail emphasis circuit 1 on the basis of the data stored in a second memory 21. The numeral 20 is a first memory for storing the manufacturer names and type names of magnetic tapes 9. The second memory 21 stores characteristic data such as frequency characteristics of the magnetic tapes 9, while the third memory 22 stores the level detection results fed from the f1 level detector 17 and f2 level detector 18.

Figure 2:
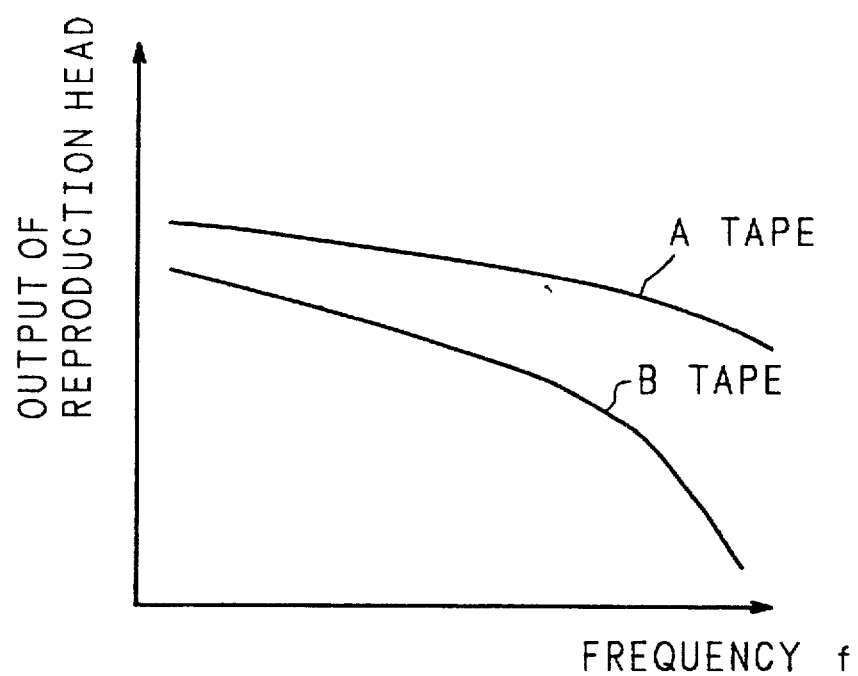
FIG. 2 is a characteristic diagram showing the difference in playback head output frequency characteristic between two magnetic tapes.
Figure 3:
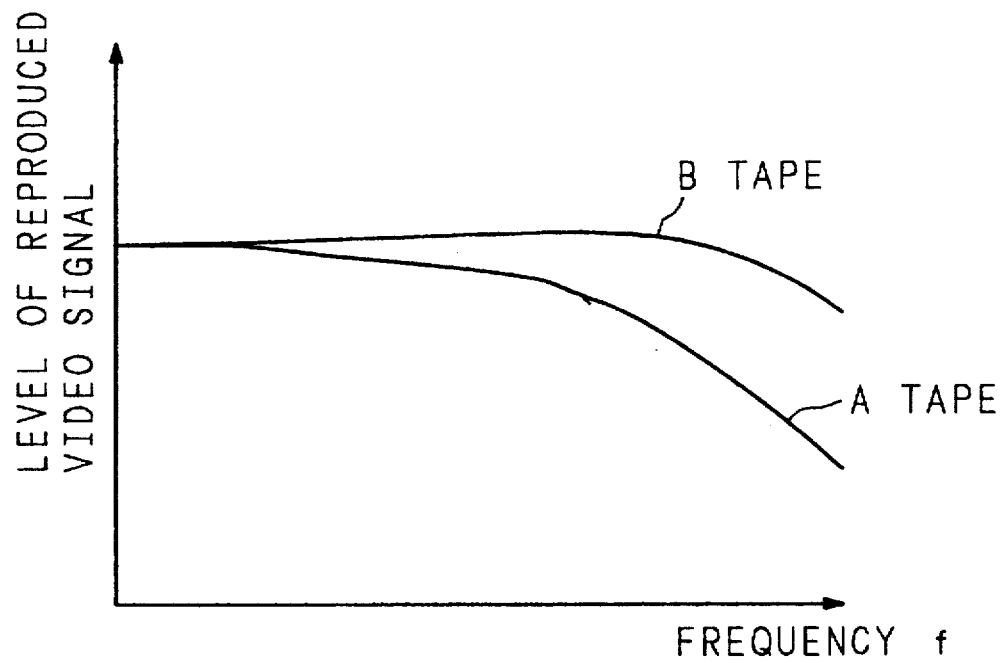
FIG. 3 is a characteristic diagram showing the difference in reproduced video frequency characteristic between the two magnetic tapes.
Figure 7:
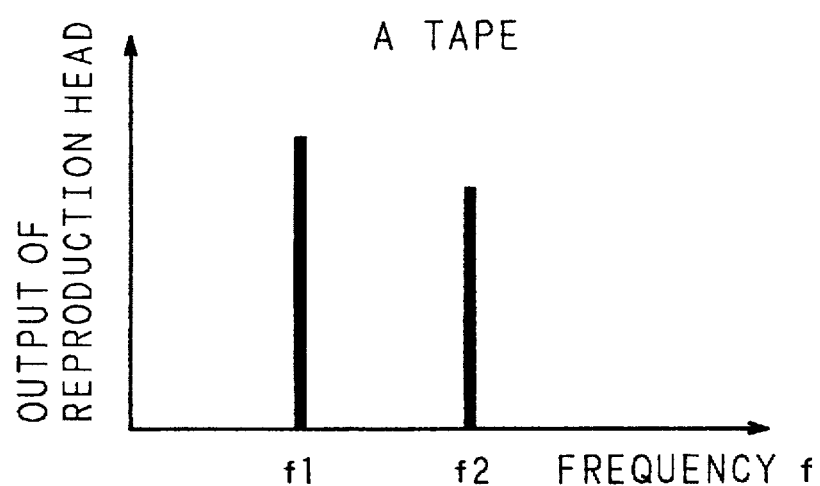
FIG. 7 is a diagram showing playback head output levels for a plurality of test signal spectra recorded on a magnetic tape.
Figure 8:
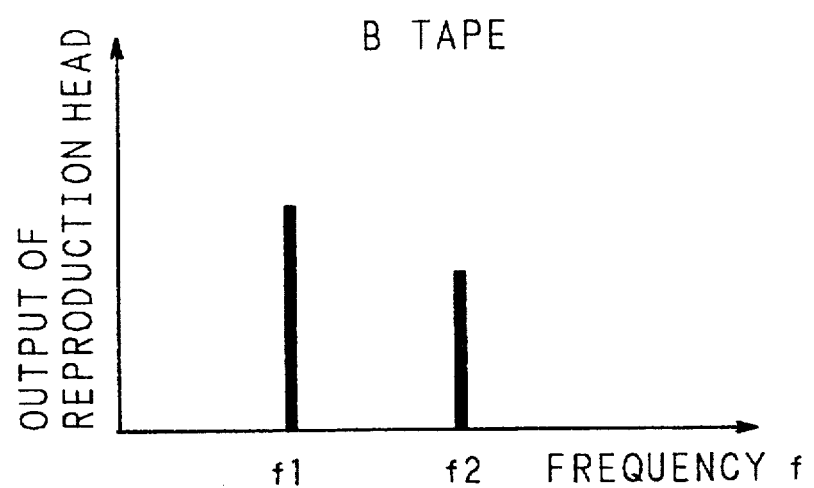
FIG. 8 is a diagram showing playback head output levels for a plurality of test signal spectra recorded on another magnetic tape.

FIG. 7 is a characteristic diagram showing as an example the output levels of the playback head (rotating magnetic head 8) for the f1 and f2 test signal spectra when the f1 and f2 test signals are recorded on and then played back from the tape A having the frequency characteristic shown in FIG. 2. Similarly, FIG. 8 shows as an example the output levels of the playback head for the f1 and f2 test signals recorded on and played back from the tape B.

Figure 9:
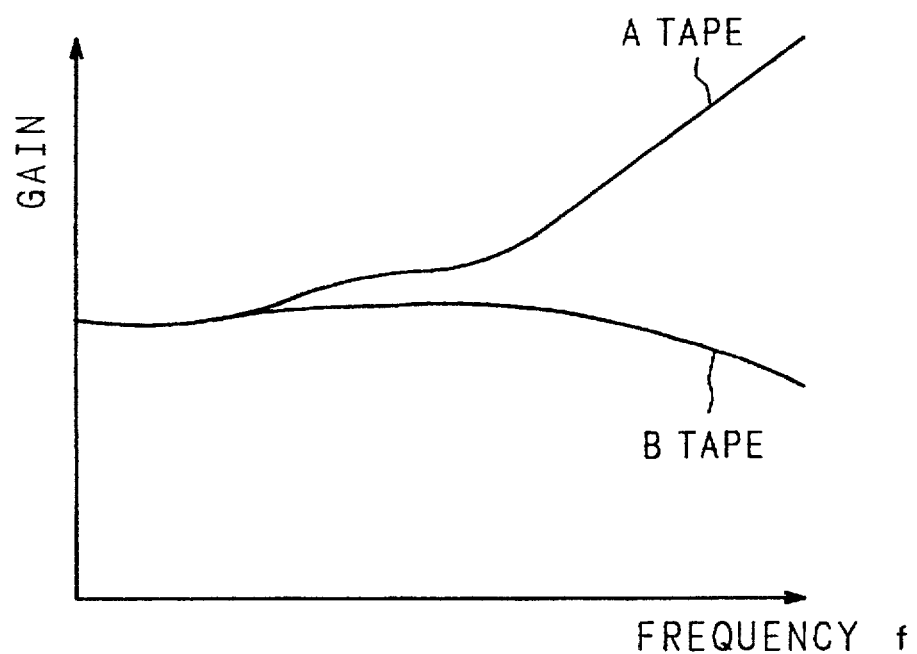
FIG. 9 is a characteristic diagram showing the difference in the frequency characteristic of a detail emphasis circuit between the two magnetic tapes.
Figure 10:
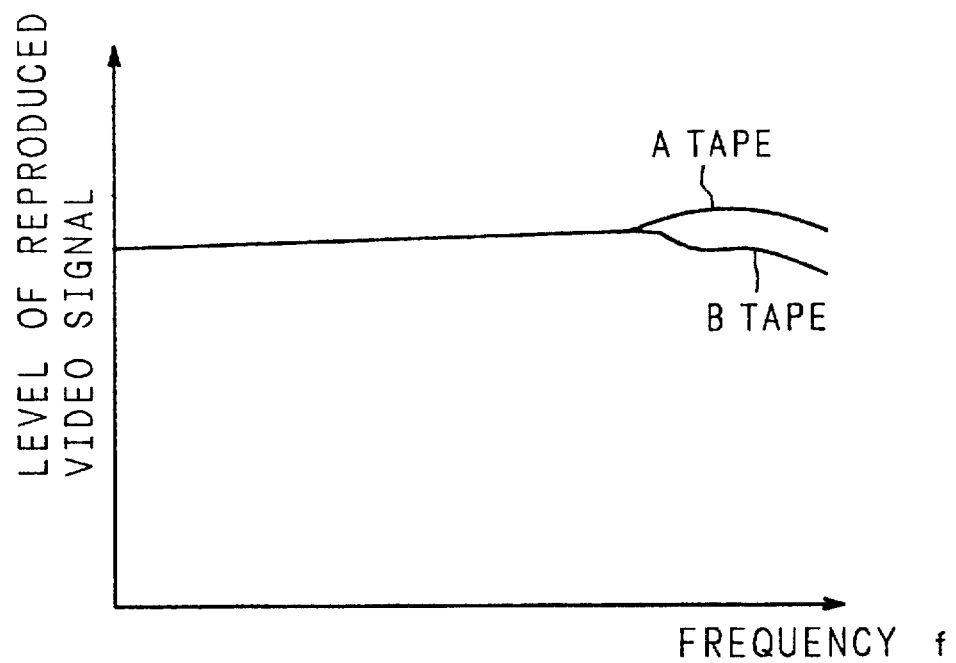
FIG. 10 is a characteristic diagram showing the difference in reproduced video frequency characteristic between the two magnetic tapes after correction by the detail emphasis circuit.

FIG. 9 shows the frequency characteristics of the tapes A and B having the above characteristics, after correction through the detail emphasis circuit 1 of the present invention. FIG. 10 shows the reproduced video signal frequency characteristics for the tapes A and B when video signals recorded with frequency characteristics corrected by the detail emphasis circuit 1 are played back from the respective tapes.

Figure 12:
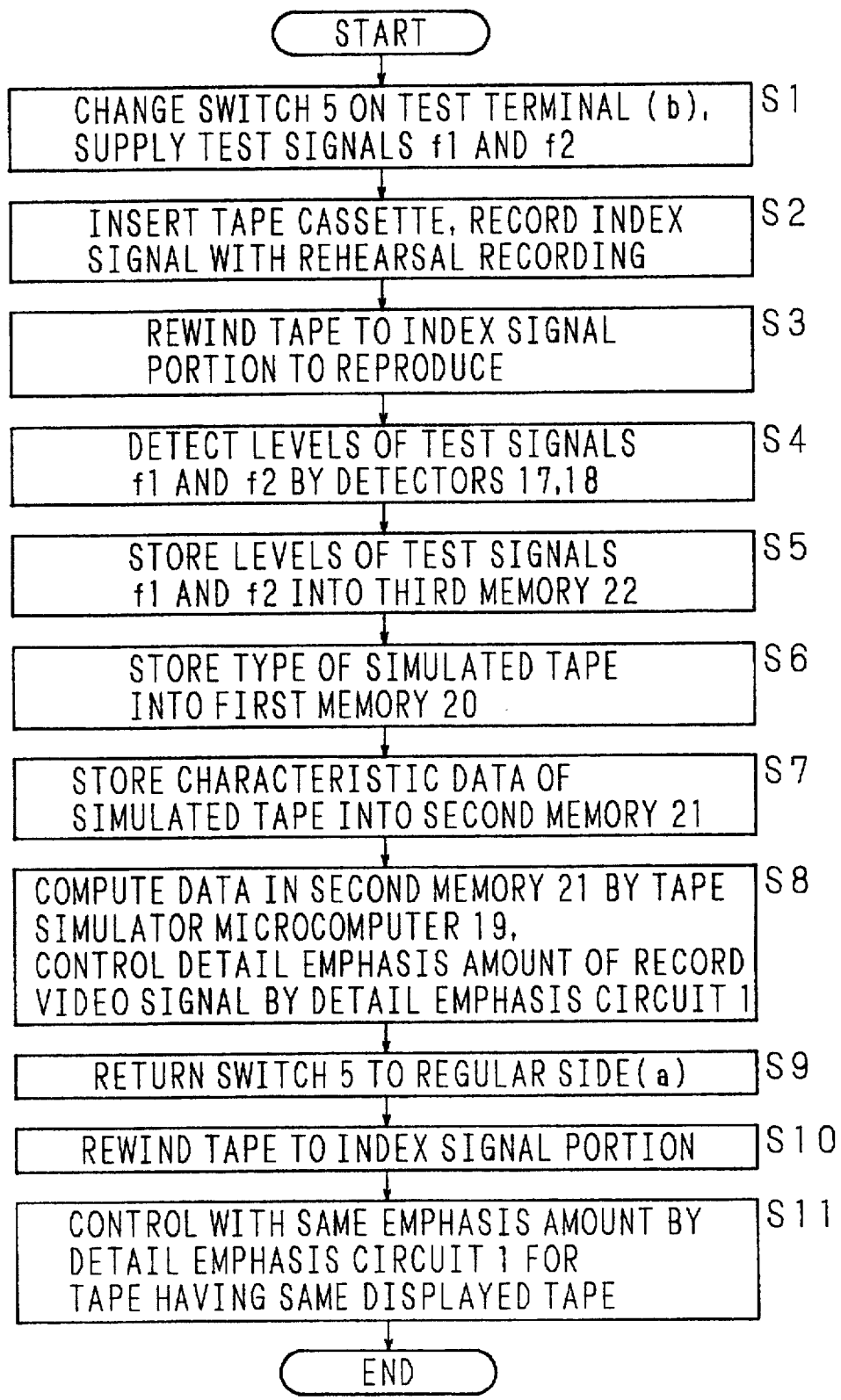
FIG. 12 is a flowchart illustrating a sequence of operations performed in the recording signal control apparatus of the present invention.

Next, the operation of this embodiment will be described below. Tuning buttons are provided on the front panel of the VTR machine not shown. Before recording, i.e., after a tape cassette has been loaded into the VTR, the user operates these tuning buttons in accordance with which a sequence of operations illustrated in the flowchart of FIG. 12 are performed under control of the tape simulator microcomputer 19 to detect the optimum recording conditions for the magnetic tape.

At the beginning of the test recording, the switch 5 is set by user operation so that the moving terminal of the switch 5 contacts the fixed terminal "b" to which the f1/f2 test signal generator 6 is coupled. This shuts off the recording equalizer signal, and instead, allows the f1 and f2 test signals from the f1/f2 test signal generator 6 to be supplied via the switch 5 and the recording amplifier 7 to the rotating head 8 (step S1) for recording on the magnetic tape 9. At a prescribed timing synchronized with the operation timing of the tape simulator microcomputer 19, an index signal is supplied to the control head 10 from the CTL pulse record/playback circuit 11 under the control of the system microcomputer 12, the index signal thus being recorded on the magnetic tape 9 (step S2).

After the f1 and f2 test signals have been recorded for a length of time necessary for the measurement of tape performance, the magnetic tape 9 is rewound to the position at which the index signal has been recorded, and then played back (step S3). The played back f1 and f2 test signals are amplified by the playback amplifier 13, and then fed to the playback equalizer 14 where signals having the f1 and f2 frequency spectra shown in FIG. 7 or 8 are extracted. The f1 test signal level is detected by the f1 level detector 17, and the f2 test signal level is detected by the f2 level detector 18 (step S4).

Information concerning the f1 and f2 test signal levels detected by the f1 level detector 17 and f2 level detector 18, respectively, is fed to the tape simulator microcomputer 19. The tape simulator microcomputer 19 then stores the detection level information into the third memory 22 (step S5). The tape simulator microcomputer 19 also stores the type name of the magnetic tape 9 into the first memory 20 (step S6) and the characteristic data of the same into the second memory 21 (step S7).

Using the characteristic data stored in the second memory 21, the tape simulator microcomputer 19 controls the detail emphasis circuit 1 to set the detail emphasis amount for the recording video signal at the optimum value (step S8). After the setting is complete, the moving terminal of the switch 5 is moved back to the fixed terminal "a" (step S8), and the tape is rewound to the index signal position, to complete the sequence of test recording operations (step S10). For any magnetic tape 9 of the same type name as displayed and set, incoming video signals are processed for detail emphasis by the detail emphasis circuit 1 with the emphasis amount set at the optimum value (step S11).

After detail emphasis, the video signal is subjected to recording pre-emphasis by the pre-emphasis circuit 2, followed by frequency modulation by the FM modulator 3 for conversion into an frequency-modulated wave.

The frequency-modulated wave is fed via the recording equalizer 4, switch 5, and recording amplifier 7 to the rotating magnetic head 8 for recording on the magnetic tape 9. At the same time, the EE video signal is directed via the switch 23 to the screen display circuit 16 from which the signal is output as a monitor signal.

Next, the operation in playback mode will be described. In playback, the moving terminal of the switch 23 is switched to the fixed terminal PB side. The playback signal played back from the magnetic tape 9 by the rotating magnetic head 8 is amplified by the playback amplifier 13, and fed to the playback equalizer 14 and then to the playback signal processor 15 for conversion into a reproduced video signal. The reproduced video signal is fed via the switch 23 to the screen display circuit 16. The screen display circuit 16 appends character data to the reproduced video signal for output as a reproduced video signal.

In Embodiment 1, in order to prevent picture quality variations in the record/playback video signals due to differences in magnetic tape characteristics, the tape simulator microcomputer 19 carries out simulated recording so that the amount of emphasis that the detail emphasis circuit 1 applies to the incoming video signal is set at the optimum value to match the magnetic tape 9 used. This serves to prevent magnetic reversion and secure a sufficient signal-to-noise ratio even for a poor performance magnetic tape. In the case of a high-performance magnetic tape, on the other hand, a picture of good signal-to-noise ratio can be obtained while securing a sufficient margin to magnetic reversion even when the picture is recorded with finer details.

Embodiment 2

Embodiment 2 of the present invention will be described below. The configuration of Embodiment 2 is identical to that of Embodiment 1 shown in FIG. 4. The following description deals with the operation of Embodiment 2. Embodiment 2 provides the same features as those described in the foregoing Embodiment 1, the only difference being that in Embodiment 2, the rehearsal recording is carried out with the magnetic tape 9 held at a stop position.

Figure 13:
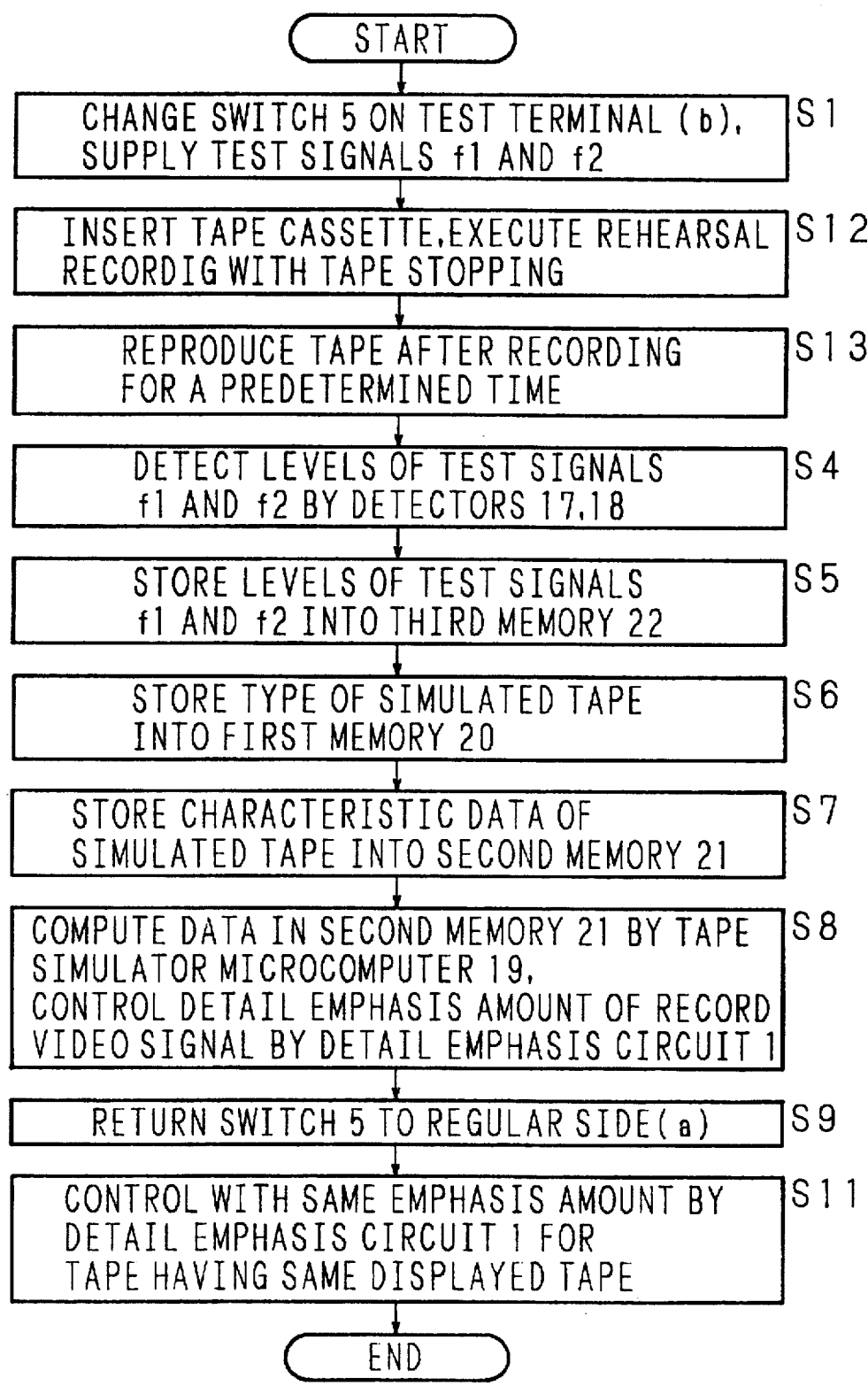
FIG. 13 is a flowchart illustrating a sequence of operations performed in the recording signal control apparatus of the present invention.

FIG. 13 is a flowchart illustrating a sequence of operations according to Embodiment 2. The operation of Embodiment 2 will be described with reference to the flowchart; the same processing steps as those illustrated in the flowchart of FIG. 12 are designated by the same step numbers as used in FIG. 12, and the following description focuses on the processing steps that are different from the flowchart of FIG. 12.

Figure 11:
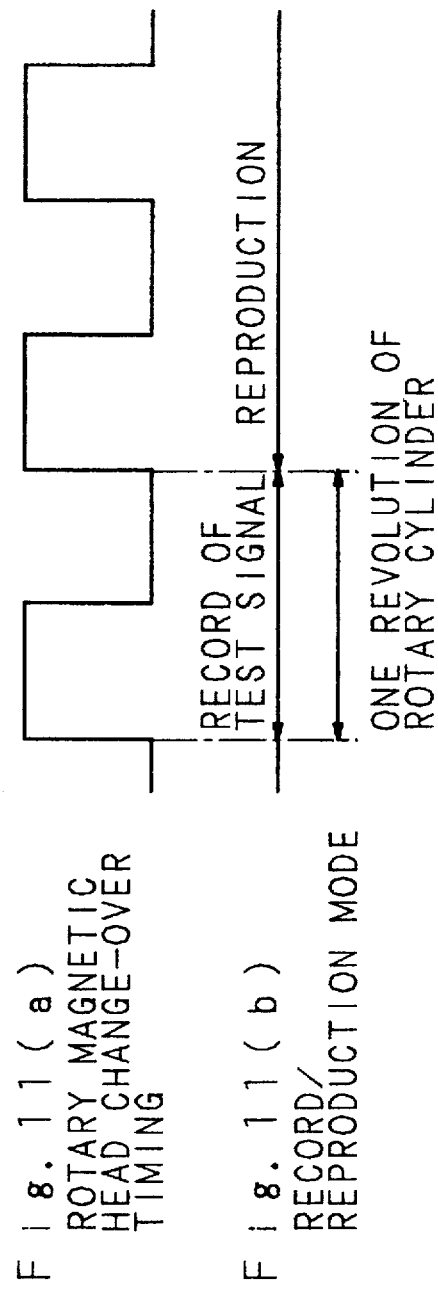
FIGS. 11(a) and 11(b) are timing diagrams for rehearsal recording/playback performed with the magnetic tape held at a stop position.

Referring to FIG. 13, in step S1, the f1 and f2 test signals are supplied from the f1/f2 test signal generator 6 to the rotating head 8 via the switch 5 and recording amplifier 7, as in step S1 in FIG. 12. Next, in step S12, the tape cassette is loaded, and rehearsal recording is carried out with the tape held at a stop position. The rehearsal recording and playback timings are shown in FIG. 11: FIG. 11(a) shows the changeover timing of the rotating magnetic head 8, and FIG. 11(b) shows the timing in record/playback modes. As can be seen from FIGS. 11(a) and 11(b), in step S13 the f1 and f2 test signals are recorded for a predetermined length of time, as in step S2 in Embodiment 1, i.e. for one revolution period of the rotating cylinder (the cylinder on which the rotating magnetic head 8 is mounted).

After the f1 and f2 test signals have been recorded, the f1 and f2 test signals are played back to carry out tape simulation, as in step S3 in Embodiment 1. The subsequent steps S4 through S9 are the same as the corresponding steps in the flowchart of FIG. 12. After the processing in step S9, the same processing as in step S11 in FIG. 12 is performed.

In Embodiment 2, since the tape simulation is carried out with the magnetic tape 9 held at a stop position, the characteristic data of the magnetic tape 9 can be measured in a shorter period of time.

Embodiment 3

Figure 14:
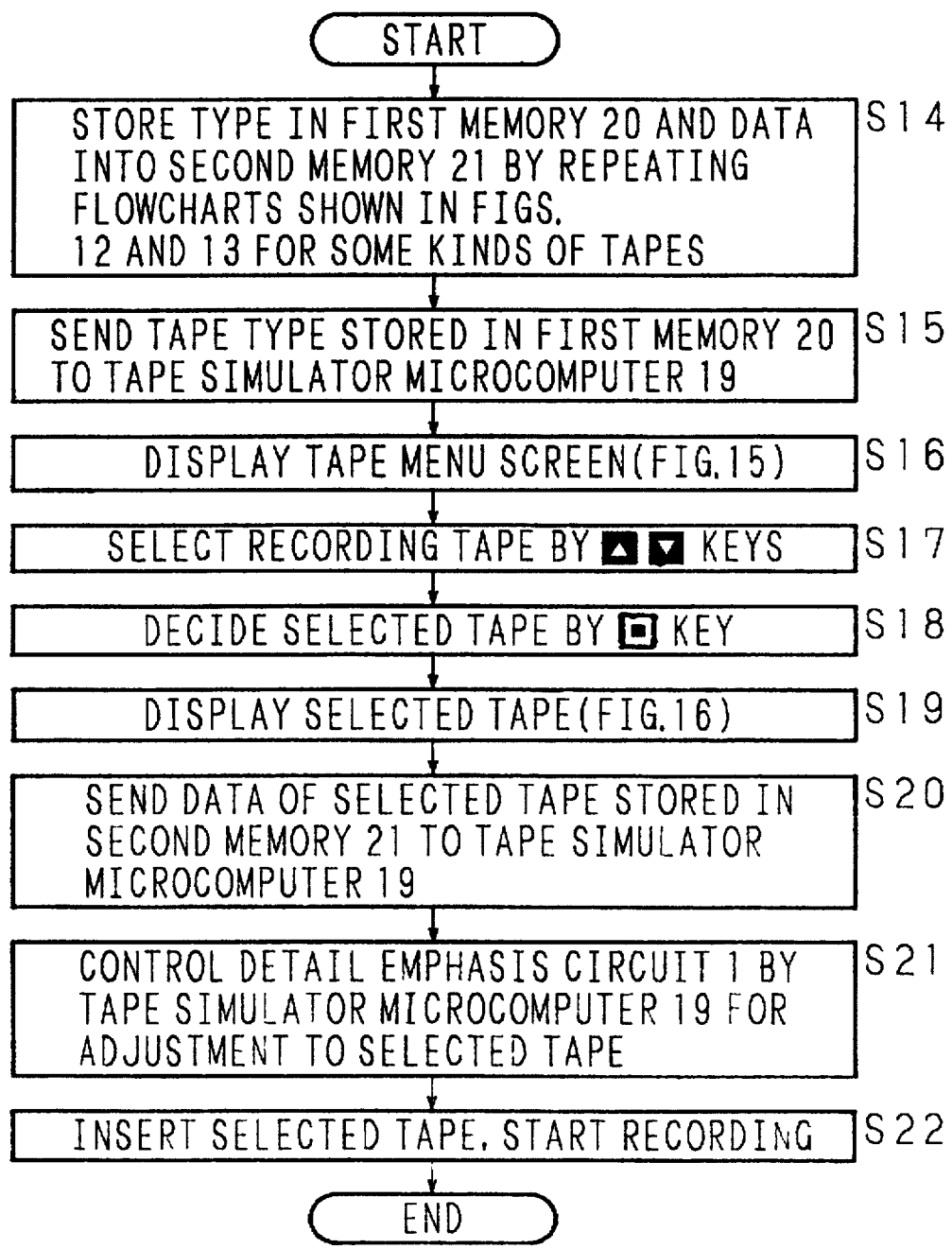
FIG. 14 is a flowchart illustrating a sequence of operations performed in the recording signal control apparatus of the present invention.

Embodiment 3 of the present invention will be described below. FIG. 14 is a flowchart illustrating a sequence of operations according to Embodiment 3. The following describes the operation of Embodiment 3 with reference to the flowchart of FIG. 14. The configuration of Embodiment 3 will not be described here as it is identical to that shown in FIG. 4 for the foregoing Embodiments 1 and 2.

As shown in the flowchart of FIG. 14, in Embodiment 3, the operations performed in Embodiments 1 and 2, i.e., the operations illustrated in the flowcharts of FIGS. 12 and 13, are repeated for different kinds of tapes, the tape simulator microcomputer 19 writing the type name of each magnetic tape 9 into the first memory 20 and storing the characteristic data for each magnetic tape 9 into the second memory 21. Next, in step S15, the tape simulator microcomputer 19 reads out the type names of magnetic tapes stored in the first memory 20, and in step S16, the tape simulator microcomputer 19 outputs the type names of the magnetic tapes stored in the first memory 20 onto a display means (not shown) for display, as shown in FIG. 15.

Next, in step S17, the user views the type names of magnetic tapes displayed on the display means and operates keys to select the magnetic tape to be used for video signal recording. In step S18, the selection of the magnetic tape is determined by key operation, and then, in step S19, the tape simulator microcomputer 19 displays the type name of the selected magnetic tape on the display means, as shown in FIG. 16.

Next, in step S20, the tape simulator microcomputer 19 reads the characteristic data of the magnetic tape from the second memory 21. In step S21, the tape simulator microcomputer 19 controls the detail emphasis circuit 1 so as to match the magnetic tape selected by the user's key operation and displayed on the display means. Next, in step S22, the user inserts the selected tape cassette into the VTR to start video signal recording.

In Embodiment 3, magnetic tape simulation is repeated a plurality of times to store the type names and characteristic data of a plurality of magnetic tapes, and the tape simulator microcomputer 19 displays the stored data on the display means for the user to select the desired magnetic tape; thus, the amount of emphasis that the detail emphasis circuit 1 applies to the video signal can be controlled at the optimum value for recording without having to carry out simulation over again for the plurality of magnetic tapes.

Embodiment 4

Figure 17A:
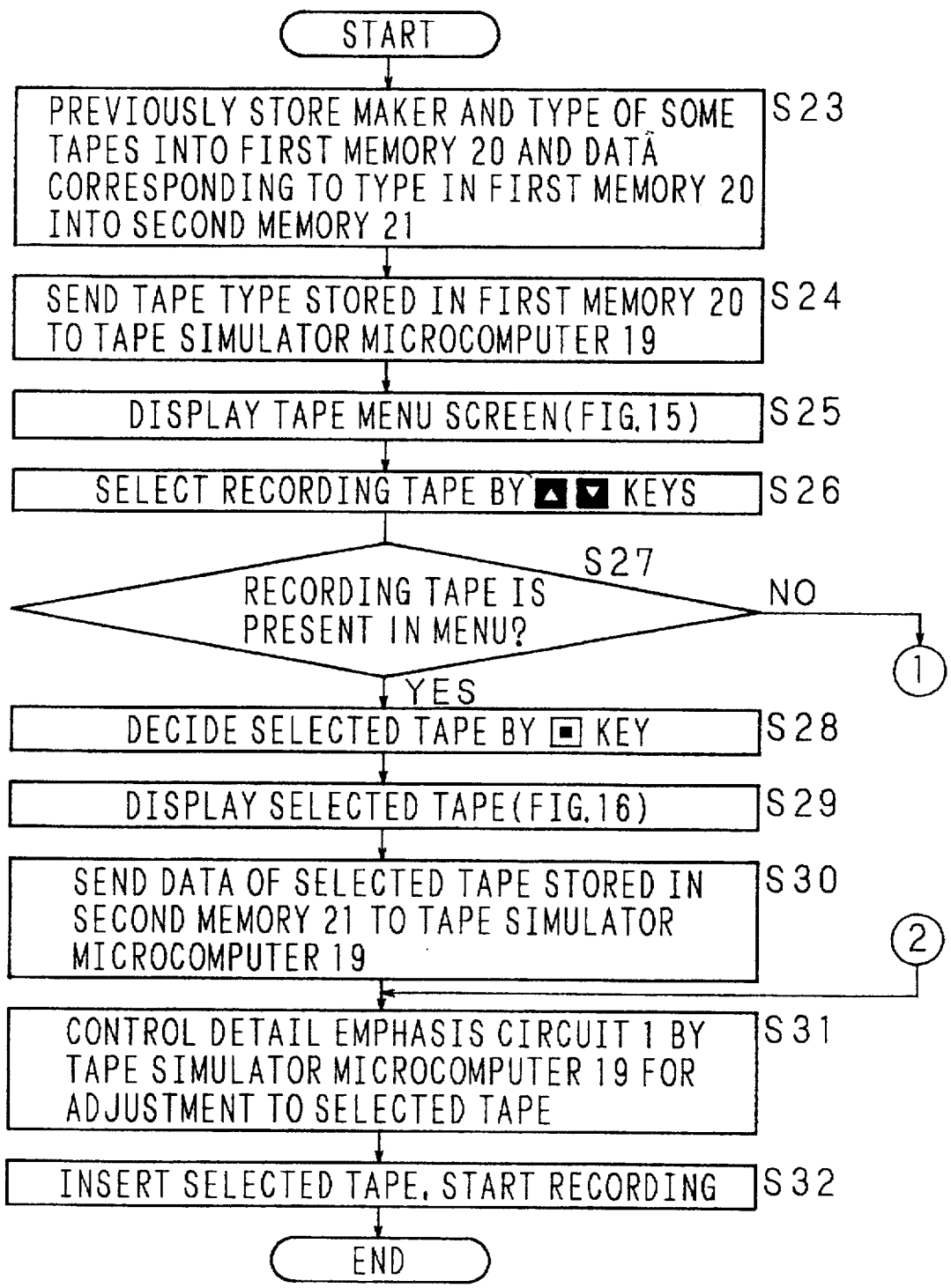
FIG. 17(a) and (b) as a flowchart illustrating a sequence of operations performed in the recording signal control apparatus of the present invention.
Figure 17B:
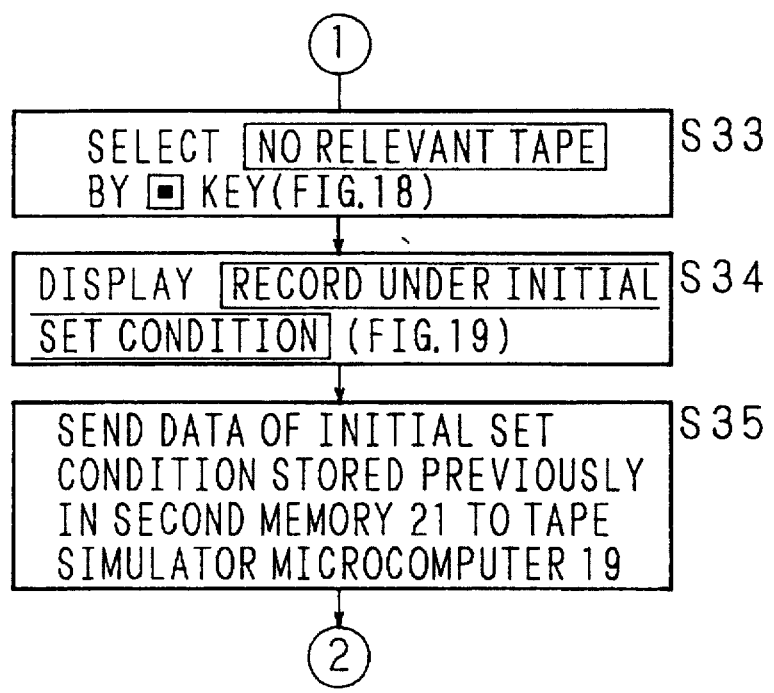

Embodiment 4 of the present invention will be described below. The configuration of Embodiment 4 is identical to that of Embodiment 1 shown in FIG. 4, and therefore, the following description deals only with the operation of Embodiment 4. FIG. 17 is a flowchart illustrating a sequence of operations according to Embodiment 4. In step S23 in FIG. 17, the manufacturer names and type names of frequently-used magnetic tapes are stored in the first memory 20, and the characteristic data of such magnetic tapes are stored in the second memory 21.

Next, in step S24, the tape simulator microcomputer 19 reads out the type names of the magnetic tapes stored in the first memory 20, and in step S25, the tape simulator microcomputer 19 displays the thus readout type names of the plurality of magnetic tapes onto the display screen of the display means, as shown in FIG. 15. In step S26, the user views the type names of magnetic tapes displayed on the display screen and operates keys to select the magnetic tape used for recording from among the magnetic tapes displayed on the display screen. Next, in step S27, it is determined whether the magnetic tape used is found in the tape menu displayed as shown in FIG. 15; if the magnetic tape used is found in the menu, the operation proceeds to step S28.

In step S28, the selection of the magnetic tape is determined by key operation, and in step S29, the tape simulator microcomputer 19 displays the type name of the selected magnetic tape on the display means as shown in FIG. 16.

Next, in step S30, the tape simulator microcomputer 19 reads out the characteristic data stored in the second memory 21 for the selected magnetic tape. In step S31, based on the characteristic data read out of the second memory 21, the tape simulator microcomputer 19 controls the detail emphasis circuit 1 so that optimum conditions can be achieved for the selected magnetic tape displayed on the screen as shown in FIG. 16. Next, in step S32, the selected magnetic tape is loaded into the VTR for video signal recording.

In Embodiment 4, the manufacturer names and type names of frequently-used magnetic tapes are prestored in the first memory 20 and the characteristic data of such tapes are prestored in the second memory 21, and such prestored data are brought onto the screen when selecting the magnetic tape used for recording. This arrangement permits the optimum control of the amount of emphasis that the detail emphasis circuit 1 applies to the video signal for recording, without having to redo the above-described simulation for the many magnetic tapes whose data are already stored in memory.

Embodiment 5

Embodiment 5 of the present invention will be described below. This embodiment is identical in configuration to the one shown in FIG. 4 but different in operation. The following describes the operation of Embodiment 5 with reference to the flowchart of FIG. 17. Embodiment 5 is characterized by the contents of the processing steps S33 through S35 that branch from step S27 when the NO decision is made in that step.

That is, when the tape simulator microcomputer 19 determines in step S27 that the magnetic tape used is not found in the menu, the processing routine follows the NO branch of step S27, and proceeds to step S33 where, as shown in FIG. 18, "NO RELEVANT TAPE" is selected from the tape menu screen which is displayed when there is no relevant tape found. Next, in step S34, the tape simulator microcomputer 19 displays "RECORD UNDER INITIAL SET CONDITION" as shown on the display screen of FIG. 19 when "NO RELEVANT TAPE IS REGISTERED" is selected. Then, in step S35, the tape simulator microcomputer 19 reads out the initial value data stored in the second memory 21, and in step S31, the tape simulator microcomputer 19 controls the detail emphasis circuit 1 so that the amount of detail emphasis to be applied is set at such a value that does not cause problems for any magnetic tape whose data is stored in the second memory 21. The processing in step S32 is then performed, as in Embodiment 4.

As described, in Embodiment 5, if the type name of the magnetic tape used is not stored in the first memory 20, the tape simulator microcomputer 19 controls the detail emphasis circuit 1 so that the amount of detail emphasis to be applied is set at such a value that does not cause problems for any magnetic tape whose data is stored in the second memory 21. Accordingly, any kind of magnetic tape can be used for video signal recording.

Embodiment 6

Figure 20A:
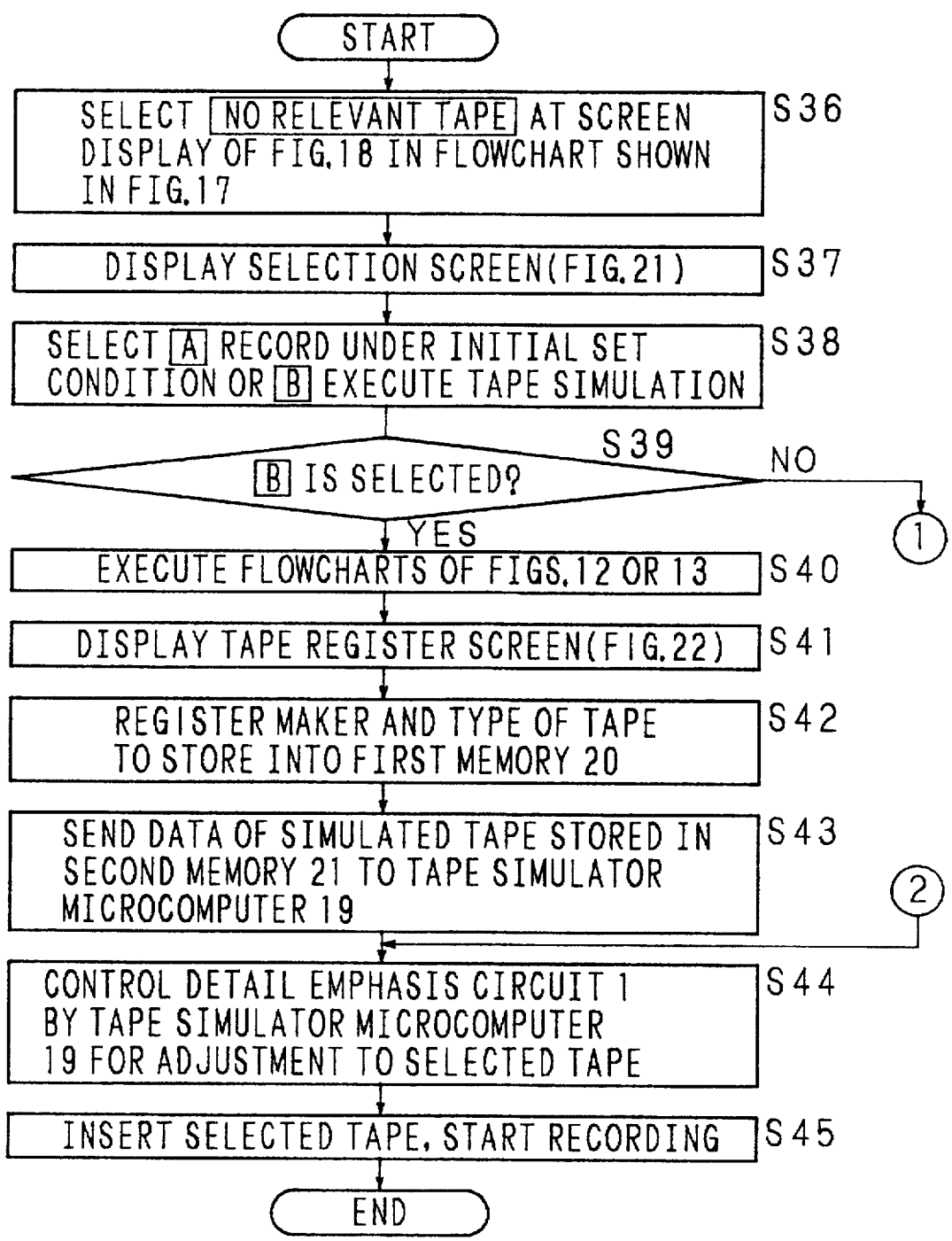
FIG. 20(a) and (b) is a flowchart illustrating a sequence of operations performed in the recording signal control apparatus of the present invention.
Figure 20B:
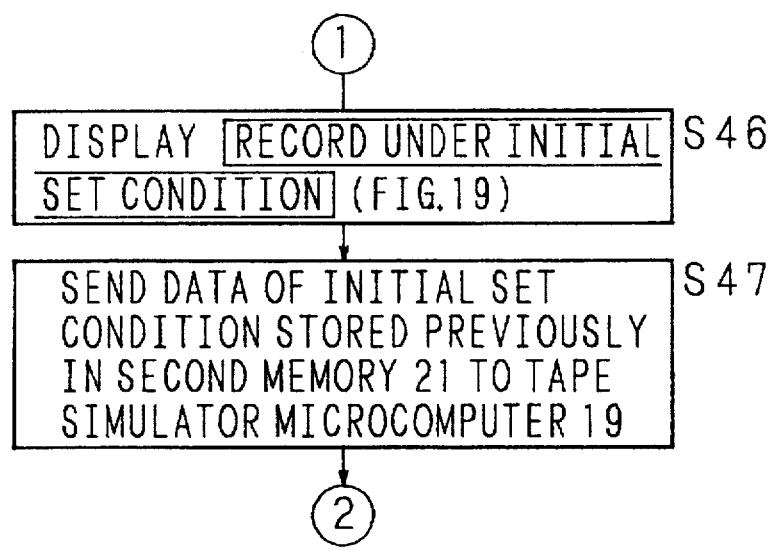

Embodiment 6 of the present invention will be described blow. The configuration of Embodiment 6 is also identical to that shown in FIG. 4, and therefore, the following description deals only with the operation of this embodiment. FIG. 20 is a flowchart illustrating a sequence of operations according to Embodiment 6. The operation of Embodiment 6 will be described below with reference to FIG. 20. In step S36 in the flowchart of FIG. 20, when "NO RELEVANT TAPE" is selected in step S33 in the flowchart of FIG. 17, the operation proceeds to step S37 in the flowchart of FIG. 20. In step S37, the tape simulator microcomputer 19 displays on the display means a screen similar to the one shown in FIG. 21.

Figure 21:
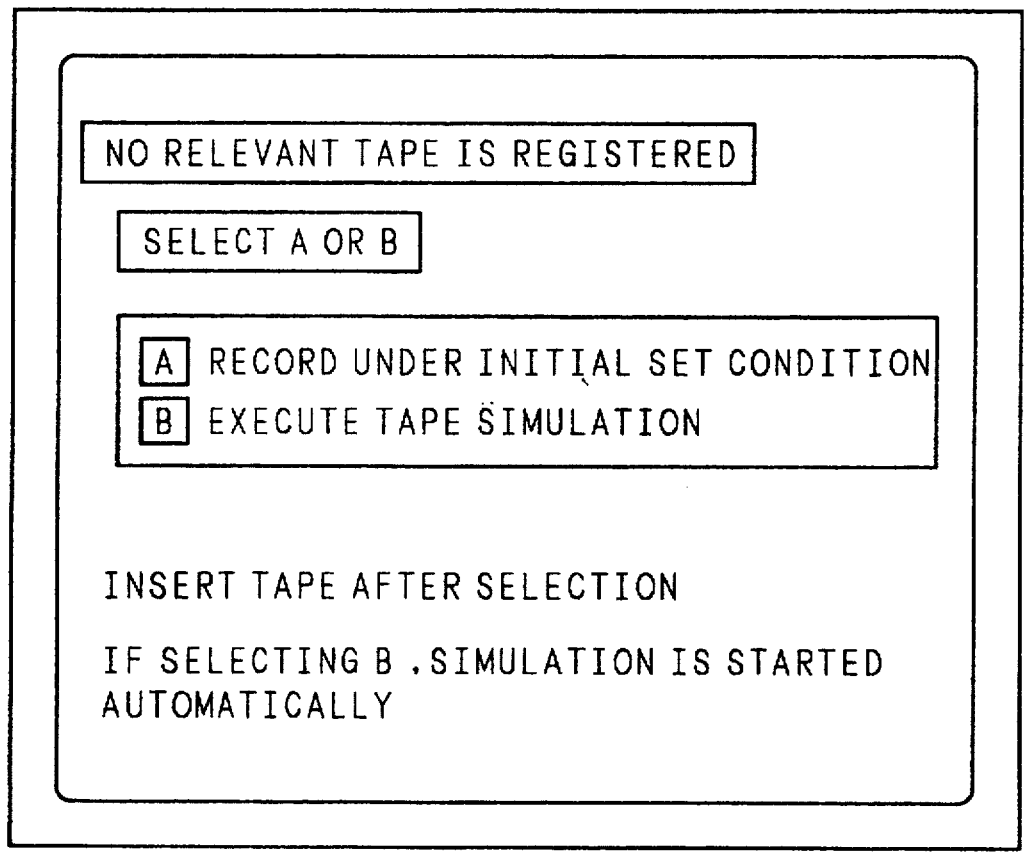
FIG. 21 is a diagram for explaining an example of a screen that is displayed when "NO RELEVANT TAPE" is selected.

Next, in step S38, selection is made between [A] RECORD UNDER INITIAL SET CONDITION and [B] EXECUTE TAPE SIMULATION from the display screen shown in FIG. 21. If it is determined in step S39 that [B] EXECUTE TAPE SIMULATION has been selected, the tape simulation of Embodiment 1 is carried out. That is, the processing routine shown in the flowchart of FIG. 12 or 13 is followed in step S40.

Thus, in Embodiment 6, when the magnetic tape used is not registered, the magnetic tape simulation of Embodiment 1 or Embodiment 2 is carried out to control the amount of emphasis that the detail emphasis circuit 1 applies to the video signal for recording.

Embodiment 7

Embodiment 7 of the present invention will be described below. The configuration of Embodiment 7 is also identical to that shown in FIG. 4, and therefore, the following description deals only with the operation of this embodiment. In Embodiment 7, the tape simulation of Embodiment 2 is carried out when EXECUTE TAPE SIMULATION is selected in step S39 in the operation of Embodiment 6 shown in the flowchart of FIG. 20. Thus, in Embodiment 7 also, the amount of emphasis that the detail emphasis circuit 1 applied to the video signal for recording can be controlled in a shorter period of time.

Embodiment 8

Figure 5:
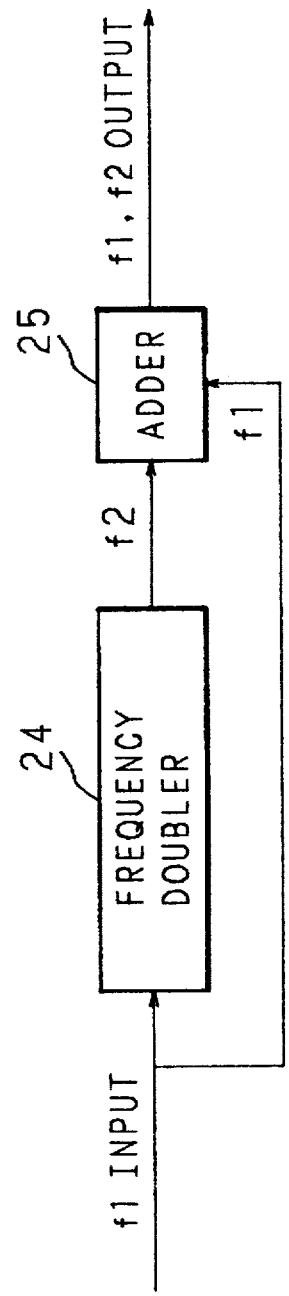
FIG. 5 is a block diagram showing in detail the configuration of a test signal generator in the recording signal control apparatus of the present invention.

Embodiment 8 of the present invention will be described below. In Embodiment 8, a frequency doubler 24 for the f1 test signal and an adder 25 are combined, as shown in FIG. 5, to constitute the f1/f2 test signal generator 6 described in Embodiment 1. Stated another way, FIG. 5 is a block diagram showing the internal configuration of the f1/f2 test signal generator 6. The f1 test signal is a signal available within the VTR, and more specifically, a signal of the subcarrier frequency of the chroma signals. The f1 test signal is input to the frequency doubler 24 where the frequency is doubled, the output thereof then being supplied as an input to the adder 25.

The f1 test signal is also input directly to the adder 25. Accordingly, the adder 25 adds the f1 test signal to the output f2 of the frequency doubler 24 to output the f1 test signal and the f2 test signal. The f1 and f2 test signals are then applied to the fixed terminal "b" of the switch 5 shown in FIG. 4.

Next, the operation of Embodiment 8 will be described. Embodiment 8 is concerned with an example in which a high-band-compatible magnetic tape is used for test simulation with a plurality of test signals. The f1 test signal of the subcarrier frequency of the chroma signals available within the VTR is input to the frequency doubler 24 as well as to the adder 25. When the f1 test signal is input, the frequency doubler 24 outputs a signal (f2) whose frequency is twice that of the input, the signal f2 then being input to the adder 25. The adder 25 then adds the f1 test signal to the output signal of the frequency doubler 24, to produce the f1 test signal and the f2 test signal.

Embodiment 9

Figure 6:
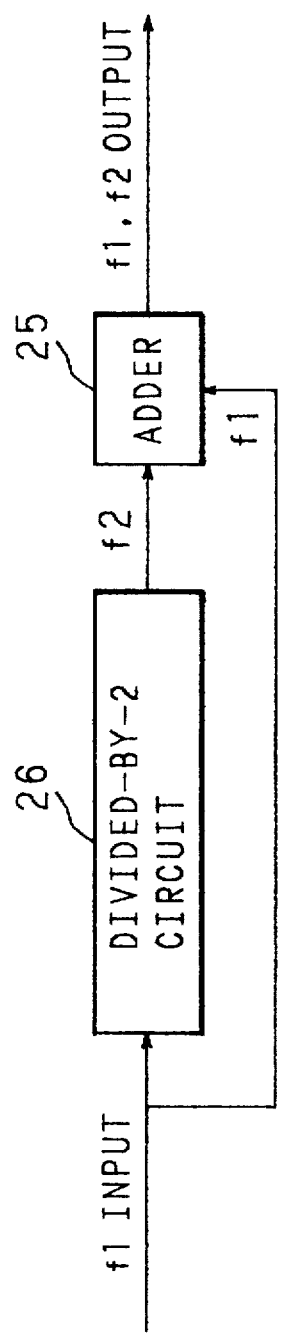
FIG. 6 is a block diagram showing in detail an alternative configuration of the test signal generator in the recording signal control apparatus of the present invention.

Embodiment 9 of the present invention will be described below. FIG. 6 is a block diagram showing an alternative configuration of the f1/f2 test signal generator 6. Embodiment 9 is concerned with an example in which a lowband-compatible magnetic tape is used for test simulation with a plurality of test signals. In FIG. 6, the f1 test signal of the subcarrier frequency of the chroma signals available within the VTR is input to a divide-by-2 circuit 26 as well as to an adder 25. The divide-by-2 circuit 26 divides the f1 test signal by 2 to produce an output (f2) which is supplied as an input to the adder 25. The adder 25 adds the f1 test signal to the output signal of the divide-by-2 circuit 26, to produce the f1 test signal and the f2 test signal. The f1 and f2 test signals are applied to the fixed terminal "b" of the switch 5 shown in FIG. 4.

As is apparent from Embodiments 8 and 9, whether the magnetic tape used is a highband-compatible tape or a low-band-compatible tape, the invention allows tape simulation that matches the purpose of the magnetic tape used.

Embodiment 10

In the foregoing Embodiments 8 and 9, the subcarrier frequency of the chroma signals available within the VTR is used as the f1 test signal, but the present invention is not limited to the above-described arrangement. For example, a signal in the vicinity of 4 MHz available within the VTR, such as the clock signal of a microcomputer, may be used as the f1 test signal.

Embodiment 11

Figure 22:
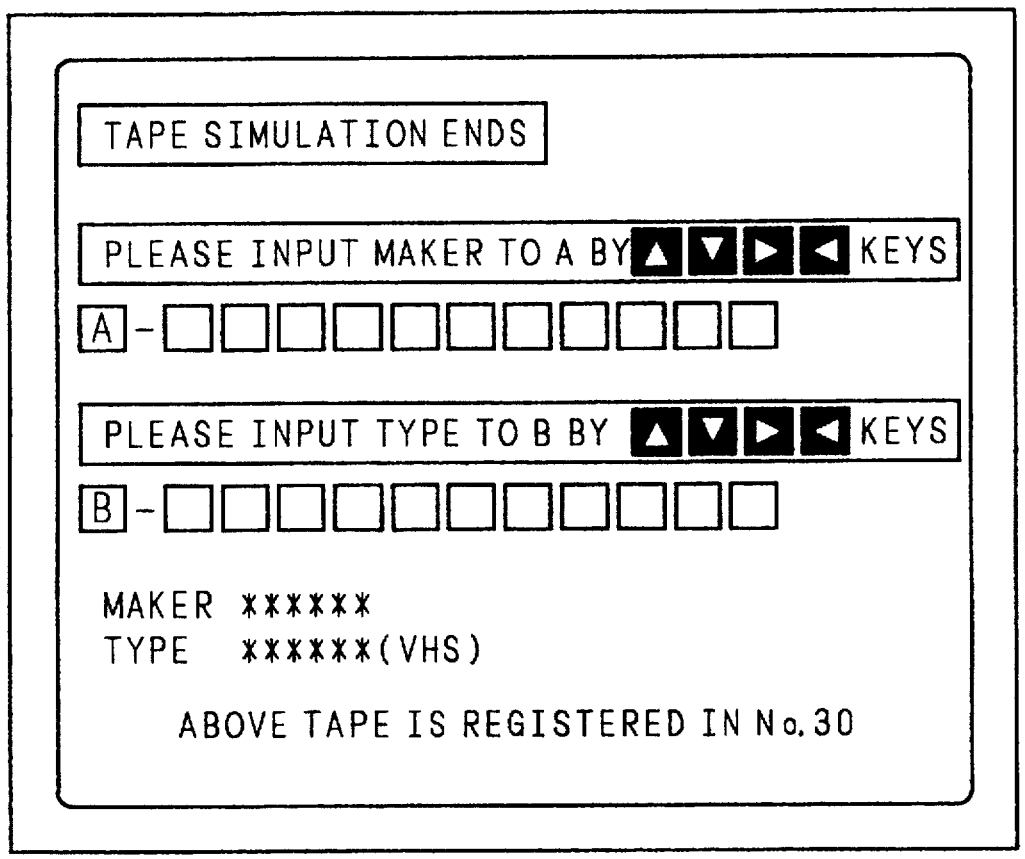
FIG. 22 is a diagram for explaining an example of a screen for entering the manufacturer name and type name of the magnetic tape after tape simulation.

Embodiment 11 of the present invention will be described below. The configuration of Embodiment 11 is identical to that shown in FIG. 4, and therefore, the following description deals only with the operation of this embodiment. The flowchart of FIG. 20 is again used to explain the operation of Embodiment 11. In Embodiment 11, after the tape simulation of Embodiment 6 or 7 is carried out, a screen similar to the one shown in FIG. 22 is displayed in step S41 prompting for the registration of the manufacturer name and type name of the magnetic tape. In step S42, the manufacturer name and type name are entered on the screen and stored in the first memory 20, and the characteristic data of the magnetic tape is added to the data stored in the second memory 21, thus adding new data to the list of manufacturer names and type names of magnetic tapes prestored in the first memory 20 and second memory 21, as shown on the screen of FIG. 23 which displays data newly registered after the tape simulation.

After the tape simulation, the manufacturer name and type name of the magnetic tape are stored, as described above, after which in step S43 the tape simulator microcomputer 19 reads the characteristic data of the simulated magnetic tape from the second memory 21. Then, in step S44, the tape simulator microcomputer 19 controls the detail emphasis circuit 1 so as to match the selected magnetic tape.

Next, in step S45, the selected tape cassette is loaded into the VTR for video signal recording.

In the flowchart of FIG. 20, if [B] EXECUTE TAPE SIMULATION is not selected, then the operation proceeds to step S46 where the tape simulator microcomputer 19 displays "RECORD UNDER INITIAL CONDITION" on the display means as shown in FIG. 19, and in the next step S47, the tape simulator microcomputer 19 reads out the initial value characteristic data stored in the second memory 21. Based on the initial value characteristic data, the subsequent steps S44 and S45 are carried out.

In Embodiment 11, the results of the tape simulation of the magnetic tape and the manufacturer name and type name of the magnetic tape are added to the data previously stored in memory. This eliminates the need for tape simulation when the same tape is selected again in future.

Embodiment 12

Embodiment 12 of the present invention will be described below. In Embodiment 12, the tape simulator microcomputer 19 reorders the tape menu displayed on the display means so that the last used magnetic tape, which is expected to be used most frequently, appears at the top of the menu, such as in the tape menu screen shown in FIG. 24 in which the last designated tape is displayed at the top of the menu, as in Embodiments 3 and 4, or in the tape menu screen shown in FIG. 25 in which the tape used for tape simulation is displayed at the top of the menu, as in Embodiment 11.

Thus, in Embodiment 12, when the tape menu screen is displayed, the last used magnetic tape appears at the top of the menu displayed on the screen; thus, the magnetic tapes of higher probabilities of use are displayed at higher positions on the menu for easier selection.

Embodiment 13

Figure 26:
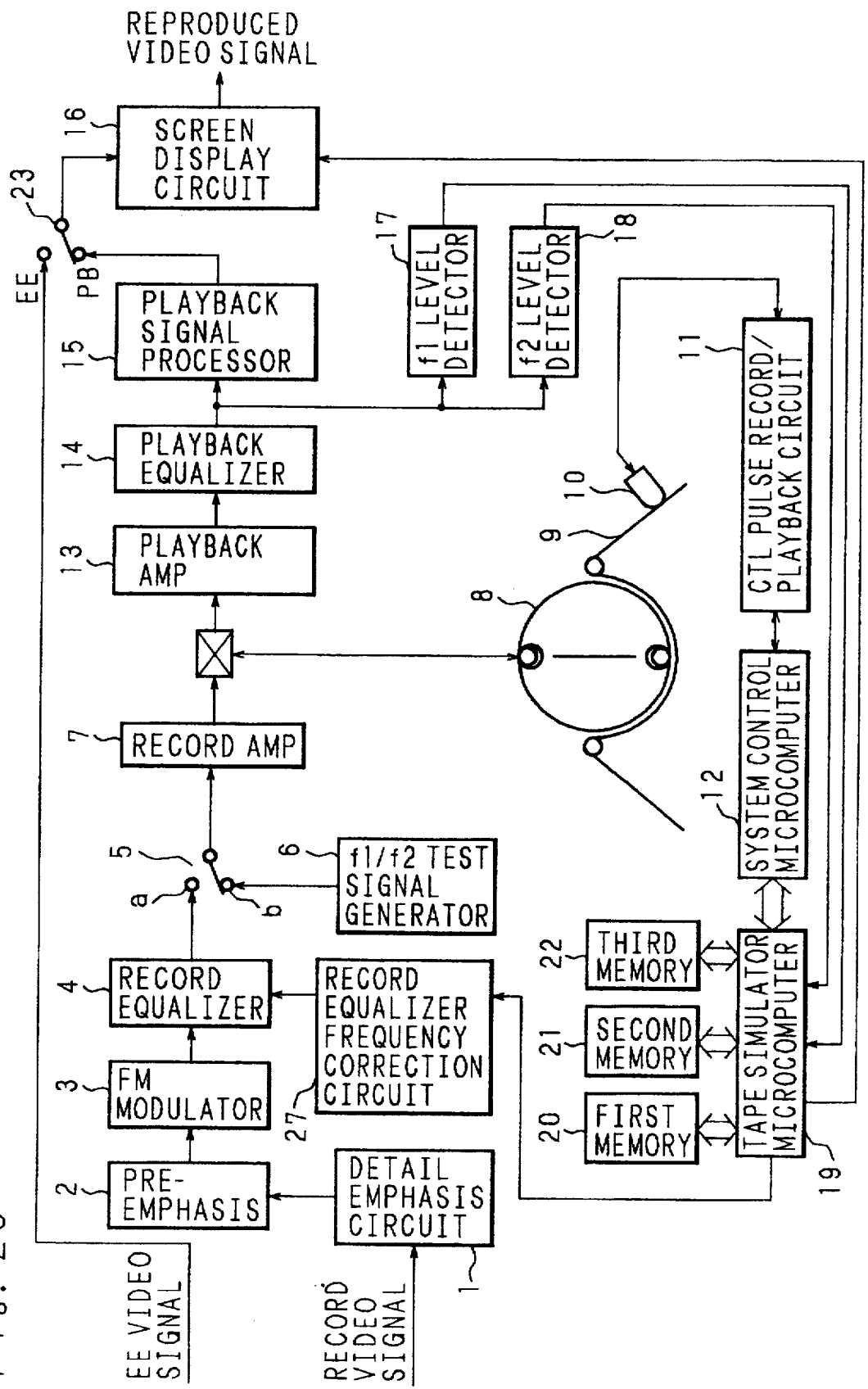
FIG. 26 is a block diagram showing the configuration of another recording signal control apparatus according to the present invention.

Embodiment 13 of the present invention will be described below. FIG. 26 is a block diagram showing the configuration of Embodiment 13. In FIG. 26, the same or corresponding parts to those shown in FIG. 4 are designated by the same reference numerals to avoid repeated explanation of such parts, and the following description focuses on differences from the configuration of FIG. 4. The configuration shown in FIG. 26 is different from that shown in FIG. 4 in that a recording equalizer frequency correction circuit 27 is added; otherwise, the configuration is the same as that of FIG. 4. The recording equalizer frequency correction circuit 27 is provided to control the frequency characteristic of the recording equalizer 4 under the control of the tape simulator microcomputer 19. In the configuration of FIG. 26, the tape simulator microcomputer 19 does not control the amount of emphasis that the detail emphasis circuit 1 applies.

Figure 27:
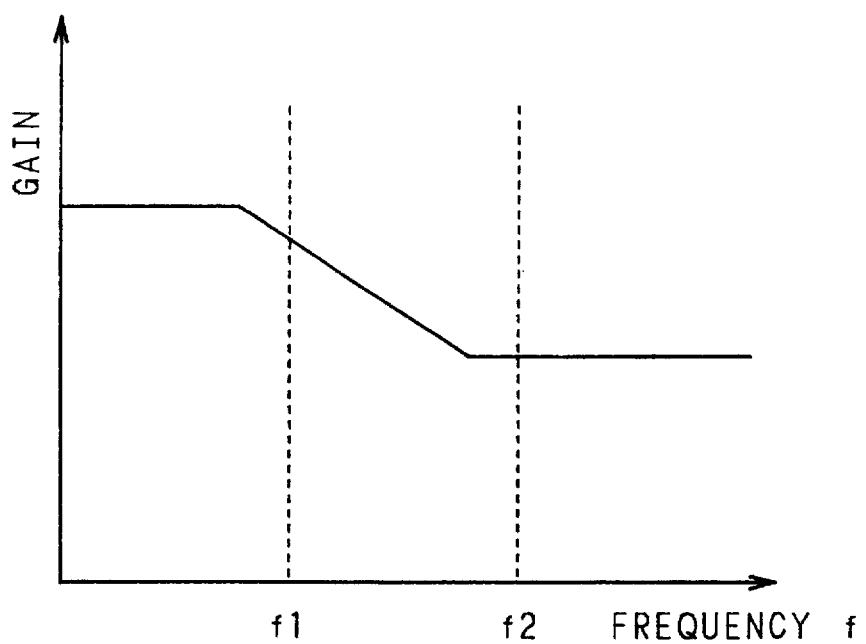
FIG. 27 is a characteristic diagram showing a standard frequency characteristic of a recording equalizer.
Figure 28:
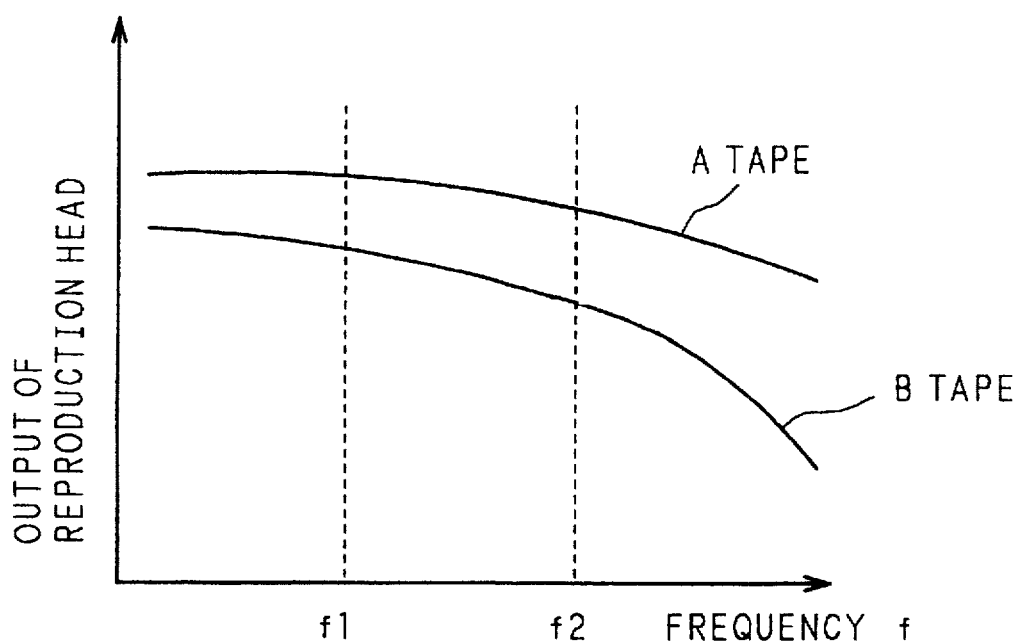
FIG. 28 is a characteristic diagram showing standard frequency characteristics of the recording equalizers for two different magnetic tapes.
Figure 29:
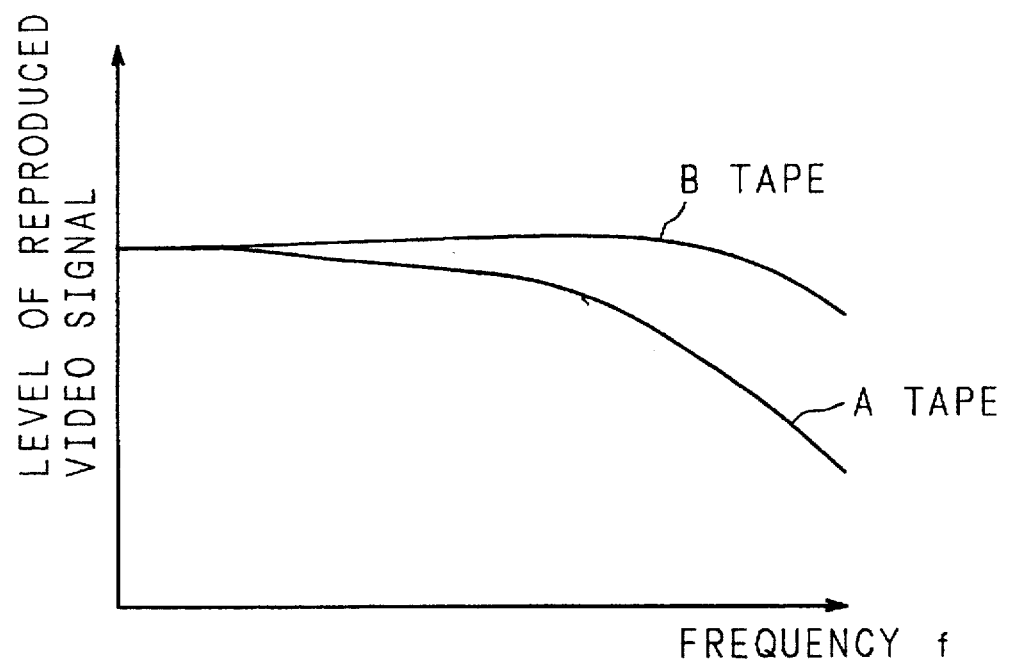
FIG. 29 is a characteristic diagram showing reproduced video frequency characteristics with the recording equalizer set at the standard frequency characteristics shown in FIG. 28.
Figure 30:
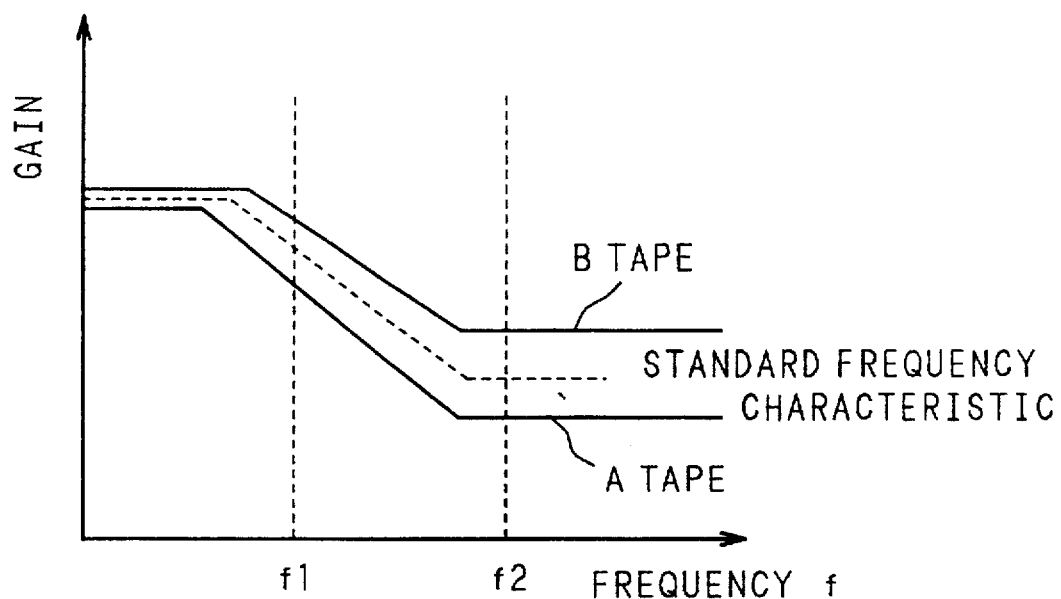
FIG. 30 is a characteristic diagram showing the corrected frequency characteristics of the two magnetic tapes after correction by a recording equalizer correction circuit.
Figure 31:
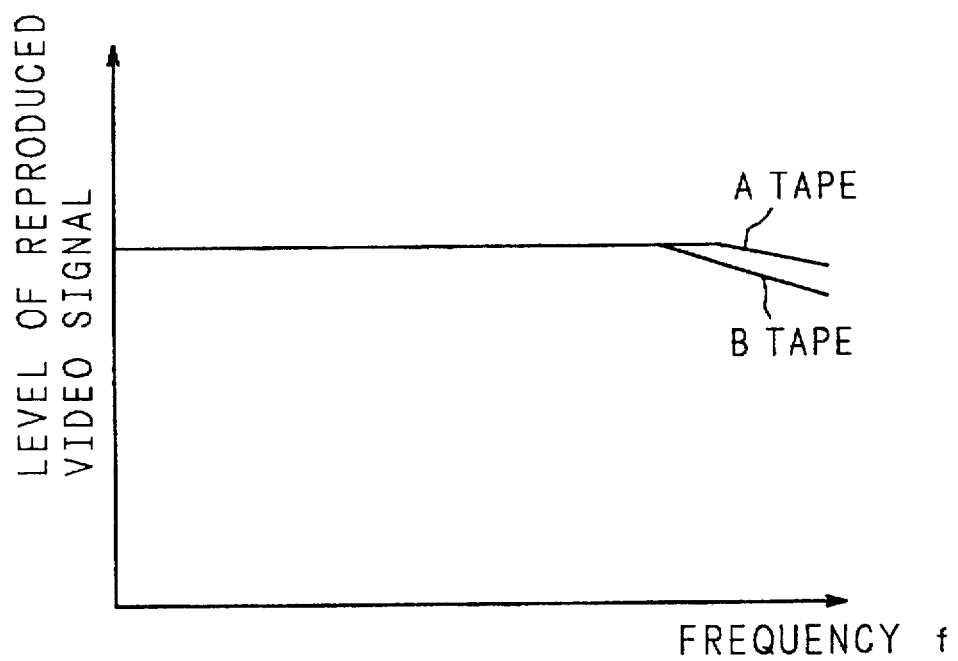
FIG. 31 is a characteristic diagram showing reproduced video frequency characteristics after correction by the recording equalizer.

FIG. 27 is a diagram showing the standard frequency characteristic of the recording equalizer 4; FIG. 28 is a diagram showing the output Frequency characteristics of the playback head for the previously described tapes A and B when the recording equalizer 4 is set at the standard frequency characteristic; FIG. 29 is a diagram showing reproduced video frequency characteristics with the playback head having the frequency characteristics shown in FIG. 28; FIG. 30 is a diagram showing the corrected frequency characteristics of the recording equalizer corrected for the tapes A and B by the recording equalizer frequency correction circuit 27; and FIG. 31 is a diagram showing reproduced video frequency characteristics after correction of the recording equalizer 4 corrected as shown in FIG. 30.

Next, the operation of Embodiment 13 will be described. Tuning buttons (not shown) are provided on the front panel of the VTR body. Before recording, i.e., after a tape cassette has been loaded into the VTR, the user operates these tuning buttons in accordance with which a sequence of operations illustrated in the flowchart of FIG. 32 are performed under control of the tape simulator microcomputer 19 to detect the optimum recording conditions for the magnetic tape.

Figure 32:
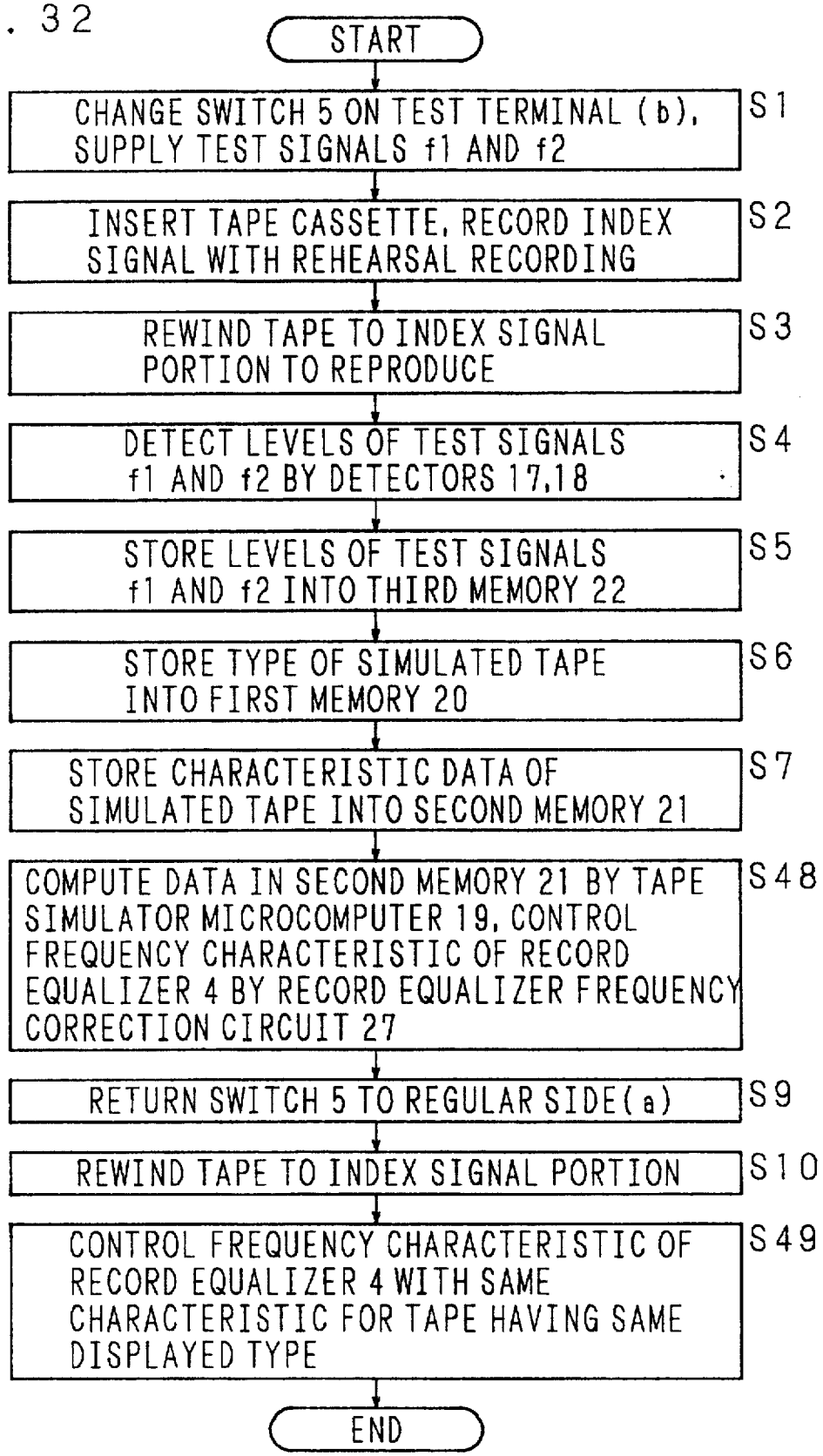
FIG. 32 is a flowchart illustrating a sequence of operations performed in the recording signal control apparatus of the present invention.

In the flowchart of FIG. 32, the same processing steps as those in FIG. 12 which shows the sequence of operations in Embodiment 1 are designated by the same step numbers as those used in FIG. 12, to avoid repeated explanation of such steps. In FIG. 32, the steps S1 through S7 are the same as the corresponding steps shown in FIG. 12, and therefore, these steps are not described here. In FIG. 32, after the characteristic data of the magnetic tape 9 has been stored by the tape simulator microcomputer 19 into the second memory 21 in step S7, the tape simulator microcomputer 19 in step S48 reads out the data stored in the second memory 21 concerning the result of the simulation of the magnetic tape 9, and performs operations on the thus readout characteristic data to control the recording equalizer frequency correction circuit 27. The recording equalizer frequency correction circuit 27 then controls the frequency characteristic of the recording equalizer 4 to set the frequency characteristic at the optimum value.

After the frequency characteristic of the recording equalizer 4 is controlled in step S48, the same steps S9 and S10 as described in the flowchart of FIG. 12 are followed. Thereafter, in step S49, the frequency characteristic of the recording equalizer 4 is controlled at the same value for all magnetic tapes whose type name displayed is the same as that of the magnetic tape whose data has just been stored in memory.

In Embodiment 13, the tape simulator microcomputer 19 carries out simulated recording on the magnetic tape 9 and sets the frequency characteristic of the recording equalizer 4 at the optimum value. This has the effect of preventing magnetic reversion and producing a picture of good S/N ratio even when a poor performance magnetic tape is used for recording.

Embodiment 14

Figure 33:
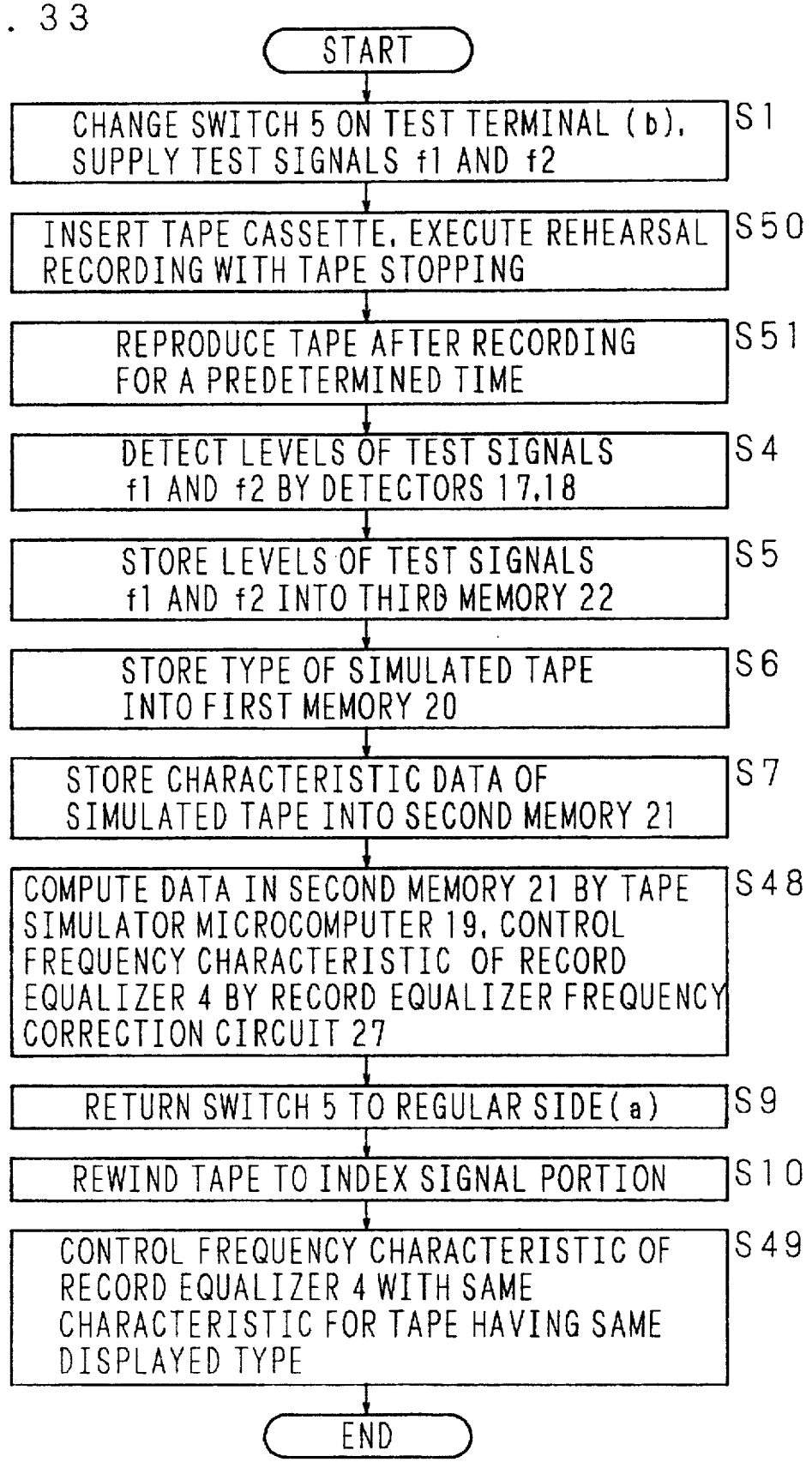
FIG. 33 is a flowchart illustrating a sequence of operations performed in the recording signal control apparatus of the present invention.

Embodiment 14 of the present invention will be described below. The configuration of this embodiment is identical to that of Embodiment 13 shown in FIG. 26, and therefore, the following description deals only with the operation of this embodiment. FIG. 33 is a flowchart showing a sequence of operations according to this embodiment. Embodiment 14 provides the same features as those described in the foregoing Embodiment 13, the only difference being that in Embodiment 14, the rehearsal recording is carried out with the magnetic tape 9 held at a stop position.

In the flowchart of FIG. 33, after carrying out the processing in step S1, as in the flowchart of FIG. 32, the tape cassette is loaded into the VTR in step S50 and rehearsal recording is carried out with the magnetic tape 9 held at a stop position. Next, in step S51, playback is performed after carrying out rehearsal recording for a predetermined length of time. The timings of rehearsal recording and playback performed with the magnetic tape 9 held at a stop position have already been described in connection with FIGS. 11(a) and 11(b); as described in the explanation of Embodiment 1, the f1 and f2 test signals are recorded for one revolution period of the rotating cylinder, as shown in FIGS. 11(a) and 11(b), and after recording, simulation is carried out by replaying the f1 and f2 test signals. In FIGS. 11(a) and 11(b), the test signal recording period is made equal to one revolution period of the rotating cylinder, but the recording period may be made longer than one revolution period of the rotating cylinder as necessary.

After carrying out the processing in step S51, steps S4 through S7, step S48, step S9, step S10, and step S49 are followed in this order, as in the flowchart of FIG. 32.

In Embodiment 14, since rehearsal recording is performed with the magnetic tape 9 held at a stop position, the characteristic data of the magnetic tape can be measured in a shorter period of time.

Embodiment 15

Figure 34:
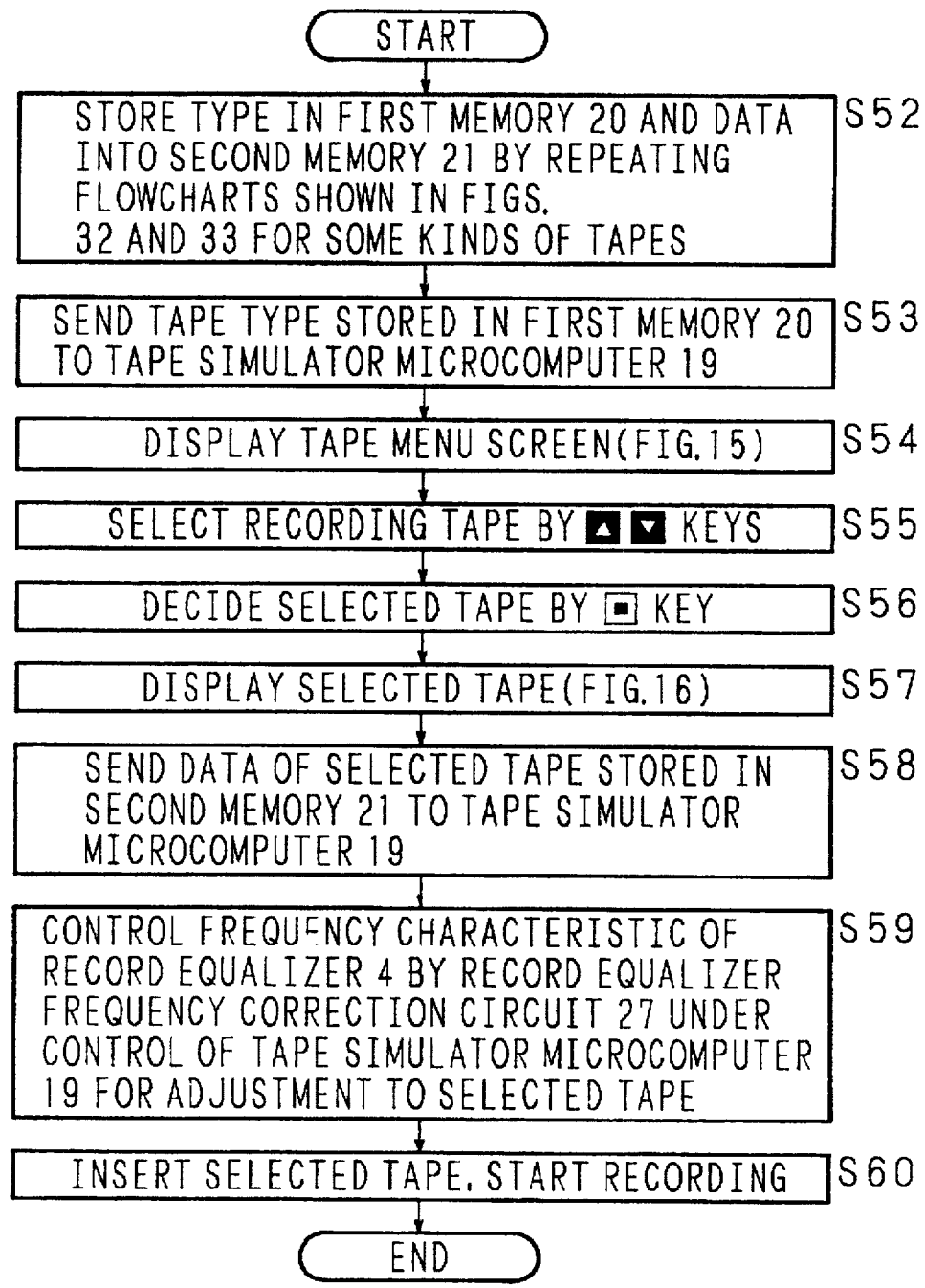
FIG. 34 is a flowchart illustrating a sequence of operations performed in the recording signal control apparatus of the present invention.

Embodiment 15 of the present invention will be described below. The configuration of Embodiment 15 is identical to that of Embodiments 13 and 14 shown in FIG. 26. The operation of Embodiment 15 will now be described with reference to the flowchart shown in FIG. 34. In step S52 in the flowchart of FIG. 34, the processing operations shown in the flowcharts of FIGS. 32 and 33 are repeated for different kinds of magnetic tapes, storing the type name of each magnetic tape into the first memory 20 and the characteristic data of each magnetic tape into the second memory 21. Next, in step S53, the tape simulator microcomputer 19 reads out the type names of magnetic tapes stored in the first memory 20, and in step S54, the tape simulator microcomputer 19 displays a tape menu screen, such as shown in FIG. 15, on the display means.

In step S55, the magnetic tape used is selected by key operation from the menu screen shown in FIG. 15. Next, in step S56, the selection of the magnetic tape is determined, and in step S57, the tape simulator microcomputer 19 displays the type name of the selected magnetic tape, as shown in FIG. 16. In step S58, the tape simulator microcomputer 19 reads out the characteristic data of the selected magnetic tape from the second memory 21. In step S59, the tape simulator microcomputer 19 controls the recording equalizer frequency correction circuit 27 so as to match the selected magnetic tape; the recording equalizer frequency correction circuit 27 then controls the frequency characteristic of the recording equalizer 4 at the optimum value for the selected tape displayed on the screen. Next, in step S60, the tape cassette containing the selected magnetic tape is loaded into the VTR to start the recording of the video signal.

In Embodiment 15, simulation is repeated a plurality of times to store the type names and characteristic data of a plurality of magnetic tapes into the first memory 20 and second memory 21, respectively. The stored data are then displayed on the screen for selection of the desired magnetic tape, based on which the frequency characteristic of the recording equalizer 4 is controlled. The frequency characteristic of the recording equalizer can thus be controlled at the optimum value.

Embodiment 16

Figure 35A:
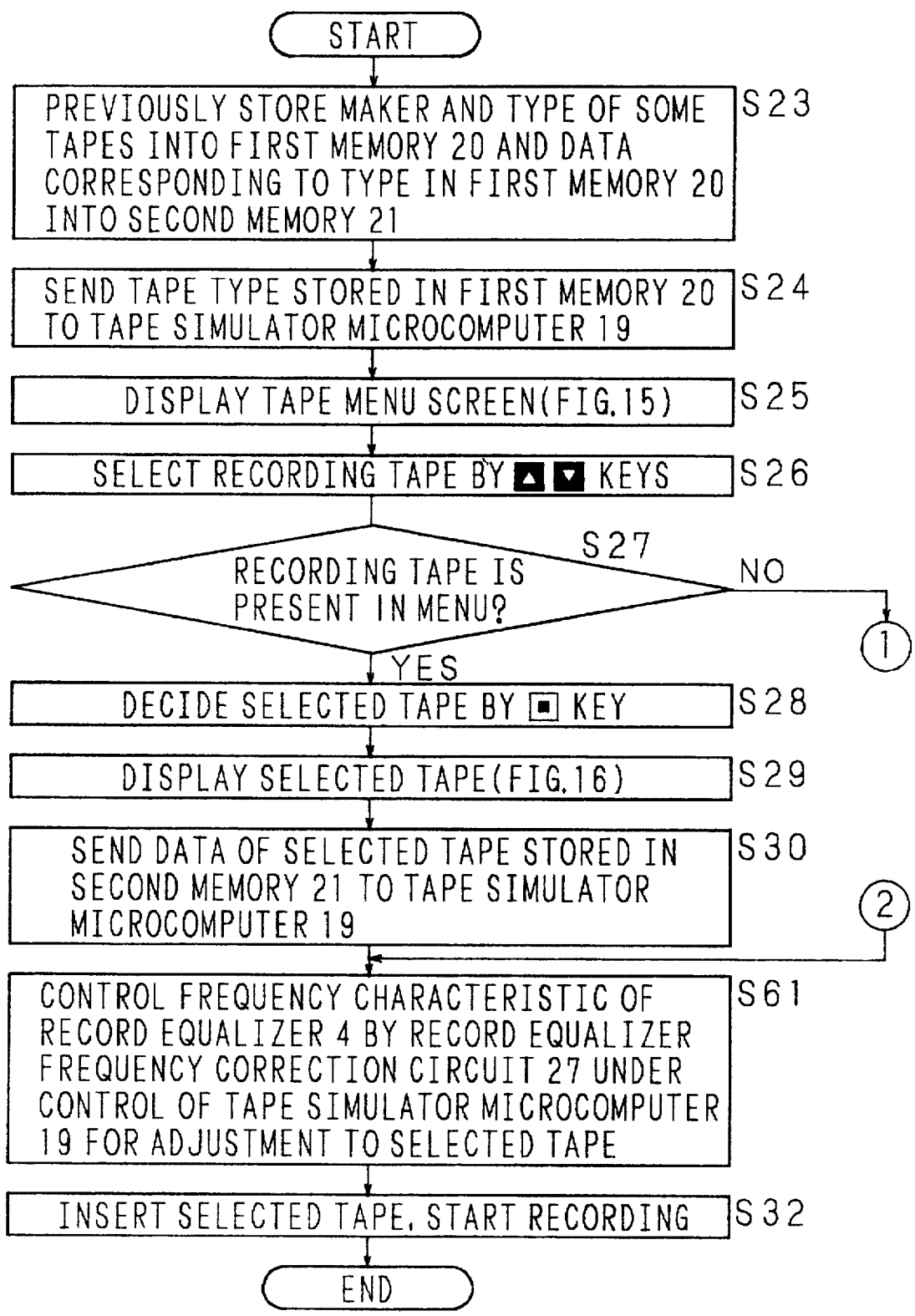
FIG. 35(a) and (b) is a flowchart illustrating a sequence of operations performed in the recording signal control apparatus of the present invention.
Figure 35B:
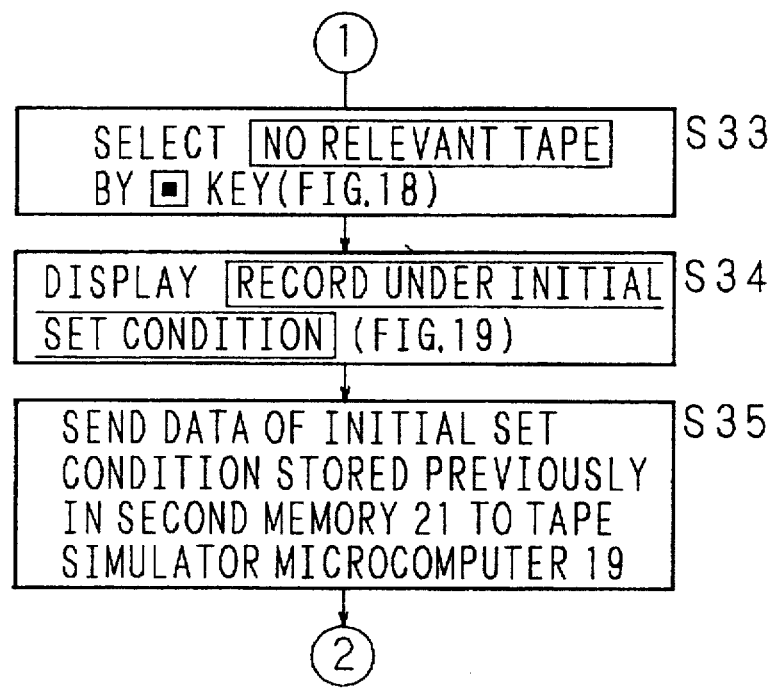

Embodiment 16 of the present invention will be described below. The configuration of this embodiment is identical to that of Embodiments 13 to 15 shown in FIG. 26, and therefore, the following description deals only with the operation of this embodiment. FIG. 35 is a flowchart illustrating a sequence of operations according to Embodiment 16; this flowchart corresponds to the flowchart of FIG. 17 which shows control flow in Embodiments 4 and 5.

In FIG. 35, the same processing steps as illustrated in FIG. 17 are designated by the same step numbers. In step S23 in FIG. 35, the manufacturer names and type names of frequently-used magnetic tapes are stored in the first memory 20, and the characteristic data for the magnetic tapes whose type names have been stored in the first memory 20 are stored in the second memory 21. Next, in step S24, the tape simulator microcomputer 19 reads out the type names of the magnetic tapes stored in the first memory 20, and in step S25, the tape simulator microcomputer 19 displays the thus readout type names of the magnetic tapes on the display screen of the display means in the form of a tape menu screen such as shown in FIG. 15.

Next, in step S26, the magnetic tape used is selected by key operation from among the type names shown in the tape menu. If, in step S27, the selected magnetic tape is found in the tape menu displayed as shown in FIG. 15, then in step S28 the selection of the magnetic tape is determined by key operation. In step S29, the tape simulator microcomputer 19 displays the type name of the selected magnetic tape on the screen as shown in FIG. 16.

Next, in step S30, the tape simulator microcomputer 19 reads out the characteristic data stored in the second memory 21 for the selected magnetic tape. In step S61, based on the characteristic data read out of the second memory 21, the tape simulator microcomputer 19 controls the recording equalizer frequency correction circuit 27 so as to match the selected magnetic tape. The recording equalizer frequency correction circuit 27 then controls the frequency characteristic of the recording equalizer 4 for FM signal recording. Next, in step S32, the tape cassette containing the selected magnetic tape is loaded into the VTR to start the recording of the video signal.

In Embodiment 16, the manufacturer names and type names of frequently-used magnetic tapes and the characteristic data for such magnetic tapes are prestored in the first memory 20 and second memory 21, respectively, and such prestored data are brought onto the screen when selecting the magnetic tape used for recording. With this arrangement, the frequency characteristic of the recording equalizer 4 can be set at the optimum value without having to redo tape simulation for the plurality of magnetic tapes whose data are already stored in memory.

Embodiment 17

Embodiment 17 of the present invention will be described below. The configuration of Embodiment 17 is identical to that shown in FIG. 26, and therefore, the following description deals only with the operation of Embodiment 17. A part of FIG. 35 shows control flow according to this embodiment. In the flowchart of FIG. 35, if, in step S27, the magnetic tape used for recording is not found in the tape menu screen of FIG. 15, the processing routine follows the NO branch of step S27, and in step S33, the tape menu screen, as shown in FIG. 18, is displayed by key operation when there is no relevant tape, and "NO RELEVANT TAPE" is selected. Then, the operation proceeds to step S34.

In step S34, "RECORD UNDER INITIAL SET CONDITION" is displayed on the screen, as shown in FIG. 19, that is displayed when "NO RELEVANT TAPE" is selected, and in the next step S35, the tape simulator microcomputer 19 reads out the initial value data stored in the second memory 21. The operation then proceeds to step S61. In step S61, based on the initial value data, the tape simulator microcomputer 19 controls the recording equalizer frequency correction circuit 27 so that the frequency characteristic of the recording equalizer 4 for FM signal recording is controlled at such a value that does not cause problems for any magnetic tape whose data is stored in the second memory 21.

In this manner, the recording equalizer frequency correction circuit 27 corrects the frequency characteristic of the recording equalizer 4 so that the video signal can be recorded without causing problems for any magnetic tape whose data is stored in the second memory 21. Next, in step S32, the tape cassette containing the selected magnetic tape is loaded into the VTR to start the recording of the video signal.

In Embodiment 17, if the type name of the magnetic tape selected for use is not stored in the first memory 20, the frequency characteristic of the recording equalizer 4 is controlled at such a value that does not cause problems for any magnetic tape whose characteristic data is stored in the second memory 21. Accordingly, the video signal can be recorded in optimum conditions on any kind of magnetic tape.

Embodiment 18

Figure 36A:
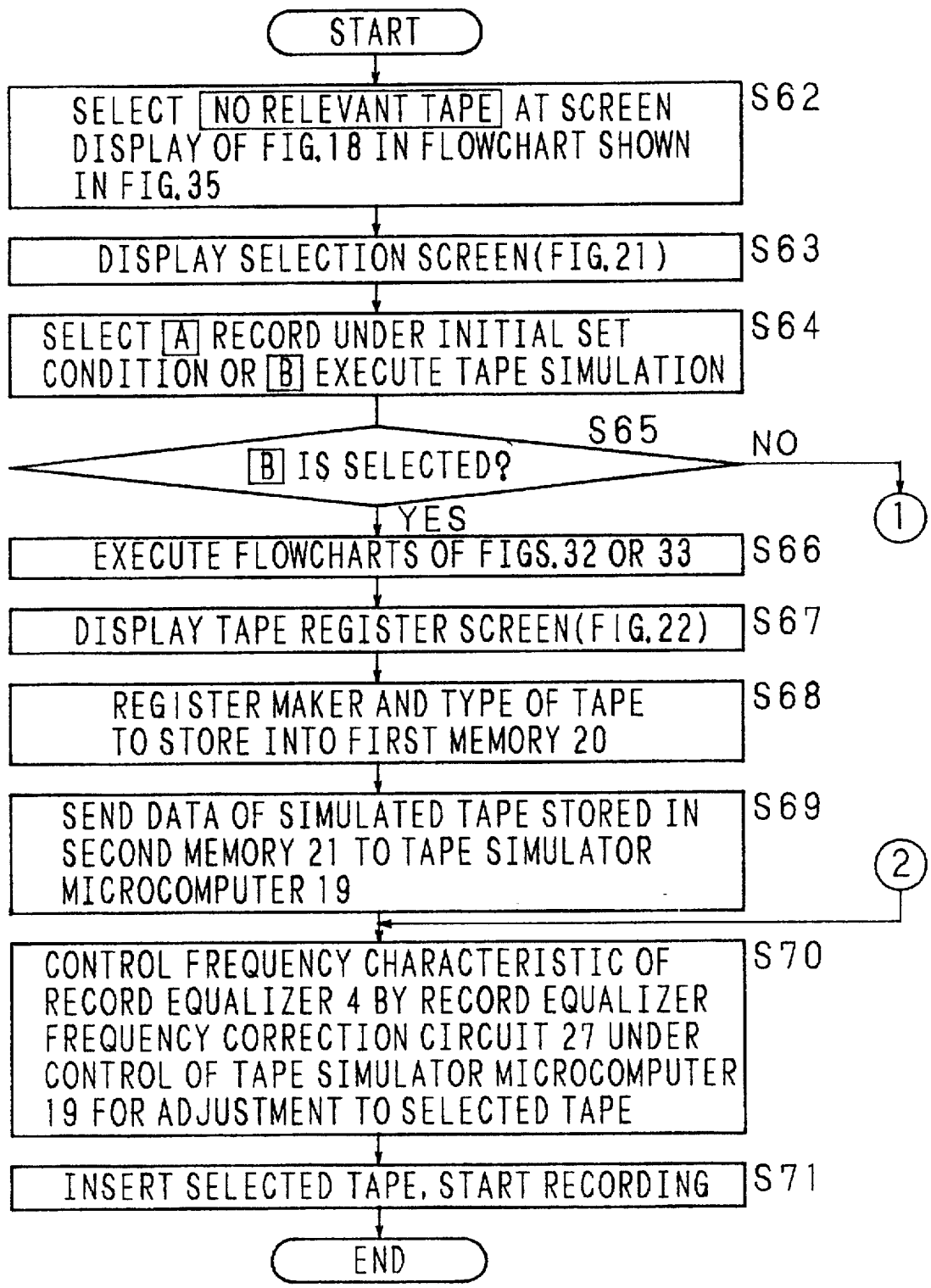
FIG. 36(a) and (b) is a flowchart illustrating a sequence of operations performed in the recording signal control apparatus of the present invention.
Figure 36B:
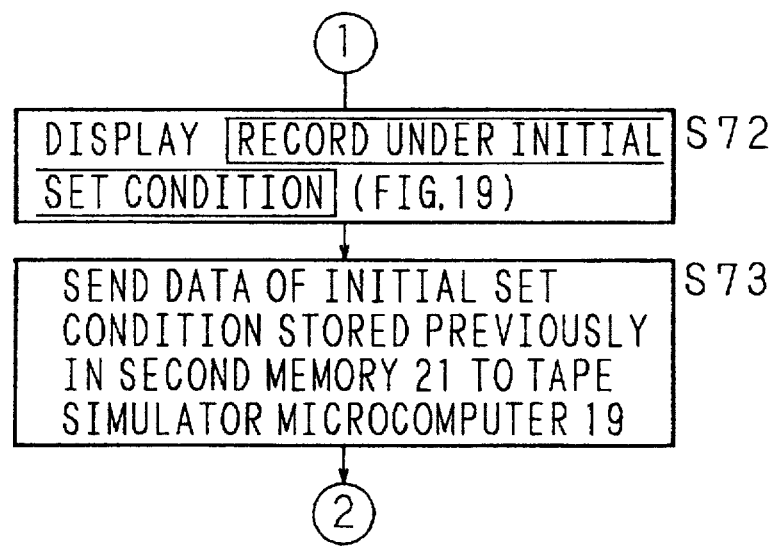

Embodiment 18 of the present invention will be described below. The configuration of this embodiment is also identical to that shown in FIG. 26, and therefore, the following description deals only with the operation of this embodiment. FIG. 36 is a flowchart illustrating a sequence of operations according to Embodiment 18. In step S62, when "NO RELEVANT TAPE" is selected in the flowchart of FIG. 35 from the tape menu screen shown in FIG. 18 which is displayed when there is no relevant tape, then the operation proceeds to step S63 in the flowchart of FIG. 36. In step S63, a screen similar to the one shown in FIG. 21 is displayed, which screen is displayed when "NO RELEVANT TAPE" is selected. In the next step S64, selection is made between [A] RECORD UNDER INITIAL SET CONDITION and [B] EXECUTE TAPE SIMULATION from the display screen shown in FIG. 21.

If it is determined in step S65 that [B] EXECUTE TAPE SIMULATION has been selected, then the processing shown in the flowchart of FIG. 32 is carried out in step S66, that is, the tape simulation of Embodiment 13 is performed. When the tape simulation is completed, a screen similar to the one shown in FIG. 22 is displayed in step S67 prompting for the registration of the manufacturer name and type name of the magnetic tape. In step S68, the manufacturer name and type name of the magnetic tape are stored in the first memory 20.

Next, in step S69, the tape simulator microcomputer 19 reads out the characteristic data of the simulated magnetic tape from the second memory 21, and in step S70, based on the thus readout characteristic data, the tape simulator microcomputer 19 controls the recording equalizer frequency correction circuit 27 so as to match the selected magnetic tape. The recording equalizer frequency correction circuit 27 then controls the frequency characteristic of the recording equalizer 4 so that the selected magnetic tape can record the video signal in optimum conditions.

In the above step S65, if [B] EXECUTE TAPE SIMULATION is not selected, the processing routine follows the NO branch of step S65, and in step S72, "RECORD UNDER INITIAL SET CONDITION" is displayed on the screen, as shown in FIG. 19, which screen is displayed when "NO RELEVANT TAPE" is selected. In step S73, the tape simulator microcomputer 19 reads out the initial value data stored in the second memory 21, after which the processing operations in steps S70 and S71 are carried out.

In Embodiment 18, if the magnetic tape selected for use is not registered, the magnetic tape simulation of Embodiment 13 is carried out to control the frequency characteristic of the recording equalizer 4. Accordingly, the video signal can be recorded with optimum recording conditions.

Embodiment 19

Embodiment 19 of the present invention will be described below. The configuration of this embodiment is also identical to that shown in FIG. 29, and therefore, the following description deals only with the operation of this embodiment. In Embodiment 19, when [B] EXECUTE TAPE SIMULATION is selected in step S65 in the flowchart of FIG. 36 in Embodiment 18, the tape simulation of Embodiment 14 is carried out in step S66. That is, the processing operations shown in the flowchart of FIG. 33 are performed.

In Embodiment 19, if the magnetic tape selected for use is not registered, the magnetic tape simulation of Embodiment 14 is carried out to control the frequency characteristic of the recording equalizer 4. Accordingly, the video signal can be recorded with optimum recording conditions.

Embodiment 20

Embodiment 20 of the present invention will be described below. The configuration of this embodiment is also identical to that shown in FIG. 29, and therefore, the following description deals only with the operation of this embodiment. In Embodiment 20, after the tape simulation is carried out in Embodiment 18 or 19, a screen similar to the one shown in FIG. 22 is displayed in step S67 in the flow-chart of FIG. 36 prompting for the registration of the manufacturer name and type name of the magnetic tape on which rehearsal recording has been performed. In step S68, the manufacturer name and type name of the magnetic tape are entered on this screen to store them into the first memory 20, and the characteristic data of the magnetic tape is added to the data stored in the second memory 21, thus adding to the list of magnetic tapes stored in memory, as shown on the screen of FIG. 23 which displays data newly registered after the tape simulation.

In Embodiment 20, after tape simulation, the manufacturer name and type name of the magnetic tape are stored in the first memory 20 and the characteristic data of the magnetic tape is added to the data stored in the second memory 21, thus adding to the list of magnetic tapes stored in memory and providing a wide selection of magnetic tapes for optimum recording of the video signal while eliminating the need for redoing the tape simulation for such magnetic tapes.

Embodiment 21

Embodiment 21 of the present invention will be described below. The configuration of this embodiment is identical to that shown in FIG. 26, and therefore, the following description deals only with the operation of this embodiment. In Embodiment 21, the tape menu is reordered so that the last used magnetic tape, which is expected to be used most frequently, appears at the top of the menu, such as in the tape menu screen shown in FIG. 24 in which the last designated tape is displayed at the top of the menu as in Embodiments 15 and 16, or in the tape menu screen shown in FIG. 25 in which the magnetic tape used for simulation is displayed at the top of the menu as in Embodiment 20.

Thus, in Embodiment 21, since the tape menu is reordered so that the last used magnetic tape, which is expected to be used most frequently, is displayed at the top of the menu, magnetic tapes of higher probabilities of use are displayed at higher positions on the menu for easier selection.

Embodiment 22

Figure 37:
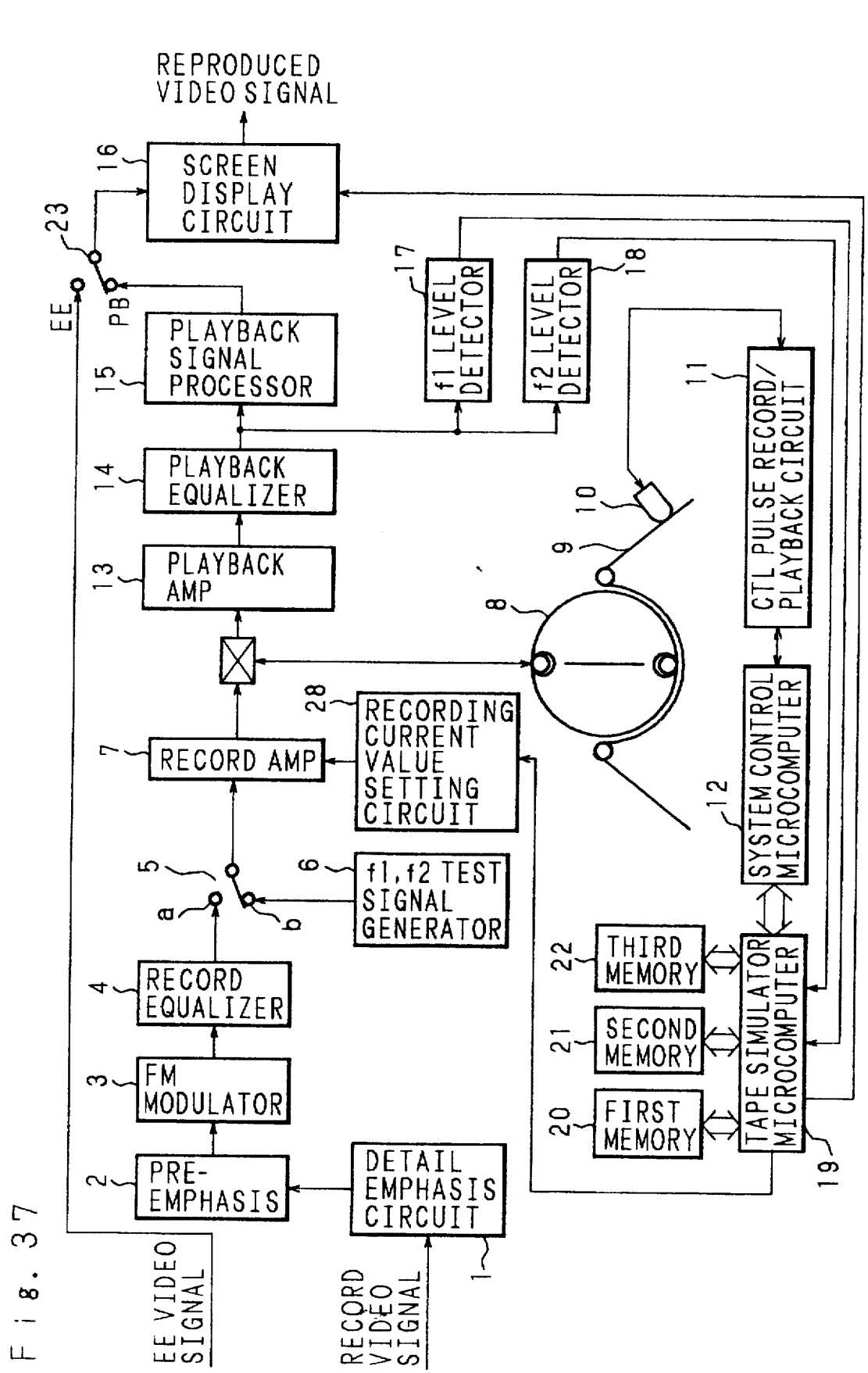
FIG. 37 is a block diagram showing the configuration of a further recording signal control apparatus according to the present invention.

Embodiment 22 of the present invention will be described below. FIG. 37 is a block diagram showing the configuration of Embodiment 22. In FIG. 37, the same or corresponding parts as those shown in FIG. 4 are designated by the same reference numerals to avoid repeated explanation of such parts, and the following description focuses on differences from the configuration of FIG. 4. As can be seen from the comparison between FIG. 37 and FIG. 4, the configuration of FIG. 37 is different from that of FIG. 4 in that a recording current value setting circuit 28 is added; in Embodiment 22, the tape simulator microcomputer 19 does not control the detail emphasis circuit 1, but instead, controls the recording current value setting circuit 28 which in turn controls the gain of the recording amplifier 7. In other respects, the configuration of this embodiment is the same as that shown in FIG. 4.

Figure 38:
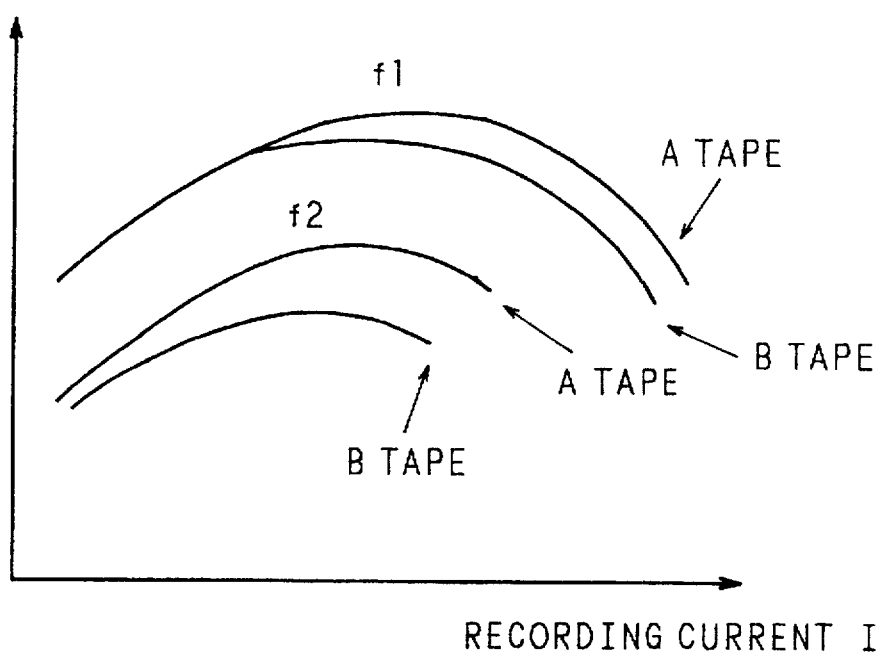
FIG. 38 is a characteristic diagram showing the difference in recording current characteristic between two magnetic tapes.
Figure 39:
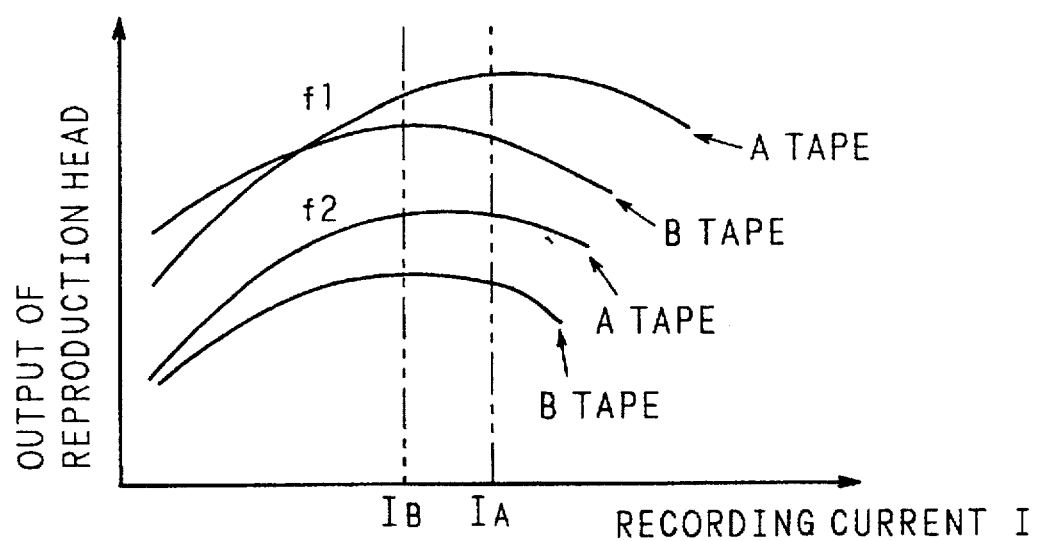
FIG. 39 is a characteristic diagram showing the difference in recording current characteristic between the two magnetic tapes after passing through the recording equalizer set at the standard frequency characteristic.

FIG. 38 is a recording current characteristic diagram showing the playback head output versus the recording current for the f1 and f2 test signals recorded on the previously mentioned tapes A and B. FIG. 39 is a recording current characteristic diagram showing the recording current characteristic after the f1 and f2 test signals are passed through the recording equalizer 4 having the standard frequency characteristic shown in FIG. 27.

Figure 41:
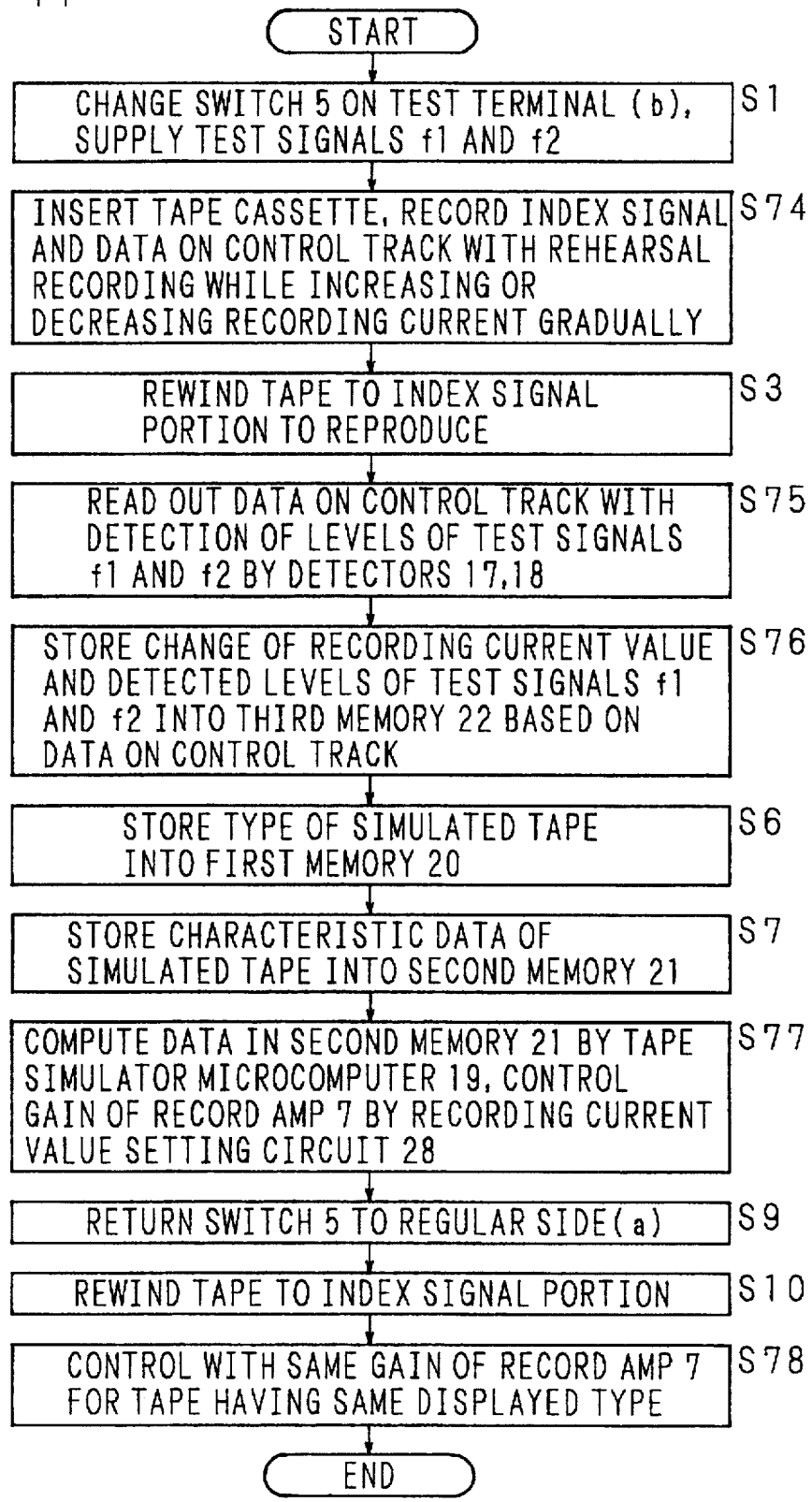
FIG. 41 is a flowchart illustrating a sequence of operations performed in the recording signal control apparatus of the present invention.

The operation of this embodiment will now be described. Tuning buttons (not shown) are provided on the front panel of the VTR body. Before recording, i.e., after a tape cassette has been loaded into the VTR, the user operates these tuning buttons in accordance with which a sequence of operations illustrated in the flowchart of FIG. 41 are performed under control of the tape simulator microcomputer 19 to detect the optimum recording conditions for the magnetic tape. The operation of this embodiment will be described in accordance with the flowchart of FIG. 41 wherein the same processing steps as those in FIG. 12 which shows control flow in Embodiment 1 are designated by the same step numbers as used in FIG. 12 and explanation of such processing steps are not given in the following description.

In step S1 in the flowchart of FIG. 41, at the start of rehearsal recording the moving terminal of the switch 5 is set to contact the fixed terminal "b" so that the f1 and f2 test signals from the f1/f2 test signal generator 6 are applied to the fixed terminal "b". Next, in step S74, the tape cassette is loaded into the VTR, and the tape simulator microcomputer 19 controls the recording current value setting circuit 28 by which the gain of the recording amplifier 7 is gradually increased or decreased to vary the recording current value for the plurality of test signals fed from the f1/f2 test signal generator 6. At the same time, in correspondence to the change of the recording current value, the CTL pulse record/playback circuit 11 under control of the system control microcomputer 12 generates an index signal corresponding to the recording current value and the index signal is thus recorded on the magnetic tape 9 by the control head 10 with the prescribed timing.

Next, in step S3, after recording for a length of time necessary for the measurement of the magnetic tape performance, the magnetic tape 9 is rewound to the recording start index signal position, and played back. The f1 and f2 test signals played back in this step are amplified by the playback amplifier 13 and fed to the playback equalizer 14 where signals having the frequency spectra f1 and f2 shown in FIG. 7 or 8 are extracted. In the next step S75, the f1 test signal level is detected by the f1 level detector 17 and the f2 test signal level detected by the f2 level detector 18. At the same time, the index signal indicating the recording current value that was applied for the recording is read from the control track on the magnetic tape 9 by the control head 10, and supplied, via the CTL pulse record/playback circuit 11 and the system control microcomputer 12, to the tape simulator microcomputer 19.

The tape simulator microcomputer 19 is also supplied with the f1 and f2 test signal levels detected by the f1 level detector 17 and f2 level detector 18, respectively. In step S76, the tape simulator microcomputer 19 stores the f1 and f2 test signal levels into the third memory 22 along with the recording current change read from the control track data.

When the above simulation is completed, the recording current characteristics for the f1 and f2 test signals, stored in the third memory 22, will be as shown in FIG. 38. If frequency characteristic corrections are made by the recording equalizer 4, the obtained data will be as shown in FIG. 39 i.e., the recording current characteristics after passing through the recording equalizer of standard frequency characteristic. For example, in FIG. 39, the O.R.C. value for tape A is IA, and the O.R.C. value for tape B is IB.

Next, in step S6, the type name of the measured magnetic tape 9 is entered which is then stored by the tape simulator microcomputer 19 into the first memory 20, and in step S7, the O.R.C. value for the magnetic tape 9 is stored into the second memory 21. In the next step S77, the tape simulator microcomputer 19 performs operations on the data stored in the second memory 21, i.e. on the result of the simulation of the magnetic tape 9, and thereby controls the recording current value setting circuit 28. The recording current value setting circuit 28 then controls the gain of the recording amplifier 7 at the optimum value for FM signal recording.

Then, the same steps S9 and S10 as illustrated in the flowchart of FIG. 12 are followed. Thereafter, in step S78, the gain of the recording amplifier 7 is controlled at the same value for all magnetic tapes whose type name displayed is the same as that of the magnetic tape whose data has just been stored.

As described, in Embodiment 22, the tape simulator microcomputer 19 controls the recording current value setting circuit 28 which in turn controls the gain of the recording amplifier 7 to vary the recording current value for the f1 and f2 test signals for recording on the magnetic tape 9, and in correspondence to the change of the recording current value, an index signal is recorded. The magnetic tape 9 is rewound to play back the recorded f1 and f2 test signals the levels of which are then stored in the third memory 22 along with their associated index signal. Based on the data stored in the second memory 21 concerning the result of the simulation of the magnetic tape 9, the tape simulator microcomputer 19 controls the recording current value setting circuit 28 to control the gain of the recording amplifier 7 at the optimum value. This optimizes video signal recording conditions for the selected magnetic tape.

Embodiment 23

Embodiment 23 of the present invention will be described below. The configuration of Embodiment 23 is identical to that shown in FIG. 37, and therefore, the following description deals only with the operation of this embodiment with reference to the flowchart of FIG. 43. Embodiment 23 provides the same features as those described in Embodiment 22, the only difference being that in Embodiment 23, the rehearsal recording is carried out with the magnetic tape 9 held at a stop position.

Figure 42:
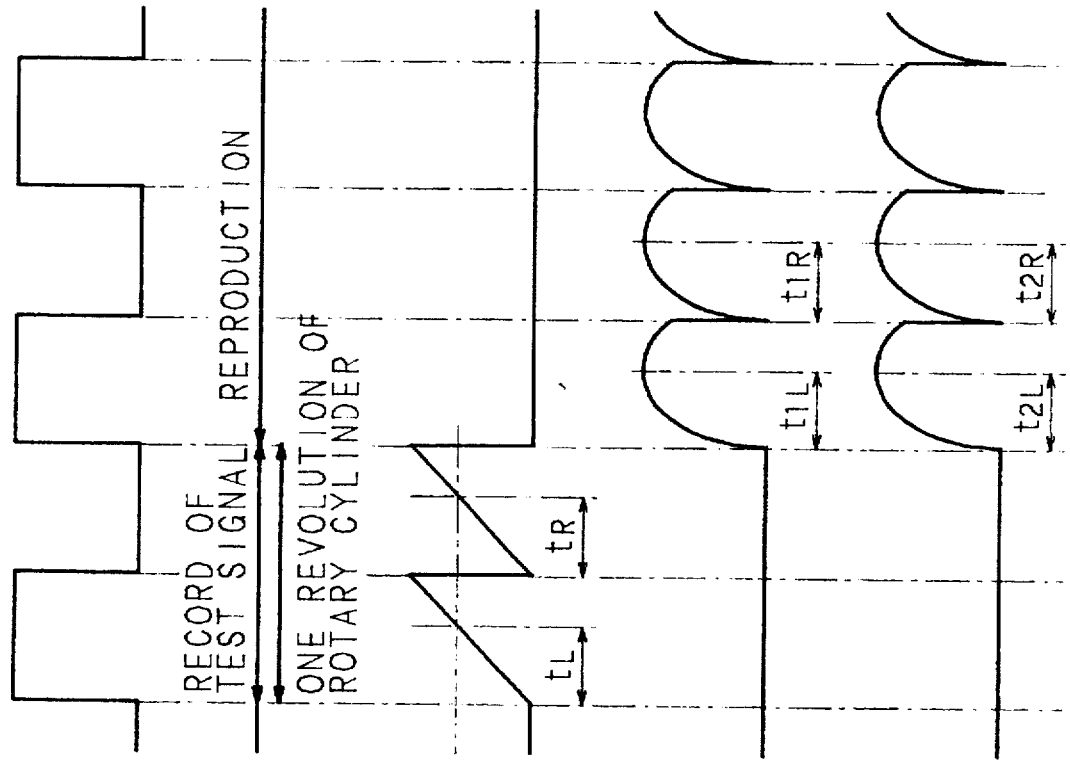
FIGS. 42(a) to 42(e) are timing diagrams for rehearsal recording/playback performed with the magnetic tape held at a stop position.

FIG. 42 shows the timings of rehearsal recording and playback that are performed with the magnetic tape 9 held at a stop position: FIG. 42(a) shows the change-over timing of the rotating magnetic head 8; FIG. 42(b) shows the record/playback mode change-over timing corresponding to the change-over timing of the rotating magnetic head 8; FIG. 42(c) shows the variation of the recording current value in record mode; FIG. 42(d) shows the variation of the f1 test signal level in playback mode; and FIG. 42(e) shows the variation of the f2 test signal level in playback mode.

Figure 43:
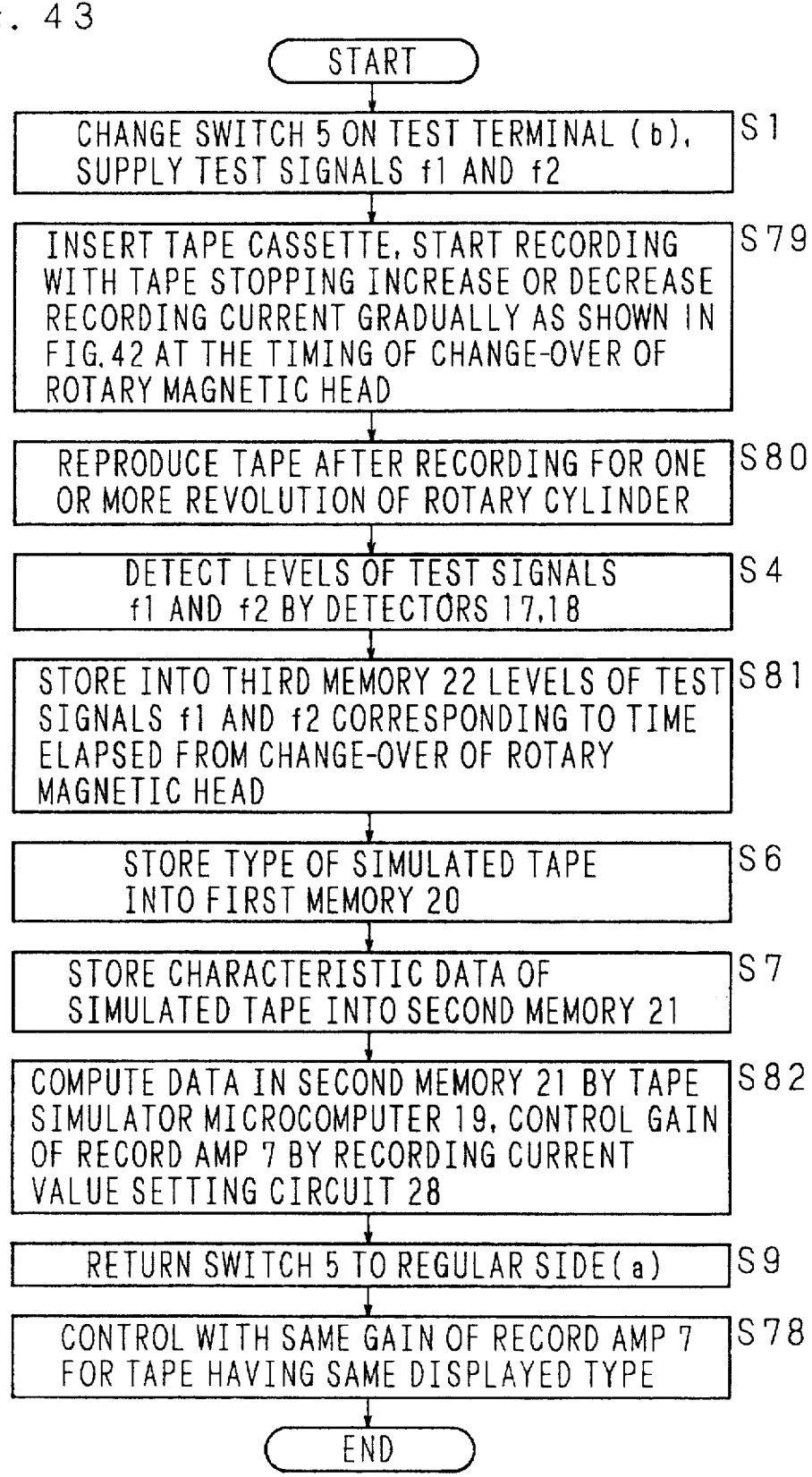
FIG. 43 is a flowchart illustrating a sequence of operations performed in the recording signal control apparatus of the present invention.

The operation of Embodiment 23 will now be described. In the flowchart of FIG. 43, the same processing steps as those in the flowchart of FIG. 12 are designated by the same step numbers. First, in step S1 in the flowchart of FIG. 43, the moving terminal of the switch 5 is set to contact the fixed terminal "b" to which the f1 and f2 test signals are applied from the f1/f2 test signal generator 6.

Next, in step S79, the tape cassette is loaded into the VTR, and recording of the f1 and f2 test signals is started with the magnetic tape 9 held at a stop position. The recording current is gradually increased or decreased, as shown in FIG. 42, the timing being synchronized with the change-over timing of the rotating magnetic head 8. That is, the test signals are recorded while varying the recording current as shown in FIG. 42(c), during one revolution period of the rotating cylinder.

After the recording is completed, that is, after the rotating cylinder makes at least one revolution for recording, the f1 and f2 test signals are played back in step S80. Next, in step S4, the f1 and f2 test signals are passed through the playback amplifier 13 and the playback equalizer 14, and then fed to the f1 level detector 17 and the f2 level detector 18 where the levels of the respective test signals are detected. The detector outputs are supplied to the tape simulator microcomputer 19. In step S81, the tape simulator microcomputer 19 stores into the third memory 22 the data representing the variations in the playback levels of the f1 and f2 test signals, shown in FIGS. 42(d) and 42(e), measured along the time with the rotating magnetic head change-over timing shown in FIG. 42(a) as the start point.

Using the measured data, the tape simulator microcomputer 19 finds elapsed times, t1L, t1R, t2L, and t2R, elapsed from the rotating magnetic head change-over timing until the playback level becomes optimum, and from these elapsed times, the tape simulator microcomputer 19 calculates elapsed times, t1 and t2, elapsed from the rotating magnetic head change-over timing, and the recording current value O.R.C. at each of the elapsed times.

Next, in step S6, the type name of the magnetic tape 9 is entered on the screen and stored in the first memory 20, and in step S7, the O.R.C. data of the magnetic tape 9 is stored in the second memory 21. In the next step S82, the tape simulator microcomputer 19 performs operations on the simulation result of the magnetic tape 9 stored in the second memory 21, and thereby controls the recording current value setting circuit 28 to set the gain of the recording amplifier 7 at the optimum value for FM signal recording.

In FIG. 42, the recording period of the f1 and f2 test signals is made equal to one revolution period of the rotating cylinder, but the recording period may be made longer than one revolution period of the rotating cylinder as necessary.

Next, in step S9, the moving terminal of the switch 5 is moved back to the fixed terminal "a" side. Thereafter, in step S78, the gain of the recording amplifier 7 is controlled at the same value for all magnetic tapes whose type name displayed is the same as the magnetic tape whose data has just been stored.

In Embodiment 23, since rehearsal recording is carried out with the magnetic tape 9 held at a stop position, the characteristic data of the magnetic tape can be measured in a shorter period of time.

Embodiment 24

Figure 44:
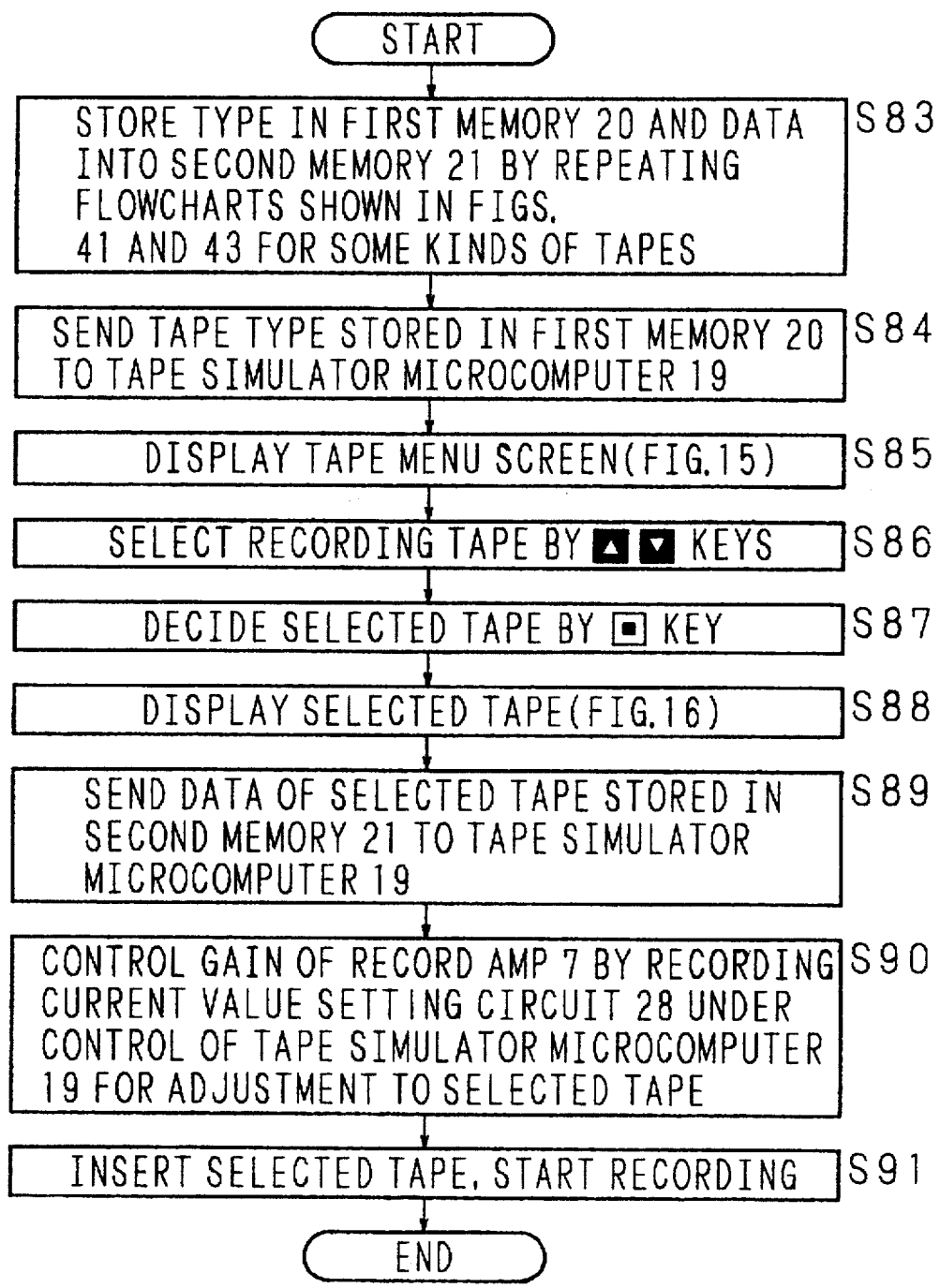
FIG. 44 is a flowchart illustrating a sequence of operations performed in the recording signal control apparatus of the present invention.

Embodiment 24 of the present invention will be described below. The configuration of this embodiment is identical to that shown in FIG. 37, and therefore, the following description deals only with the operation of this embodiment with reference to the flowchart shown in FIG. 44. As can be seen from the flowchart of FIG. 44, in Embodiment 24 the processing operations described in Embodiments 22 and 23 are repeated a number of times in step S83, thereby successively storing the type names of magnetic tapes into the first memory and their associated characteristic data into the second memory 21. Next, in step S84, the tape simulator microcomputer 19 reads out the type names of magnetic tapes stored in the first memory 20, and in step S85, displays a tape menu screen, such as shown in FIG. 15, on the display means. In step S86, the type name of the magnetic tape used is selected by key operation from among the type names of magnetic tapes displayed on the display means.

Further, in step S87, the selection of the magnetic tape used is determined by key operation, and in step S88, the type name of the selected magnetic tape is displayed on the display means as shown in FIG. 16. In the next step S89, the tape simulator microcomputer 19 reads out the characteristic data of the magnetic tape from the second memory 21. In step S90, based on the thus readout characteristic data, the tape simulator microcomputer 19 controls the recording current value setting circuit 28 so as to match the selected magnetic tape. The recording current value setting circuit 28 then controls the gain of the recording amplifier 7 at the optimum value for the selected magnetic tape displayed on the screen.

Next, in step S91, the tape cassette containing the selected magnetic tape is loaded into the VTR to start the recording of the video signal.

Thus, in Embodiment 24, rehearsal recording of the f1 and f2 test signals is repeated to successively store the type names of magnetic tapes into the first memory 20, from which a particular magnetic tape is selected, and the tape simulator microcomputer 19 reads out the characteristic data of the selected magnetic tape from the second memory 21 and thereby controls the recording current value setting circuit 28 to control the gain of the recording amplifier 7 for optimum recording on the selected magnetic tape displayed on the screen.

Embodiment 25

Figure 45A:
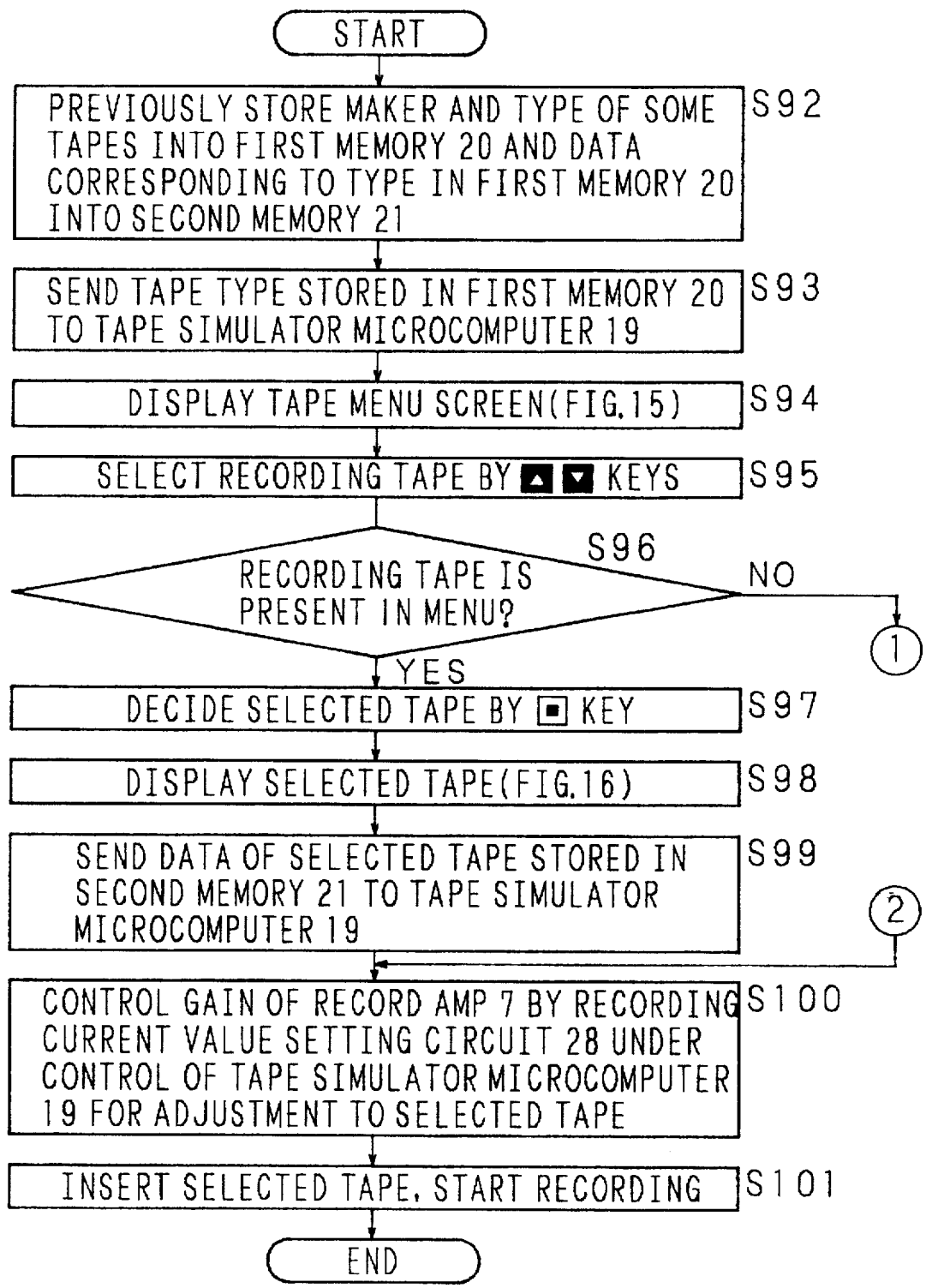
FIG. 45(a) and (b) is a flowchart illustrating a sequence of operations performed in the recording signal control apparatus of the present invention.
Figure 45B:
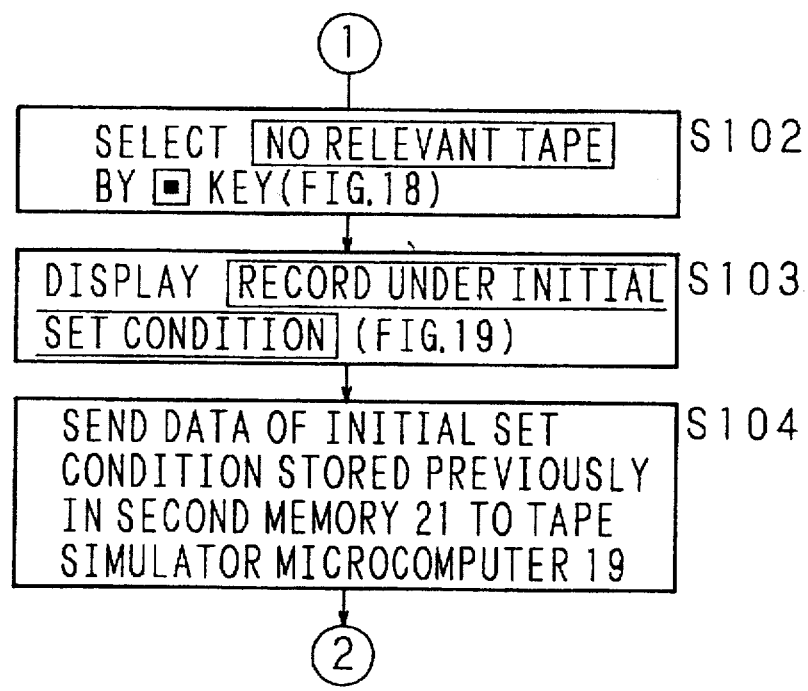

Embodiment 25 of the present invention will be described below. The configuration of this embodiment is also identical to that shown in FIG. 37, and therefore, the following description deals only with the operation of this embodiment. FIG. 45 is a flowchart illustrating a sequence of operations according to Embodiment 25. In step S92 in FIG. 45, the manufacturer names and type names of a plurality of magnetic tapes are stored into the first memory 20 and their associated characteristic data into the second memory 21. Next, in step S93, the tape simulator microcomputer 19 reads the type names of the plurality of magnetic tapes from the first memory 20, and in step S94, displays a tape menu screen, similar to the one shown in FIG. 15, showing the type names of the plurality of magnetic tapes.

Next, in step S95, the magnetic tape used for recording is selected by key operation from among the plurality of magnetic tapes displayed on the tape menu screen, and in step S96, it is determined whether the selected magnetic tape is found in the tape menu; if the selected magnetic tape is found in the tape menu, the operation proceeds to step S97 where the selection of the magnetic tape is determined by key operation.

When the selection of the magnetic tape is determined, the type name of the magnetic tape selected from the tape menu is displayed on the screen of the display means, as shown in FIG. 16, and the operation proceeds to step S99. In step S99, the tape simulator microcomputer 19 reads the characteristic data of the selected magnetic tape from the second memory 21, and in step S100, the tape simulator microcomputer 19 controls the recording current value setting circuit 28 so as to match the selected magnetic tape, thereby controlling the gain of the recording amplifier 7 at the optimum value for the selected magnetic tape whose type name is displayed on the screen as shown in FIG. 16.

After the gain of the recording amplifier 7 is controlled in this manner, the tape cassette containing the selected magnetic tape is loaded into the VTR in step S101, for recording of the video signal.

Thus, in Embodiment 25, the manufacturer names and type names of frequently-used magnetic tapes are prestored in the first memory 20 and the characteristic data of such magnetic tapes are prestored in the second memory 21; the type names of such magnetic tapes are displayed on the screen, from which the magnetic tape used for recording is selected, and the characteristic data of the selected magnetic tape is read out of the second memory 21, based on which data the tape simulator microcomputer 19 controls the recording current value setting circuit 28 to control the gain of the recording amplifier 7 so that optimum recording can be made on the selected magnetic tape.

Embodiment 26

Embodiment 26 of the present invention will be described below. This embodiment also has the same configuration as that shown in FIG. 37, and therefore, the following description deals only with the operation of this embodiment with reference to the flowchart of FIG. 45. In the flowchart of FIG. 45, if it is determined in step S96 that the magnetic tape used for recording is not found in the tape menu screen of FIG. 15 displayed in step S94, the processing routine follows the NO branch of step 96 and proceeds to carry out steps S102 through S104. Embodiment 26 is concerned with the processing operations carried out in these steps.

In step S102, "NO RELEVANT TAPE" is selected from the tape menu screen shown in FIG. 18 which is displayed when there is no relevant tape. In step 103, "RECORD UNDER INITIAL SET CONDITION" is displayed on the screen shown in FIG. 19 which is displayed when "NO RELEVANT TAPE" is selected. Then, in step S104, the tape simulator microcomputer 19 controls the recording current setting circuit 28 to control the gain of the recording amplifier 7 at such a value that does not cause problems for any magnetic tape whose characteristic data is stored in the second memory 21. Thereafter, the processing operations in steps S100 and S101 are performed.

Thus, in Embodiment 26, when the magnetic tape used for recording is not found in the tape menu screen, the tape simulator microcomputer 19 controls the recording current value setting circuit 28 to control the gain of the recording amplifier 7 at such a value that does not cause problems for any magnetic tape whose characteristic data is stored in the second memory 21. This ensures optimum recording of the video signal on any magnetic tape even if the data of the magnetic tape is not stored in memory.

Embodiment 27

Figure 46A:
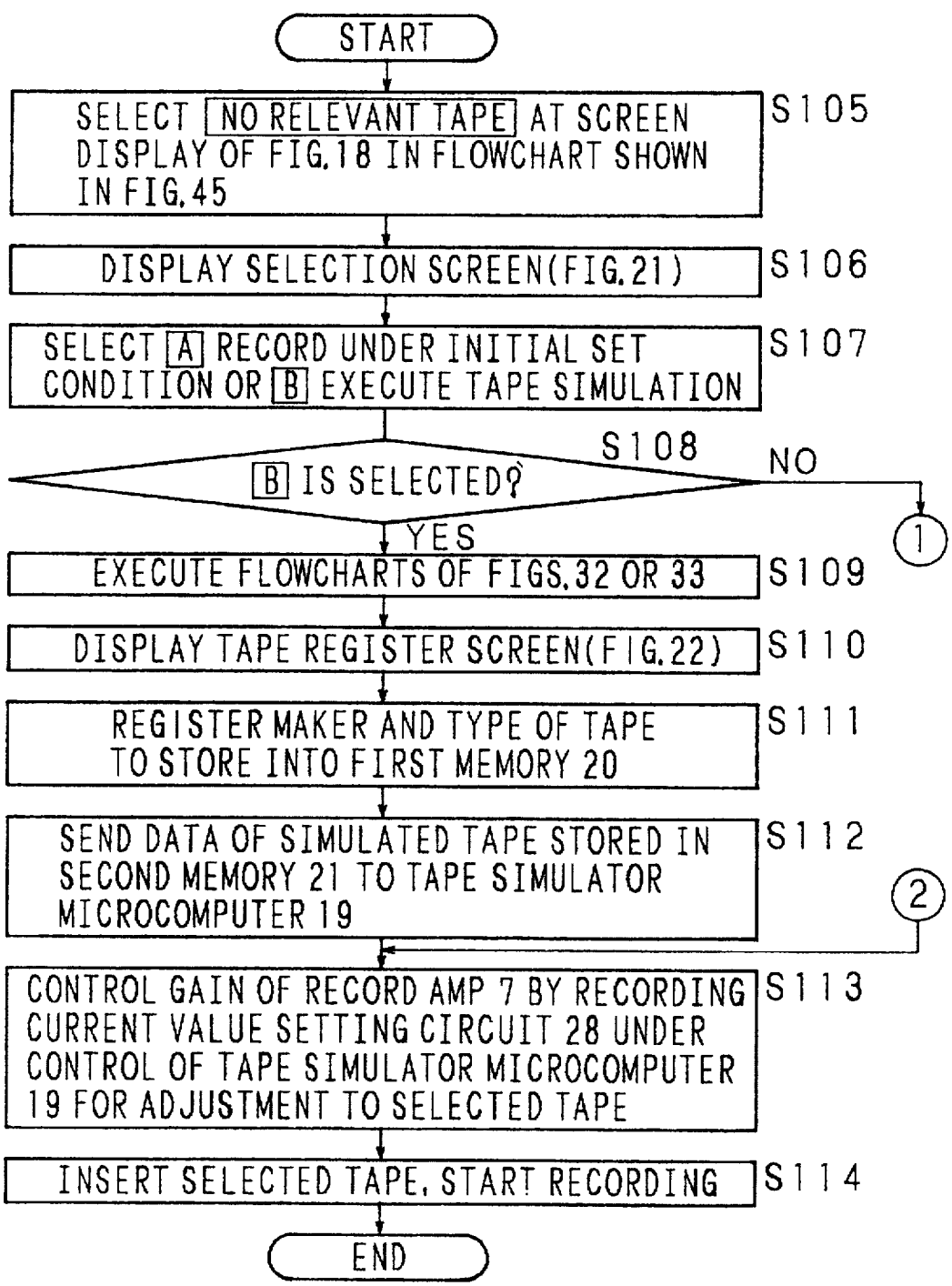
FIG. 46(a) and (b) is a flowchart illustrating a sequence of operations performed in the recording signal control apparatus of the present invention.
Figure 46B:
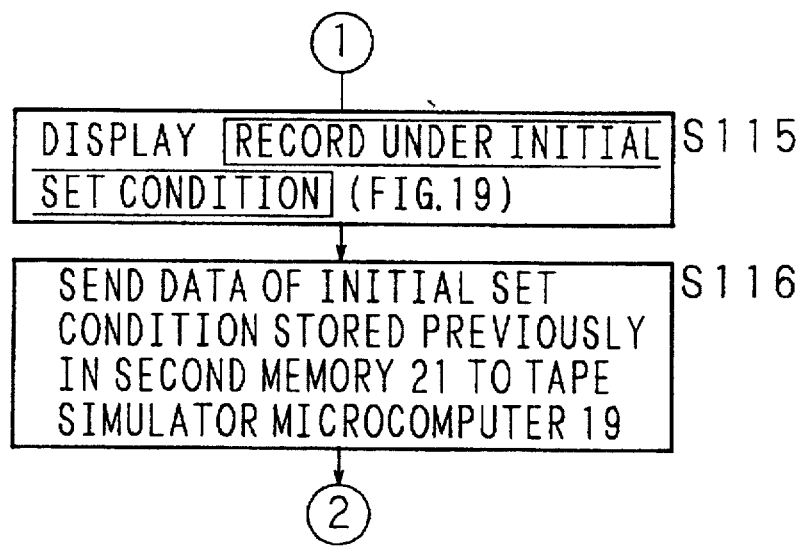

Embodiment 27 of the present invention will be described below. The configuration of this embodiment is also identical to that shown in FIG. 37, and therefore, the following description deals only with the operation of this embodiment with reference to the flowchart of FIG. 46. In step S105 in the flowchart of FIG. 46, when "NO RELEVANT TAPE" is selected from the screen display of FIG. 18 in step S102 in the flowchart of FIG. 45, the operation proceeds to step S106 where a screen is displayed, similar to the one shown in FIG. 21, which is displayed when "NO RELEVANT TAPE" is selected. In the next step S107, either [A] RECORD UNDER INITIAL SET CONDITION, as in the foregoing Embodiment 26, or [B] EXECUTE TAPE SIMULATION is selected.

Next, in step S108, if it is determined that [B] EXECUTE TAPE SIMULATION has been selected, the operation proceeds to step S109 where the tape simulation of Embodiment 22 illustrated in the flowchart of FIG. 32 is carried out. On the other hand, in step S108, if it is determined that [B] EXECUTE TAPE SIMULATION has not been selected, the processing routine follows the NO branch of step S108 and proceeds to step S115 where "RECORD UNDER INITIAL SET CONDITION" is displayed on the screen, similar to the one shown in FIG. 19 which is displayed when "NO RELEVANT TAPE" is selected.

Next, in step S116, the tape simulator microcomputer 19 reads out the initial value data stored in the second memory 21, and in step S113, the tape simulator microcomputer 19 controls the recording current value setting circuit 28 to control the gain of the recording amplifier 7 so as to match the selected magnetic tape. Then, in step S114, the tape cassette containing the selected magnetic tape is loaded into the VTR for recording of the video signal.

In Embodiment 27, when the selected magnetic tape is not found in the menu, simulation is performed for the selected data; the tape simulator microcomputer 19 then reads out the characteristic data of the magnetic tape stored in the second memory 21 and controls the recording current value setting circuit 28 to control the gain of the recording amplifier 7 so that the video signal can be recorded with optimum conditions that match the characteristic of the magnetic tape.

Embodiment 28

Embodiment 28 of the present invention will be described below. The configuration of this embodiment is also identical to that shown in FIG. 37, and therefore, the following description deals only with the operation of this embodiment with reference to the flowchart of FIG. 46. In Embodiment 28, when [B] EXECUTE TAPE SIMULATION is selected in step S108 in the flowchart of FIG. 46, the processing operations illustrated in the flowchart of FIG. 33, i.e. the tape simulation of Embodiment 23, is carried out.

In Embodiment 28, when the selected magnetic tape is not found in the menu, simulation is performed for the selected magnetic tape; the tape simulator microcomputer 19 then reads the characteristic data of the magnetic tape from the second memory 21 and controls the recording current value setting circuit 28 to control the gain of the recording amplifier 7 so that the video signal can be recorded with optimum conditions that match the selected magnetic tape.

Embodiment 29

Embodiment 29 of the present invention will be described below. This embodiment also has the same configuration as that shown in FIG. 37, and therefore, the following description deals only with the operation of this embodiment with reference to the flowchart of FIG. 46. After rehearsal recording in step S109 in the flowchart of FIG. 46 in accordance with Embodiment 27 or 28, the display means displays, in step S110 in the flowchart of FIG. 46, a screen for entering the manufacturer name and type name of the magnetic tape, similar to the one shown in FIG. 22 which is displayed when the tape simulation is completed. In step S111, the manufacturer name and type name are entered on the screen and stored into the first memory 20.

Next, in step S112, the characteristic data of the magnetic tape is added to the data stored in the second memory 21, and a screen similar to the one shown in FIG. 23 is displayed which shows the registration of newly added data after tape simulation, thus adding to the list of magnetic tapes stored in memory. The tape simulator microcomputer 19 reads out the characteristic data of the just simulated magnetic tape from the second memory 21.

In step S113, the tape simulator microcomputer 19 controls the recording current value setting circuit 28 to control the gain of the recording amplifier 7 so as to match the selected magnetic tape. Then, in step S114, the tape cassette containing the selected magnetic tape is loaded into the VTR for recording of the video signal.

Thus, in Embodiment 29, upon completion of the tape simulation, the manufacturer name and type name of the magnetic tape used for the rehearsal recording are stored into the first memory 20, and its associated characteristic data is added to the data stored in the second memory 21, thus adding to the list of magnetic tapes stored in memory. This arrangement allows the gain of the recording amplifier to be set at the optimum value for recording of the video signal without having to redo the simulation for a variety of magnetic tapes.

Embodiment 30

Embodiment 30 of the present invention will be described below. This embodiment also has the same configuration as that shown in FIG. 37, and therefore, the following description deals only with the operation of this embodiment. In Embodiment 30, the tape menu is reordered so that the last used magnetic tape, which is expected to be used most frequently, appears at the top of the menu, such as in the tape menu screen shown in FIG. 24 in which the last designated tape is displayed at the top of the menu as in Embodiments 24 and 25, or in the tape menu screen shown in FIG. 25 in which the magnetic tape used for simulation is displayed at the top of the menu as in Embodiment 29.

Thus, in Embodiment 30, since the tape menu is reordered so that the last used magnetic tape appears at the top of the menu, magnetic tapes of higher probabilities of use are displayed at higher positions on the menu for easier selection.

Embodiment 31

Figure 47:
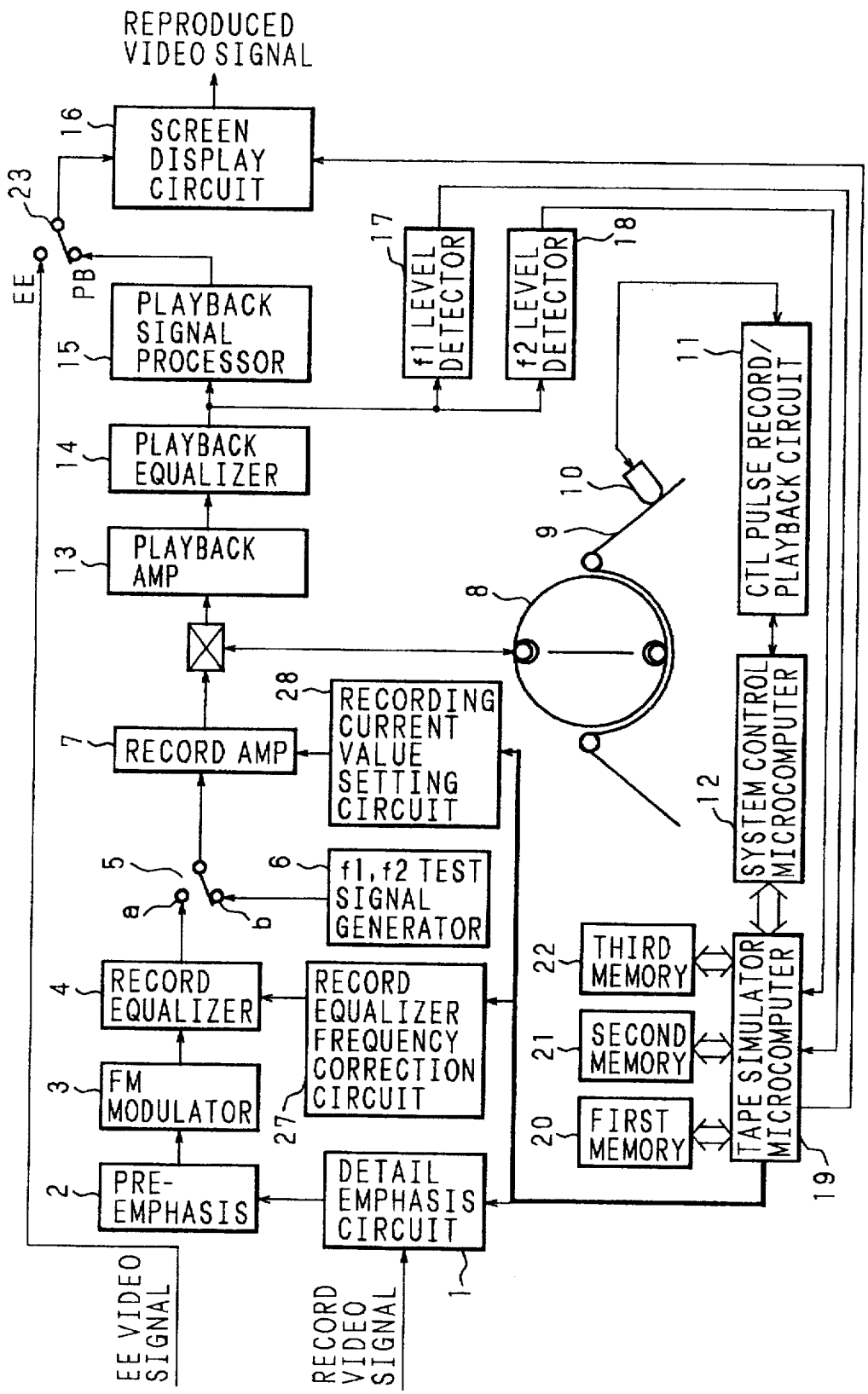
FIG. 47 is a block diagram showing the configuration of a yet further recording signal control apparatus according to the present invention.

Embodiment 31 of the present invention will be described below. FIG. 47 is a block diagram showing the configuration of Embodiment 31. In FIG. 47, the same parts as those shown in FIG. 4 are designated by the same reference numerals, and explanation of such parts are not given herein. The following description focuses on differences from the configuration of FIG. 4. In the configuration of FIG. 47, the tape simulator microcomputer 19 controls the detail emphasis circuit 1, the recording equalizer frequency correction circuit 27, and the recording current value setting circuit 28. Otherwise, the configuration is the same as that of FIG. 4.

Next, the operation of Embodiment 31 will be described below. Tuning buttons are provided on the front panel of the VTR body. Before recording, i.e., after a tape cassette has been loaded into the VTR, the user operates these tuning buttons in accordance with which a sequence of operations illustrated in the flowchart of FIG. 41 are performed under control of the tape simulator microcomputer 19 to detect the optimum recording conditions for the magnetic tape.

When controlling the recording current value and detail emphasis amount for signal recording, the processing operations illustrated in the flowchart of FIG. 41 are combined with the steps in the flowchart of FIG. 12 that relate to the control of the detail emphasis amount. Likewise, when controlling the recording current value and the frequency characteristic of the recording equalizer, the processing operations illustrated in the flowchart of FIG. 41 are combined with the steps in the flowchart of FIG. 32 that relate to the control of the frequency characteristic of the recording equalizer 4. On the other hand, when controlling the detail emphasis amount and the frequency characteristic of the recording equalizer 4, the processing operations illustrated in the flowchart of FIG. 12 are combined with the steps in the flowchart of FIG. 32 that relate to the control of the frequency characteristic of the recording equalizer 4. Multiple control operations are thus performed in Embodiment 31.

Furthermore, when all the three factors, i.e. the recording current value, the detail emphasis amount, and the frequency characteristic of the recording equalizer 4, are to be controlled for signal recording, the processing operations illustrated in the flowchart of FIG. 41 are combined with the steps in the flowchart of FIG. 12 that relate to the control of the detail emphasis amount and also with the steps in the flowchart of FIG. 32 that relate to the control of the frequency characteristic of the recording equalizer 4.

Of the above processing operations, the same operations as described in Embodiments 1, 13, and 22 are not be described here.

Figure 40:
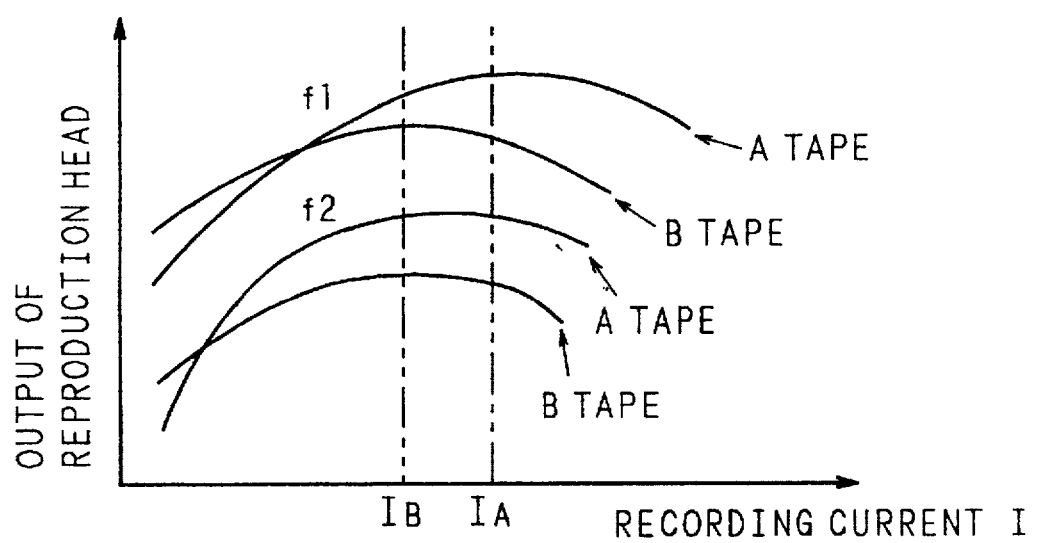
FIG. 40 is a characteristic diagram showing the difference in recording current characteristic between the two magnetic tapes after correction of the recording equalizer.

When the simulation is completed, the recording current characteristics for the f1 and f2 test signals, stored in the third memory 22, will be as shown in FIG. 38. If frequency characteristic corrections are made by the recording equalizer 4, the obtained data will be as shown in FIG. 39, i.e., the recording current characteristics after passing through the recording equalizer of standard frequency characteristic. For example, in FIG. 39, the O.R.C. value for tape A is IA, and the O.R.C. value for tape B is IB. Furthermore, by controlling the frequency characteristic of the recording equalizer 4, the obtained data will be as shown in FIG. 40, i.e., the optimum recording current characteristics obtained after correction of the recording equalizer 4, the characteristics being controlled at O.R.C., i.e. at IA and IB, at both frequencies of the f1 and f2 test signals.

At the same time that the type name of the magnetic tape 9 is entered on the screen and stored into the first memory 20, the data of the magnetic tape 9 obtained from the plurality of control means are stored in the second memory 21. Based on the data stored in the second memory 21 concerning the result of the simulation of the magnetic tape 9, the tape simulator microcomputer 19 controls the detail emphasis circuit 1 and/or the recording equalizer frequency correction circuit 27 and/or the recording current setting circuit 28; thus, the amount of emphasis that the detail emphasis circuit 1 applies for video signal recording, the frequency characteristic of the recording equalizer 4, and the gain of the recording amplifier 7 for FM signal recording are controlled at the respective optimum values all at the same time or in any combination thereof.

Thus, in Embodiment 31, based on the data stored in the second memory 31 concerning the result of the simulation of the magnetic tape 9, the tape simulator microcomputer 19 controls the detail emphasis circuit 1, the recording equalizer frequency correction circuit 27, and the recording current setting circuit 28, all at the same time or singly or in any desired combination thereof. This not only prevents magnetic reversion and improves the signal-to-noise ratio for a poor performance magnetic tape, but provides a sufficient margin to magnetic reversion in the case of a high performance magnetic tape even if recording is done with finer details.

Embodiment 32

Embodiment 32 of the present invention will be described below. The configuration of this embodiment is identical to that shown in FIG. 47, and therefore, the following description deals only with the operation of this embodiment. Embodiment 32 provides the same features as those described in Embodiment 31, the only difference being that in Embodiment 32, the rehearsal recording is carried out with the magnetic tape held at a stop position. The rehearsal recording operations are the same as described in Embodiment 23, and therefore, will not be explained here.

Thus, in Embodiment 32, since the rehearsal recording is carried out with the magnetic tape held at a stop position, the characteristic data of the magnetic tape can be measured in a shorter period of time.

Embodiment 33

Embodiment 33 of the present invention will be described below. The configuration of this embodiment is identical to that shown in FIG. 47, and therefore, will not be described here. In Embodiment 33, the operations described in Embodiments 31 and 32 are repeated a number of times, and the type names of magnetic tapes stored in the first memory 20 are displayed on the display means in the form of a tape menu screen as shown in FIG. 15, from which menu screen the magnetic tape used for recording is selected. The type name of the selected magnetic tape is then displayed on the screen as shown in FIG. 16. The tape simulator microcomputer 19 then reads out the characteristic data of the magnetic tape from the second memory 21, and controls the detail emphasis circuit 1 and/or the recording equalizer frequency correction circuit 27 and/or the recording current setting circuit 28; thus, the amount of emphasis that the detail emphasis circuit 1 applies for video signal recording, the frequency characteristic of the recording equalizer 4, and the gain of the recording amplifier 7 for FM signal recording are controlled at the respective optimum values all at the same time or in any combination thereof.

In this manner, the detail emphasis amount for video signal recording, the frequency characteristic of the recording equalizer 4, and the gain of the recording amplifier 7 can be controlled all at the same time or singly or in any combination thereof, without having to redo the simulation for a variety of magnetic tapes.

Embodiment 34

Embodiment 34 of the present invention will be described below. The configuration of this embodiment is identical to that shown in FIG. 47, and therefore, the following description deals only with the operation of this embodiment. In Embodiment 34, the manufacturer names and type names of frequently-used magnetic tapes are prestored in the first memory 20, and the characteristic data of such magnetic tapes are prestored in the second memory 21, as in Embodiment 25; then, the type names of the plurality of magnetic tapes thus stored are brought onto the screen of the display means, as shown in FIG. 15, from which the magnetic tape used for recording is selected the type name of which is then displayed as shown in FIG. 16. The tape simulator microcomputer 19 then reads out the characteristic data of the selected magnetic tape from the second memory 21, and controls the detail emphasis circuit 1 and/or the recording equalizer frequency correction circuit 27 and/or the recording current setting circuit 28; thus, the amount of emphasis applied for video signal recording, the frequency characteristic of the recording equalizer 4, and the gain of the recording amplifier 7 for FM signal recording are controlled at the respective optimum values all at the same time or in any combination thereof.

Thus, in Embodiment 34, it is possible to prevent magnetic reversion and improve the signal-to-noise ratio for the magnetic tape selected for use from among a plurality of frequently-used magnetic tapes.

Embodiment 35

Embodiment 35 of the present invention will be described below. The configuration of this embodiment is also identical to that shown in FIG. 47, and therefore, the following description deals only with the operation of this embodiment. In Embodiment 35, when the magnetic tape used for recording is not found in the tape menu screen of FIG. 15 in the foregoing Embodiment 34, then "NO RELEVANT TAPE" is selected, as shown in FIG. 18, and the tape simulator microcomputer 19 controls the detail emphasis circuit 1 and/or the recording equalizer frequency correction circuit 27 and/or the recording current value setting circuit 28 so that the amount of emphasis that the detail emphasis circuit 1 applies for video signal recording, and/or the frequency characteristics of the recording equalizer 4 and/or the gain of the recording amplifier for FM signal recording are controlled at such values that do not cause problems for any magnetic tape whose data is stored in the second memory 21.

In Embodiment 35 also, it is possible to prevent magnetic reversion and improve the signal-to-noise ratio for recording of the video signal on any magnetic tape even if the magnetic tape is not registered.

Embodiment 36

Embodiment 36 of the present invention will be described below. This embodiment also has the same configuration as that shown in FIG. 47, and therefore, the following description deals only with the operation of this embodiment. In Embodiment 36, as in Embodiment 27, when there is no relevant tape in the flowchart of FIG. 45, a selection screen is displayed as shown in FIG. 21, from which either RECORD UNDER INITIAL SET CONDITION, as is done in Embodiment 35, or EXECUTE TAPE SIMULATION is selected. When EXECUTE TAPE SIMULATION is selected, the tape simulation of Embodiment 31 is carried out.

According to Embodiment 36, the video signal can be recorded in optimum conditions for any magnetic tape even if the magnetic tape is not registered.

Embodiment 37

Embodiment 37 of the present invention will be described below. The configuration of this embodiment is also identical to that shown in FIG. 47, and therefore, the following description deals only with the operation of this embodiment. In Embodiment 37, when EXECUTE TAPE SIMULATION is selected in the above Embodiment 36, the tape simulation of Embodiment 32 is carried out.

According to Embodiment 37, the video signal can be recorded in optimum conditions for any magnetic tape even if the magnetic tape is not registered.

Embodiment 38

Embodiment 38 of the present invention will be described below. The configuration of this embodiment is identical to that shown in FIG. 47, and therefore, the following description deals only with the operation of this embodiment. In Embodiment 38, the manufacturer name and type name of the magnetic tape used for rehearsal recording in Embodiment 36 or 37 are entered on the screen shown in FIG. 22 which is displayed when the tape simulation is completed, prompting for the registration of the manufacturer name and type name of the magnetic tape. The manufacturer name and type name are thus stored into the first memory 20, and the characteristic data of the magnetic tape is added to the data stored in the second memory 21, thus adding to the list of magnetic tapes as shown on the screen of FIG. 23 which displays data newly registered after tape simulation.

According to Embodiment 38, the number of magnetic tapes stored in memory can be increased as shown on the screen that displays data newly registered after the tape simulation of the magnetic tape used for rehearsal recording; this has the effect of eliminating the need to redo the simulation when using the same type of tape in future.

Embodiment 39

Embodiment 39 of the present invention will be described below. The configuration of this embodiment is also identical to that shown in FIG. 47, and therefore, the following description deals only with the operation of this embodiment. In Embodiment 39, the tape menu is reordered so that the last used magnetic tape, which is expected to be used most frequently, appears at the top of the menu, such as in the tape menu screen shown in FIG. 24 in which the last designated tape is displayed at the top of the menu as in Embodiments 33 and 34, or in the tape menu screen shown in FIG. 25 in which the magnetic tape used for simulation is displayed at the top of the menu as in Embodiment 38.

In Embodiment 39, the last used magnetic tape, which is expected to be used most frequently, is displayed at the top of the tape menu, facilitating the selection of tape data for optimum recording of the video signal without redoing tape simulation for a variety of magnetic tapes.

The following describes other embodiments of the present invention, wherein information indicating the kind of the magnetic tape, such as a barcode attached to the tape package, is input and the detail emphasis amount for video signal recording, the frequency characteristic of the recording equalizer, and the recording current value are controlled using the characteristic data of the magnetic tape prestored in memory.

Embodiment 40

Figure 48B:
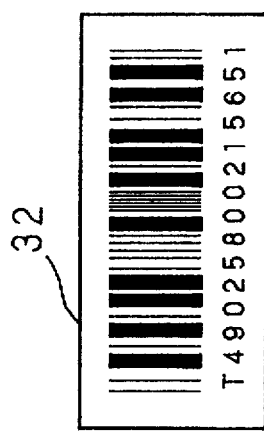
FIG. 48(b) is a diagram showing a barcode carried on a packaging material.
Figure 48A:
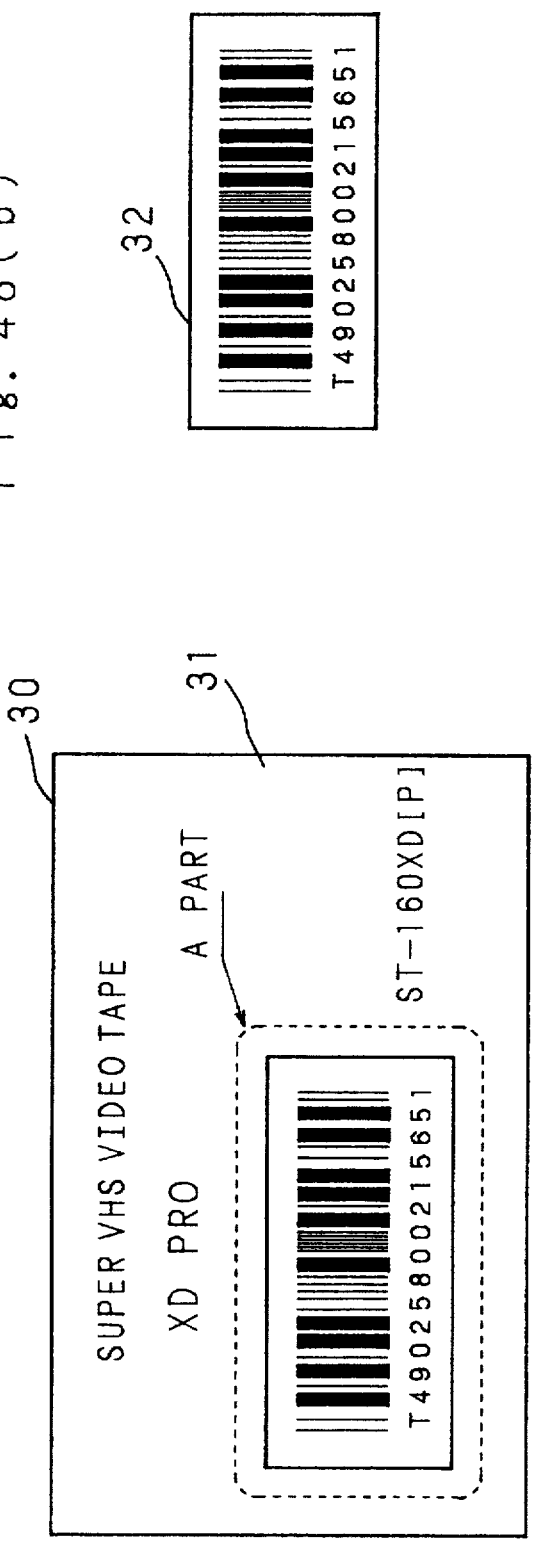
FIG. 48(a) is a diagram showing a packaged magnetic tape cassette.

Embodiment 40 of the present invention will be described below. FIG. 48(a) shows a packaged magnetic tape cassette 30, the numeral 31 indicating the packaging material in which the magnetic tape cassette is wrapped; FIG. 48(b) shows a barcode removed from part A of the packaging material 31 shown in FIG. 48(a), the removed barcode being indicated by the numeral 32; and FIG. 48(c) is a diagram showing a magnetic tape cassette 33 on which the removed barcode 32 shown in FIG. 48(b) has been attached, the magnetic tape cassette 33 being of the same kind as the magnetic tape cassette wrapped in the packaging material 31.

Figure 48C:
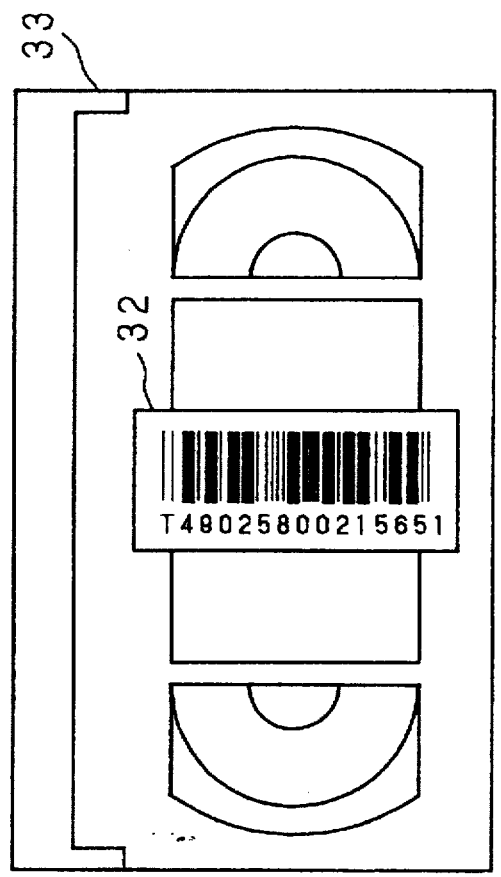
FIG. 48(c) is a diagram showing a magnetic tape cassette with a barcode attached thereon.
Figure 49:
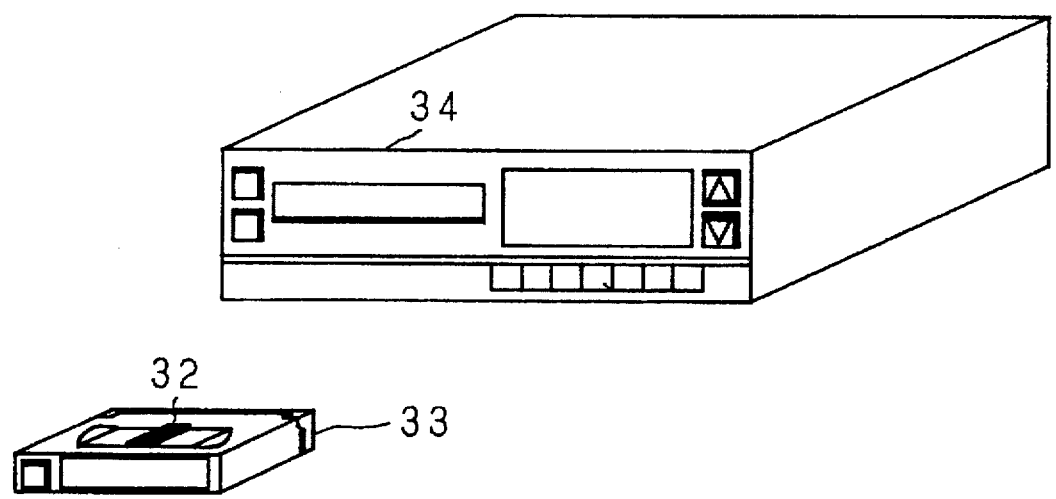
FIG. 49 is a diagram showing how the magnetic tape cassette with a barcode attached thereon is inserted into a VTR machine.

FIG. 49 is a diagram showing how the magnetic tape cassette 33 with the barcode 32 attached thereon as shown in FIG. 48(c) is inserted into a VTR 34 in order to read the information carried in the barcode. The VTR 34 has a built-in barcode reader. FIGS. 50(a) and (b) are diagrams for explaining how the magnetic tape cassette 33 with the barcode 32 attached thereon is inserted and how the barcode is read. The numeral 35 indicates a scanner, the barcode reader, which is used to read the barcode 32 attached to the magnetic tape cassette 33.

FIG. 51 is a diagram for explaining a sequence of control operations for the scanner 35 to read the barcode 32 on the magnetic tape cassette 33 loaded into the VTR machine 34. In the figure, the numeral 36 is a switch for detecting the insertion of the magnetic tape cassette 33; 40 is a loading device for loading the magnetic tape cassette 33; 37 is a loading control microcomputer for controlling the loading device 40, and for instructing the scanner 35 to start reading the barcode, by detecting the state of the switch 36 that indicates the insertion of the magnetic tape cassette 33; 38 is a drive circuit for controlling the driving of the loading device 40 for loading the magnetic tape cassette 33; and 39 is a loading motor for driving the loading device 40. Further, the numeral 41 is a barcode reading circuit for reading the data carried in the barcode 32 picked up by the scanner 35 under control of the loading microcomputer 37; 42 is a data processing circuit for processing the barcode data read by the barcode reading circuit 41; and 43 is a control microcomputer for controlling recording signal processing circuitry within the VTR 34 by using the data converted by the data processing circuit 42.

Figure 52:
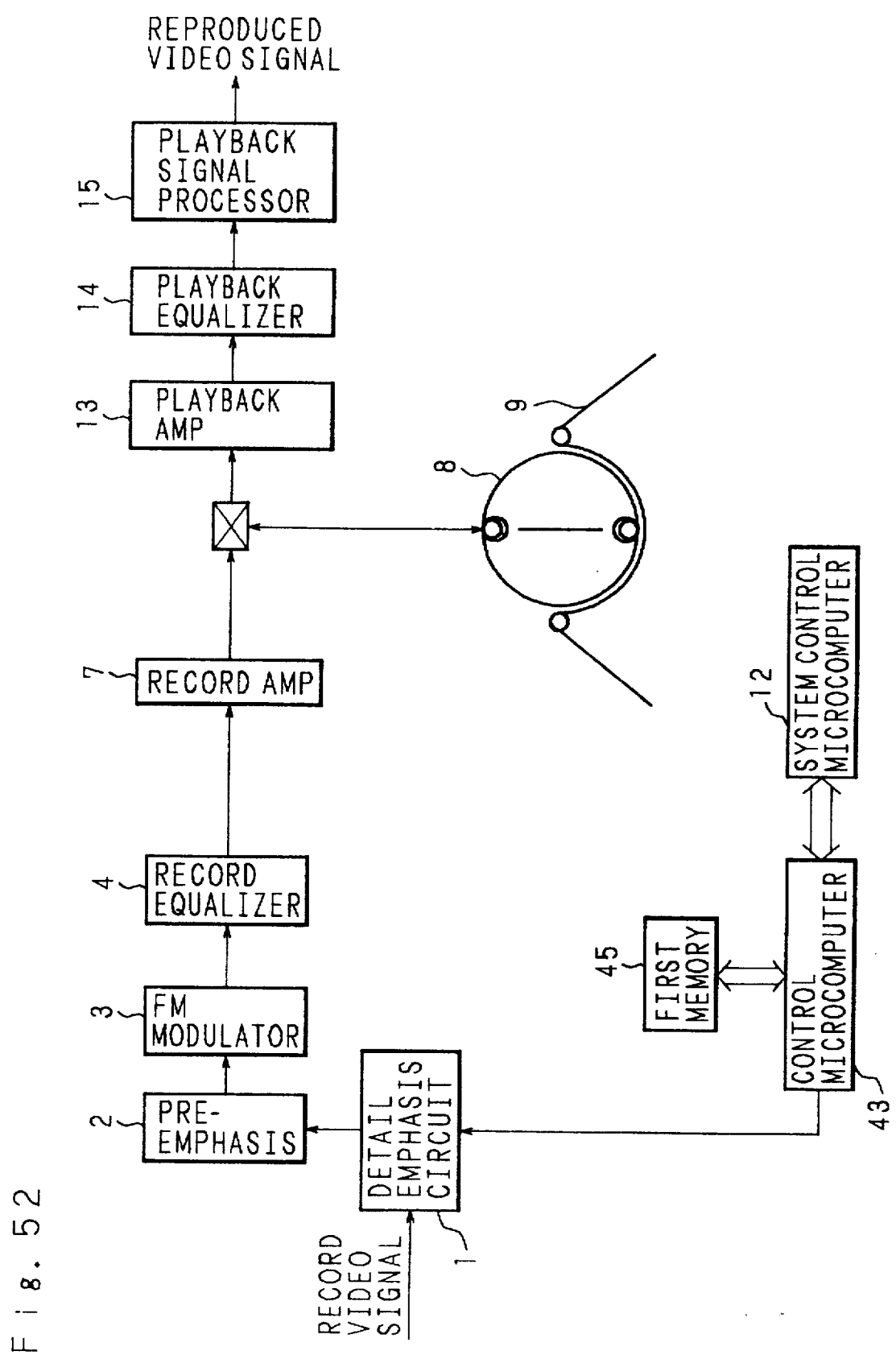
FIG. 52 is a block diagram showing a still further recording signal control apparatus according to the present invention.

FIG. 52 is a block diagram showing a recording signal detail control apparatus of the present invention, capable of optimizing recording conditions for the magnetic recording medium used. In FIG. 52, the same or corresponding parts to those shown in FIG. 4 are designated by the same reference numerals, to avoid repeated explanation of such parts. In FIG. 52, the numeral 45 designates a first memory in which the kind and the characteristic data of the magnetic tape 9 are stored, and 43 indicates the control microcomputer for controlling the detail emphasis circuit 1 on the basis of the data stored in the first memory 45.

The operation of this embodiment will now be described. The barcode 32, as shown in FIG. 48(b), is removed from part A of the packaging material 31 shown in FIG. 48(a) and attached to the magnetic tape cassette 33, as shown in FIG. 48(c); the magnetic tape cassette 33 is the same kind of magnetic tape as the one wrapped in the packaging material 31. The magnetic tape cassette 33 with the barcode 32 attached thereon is then inserted into the VTR 34 shown in FIG. 49. The magnetic tape cassette 33 is inserted into the VTR 34, as shown in FIG. 50(a), and when the magnetic tape cassette 33 is loaded into position as shown in FIG. 50(b), the scanner 35 scans the barcode 32 to pick up the information carried therein.

An example of a method of reading the barcode on the loaded magnetic tape cassette 33 will be described with reference to FIG. 51. When the magnetic tape cassette 33 with the barcode 32 attached thereon is inserted, the switch 36 detects the act of insertion and notifies the loading control microcomputer 37 that the loading action may be started.

The loading control microcomputer 37 controls the loading motor 39 for driving the loading device 40 via the drive circuit 38, and at the same time, instructs the scanner 35 to start reading the barcode. When the magnetic tape cassette 33 is inserted and loaded into the position shown in FIG. 50(b) by the action of the loading device 40, the barcode reading circuit 41, which is coupled to the scanner 35, starts reading the information carried in the barcode 32. The extracted barcode data is then converted by the data processing circuit 42, and using the converted data, the control microcomputer 43 controls the recording signal processing circuitry within the VTR 34.

An example of a control operation for controlling the recording signal processing circuitry within the VTR will be explained with reference to FIG. 52. Based on the barcode data transferred from the data processing circuit 42, the control microcomputer 43 locates the characteristic data stored in the first memory 45 for the magnetic tape cassette 33. In record mode, under control of the system microcomputer 12 the control microcomputer 43 controls the amount of emphasis the detail emphasis circuit 1 applies to the incoming video signal at the optimum valise as shown in FIG. 9. After being processed for detail emphasis, the video signal is fed to the pre-emphasis circuit 2 where pre-emphasis is applied, and then fed to the FM modulator 3 for conversion into a frequency-modulated wave. The FM wave is then processed through the recording equalizer 4 and fed via the recording amplifier 7 to the rotating magnetic head 8 for recording on the magnetic tape 9.

In playback mode, the playback signal played back from the magnetic tape 9 by the rotating magnetic head 8 is amplified by the playback amplifier 13, processed through the playback equalizer 14, and fed to the playback signal processor 15 to reproduce the video signal for output with optimum detail emphasis as shown in FIG. 10.

Embodiment 41

Figure 53:
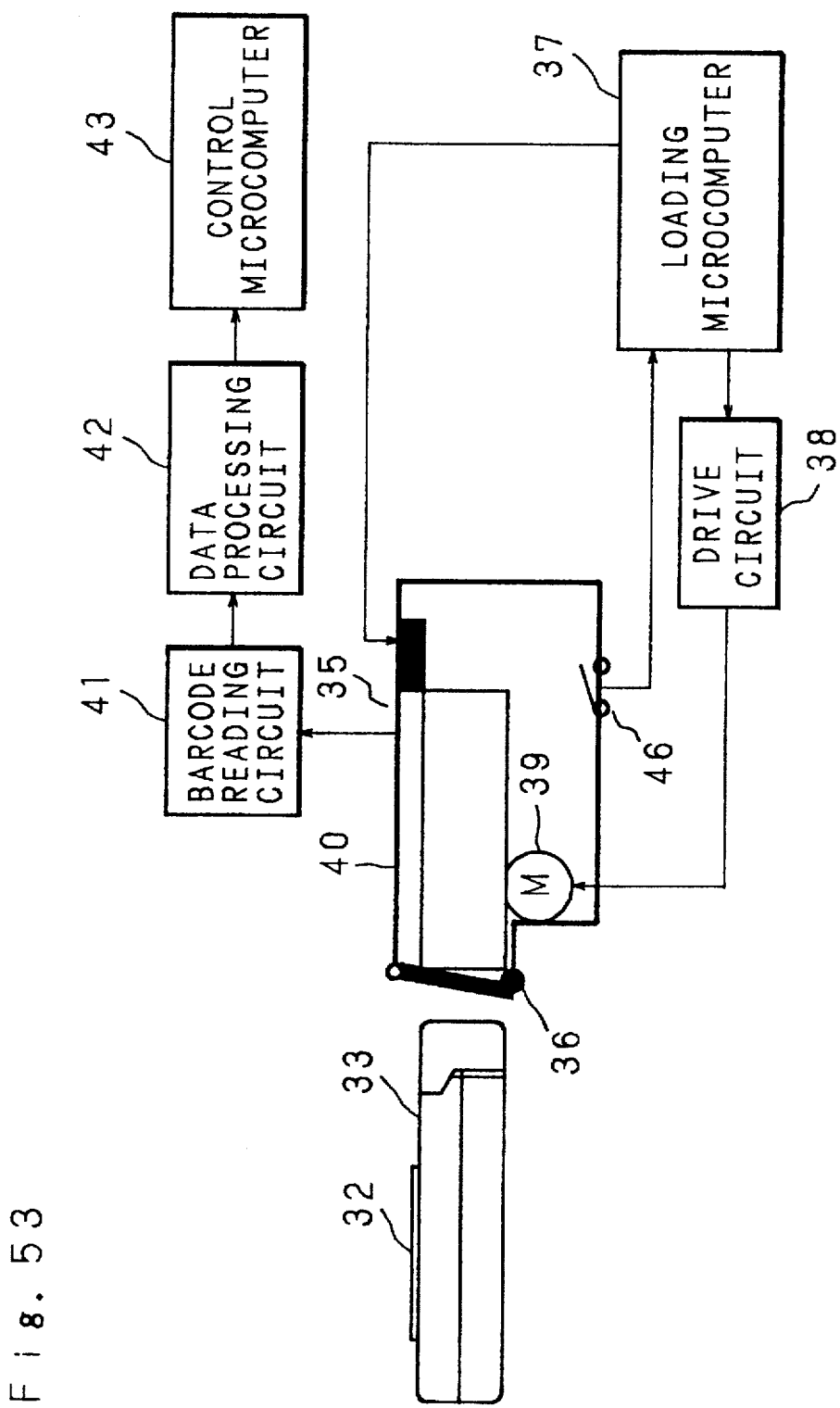
FIG. 53 is a diagram showing the configuration of a circuit for reading the barcode after the magnetic tape cassette has been loaded into the machine.
Figure 54:
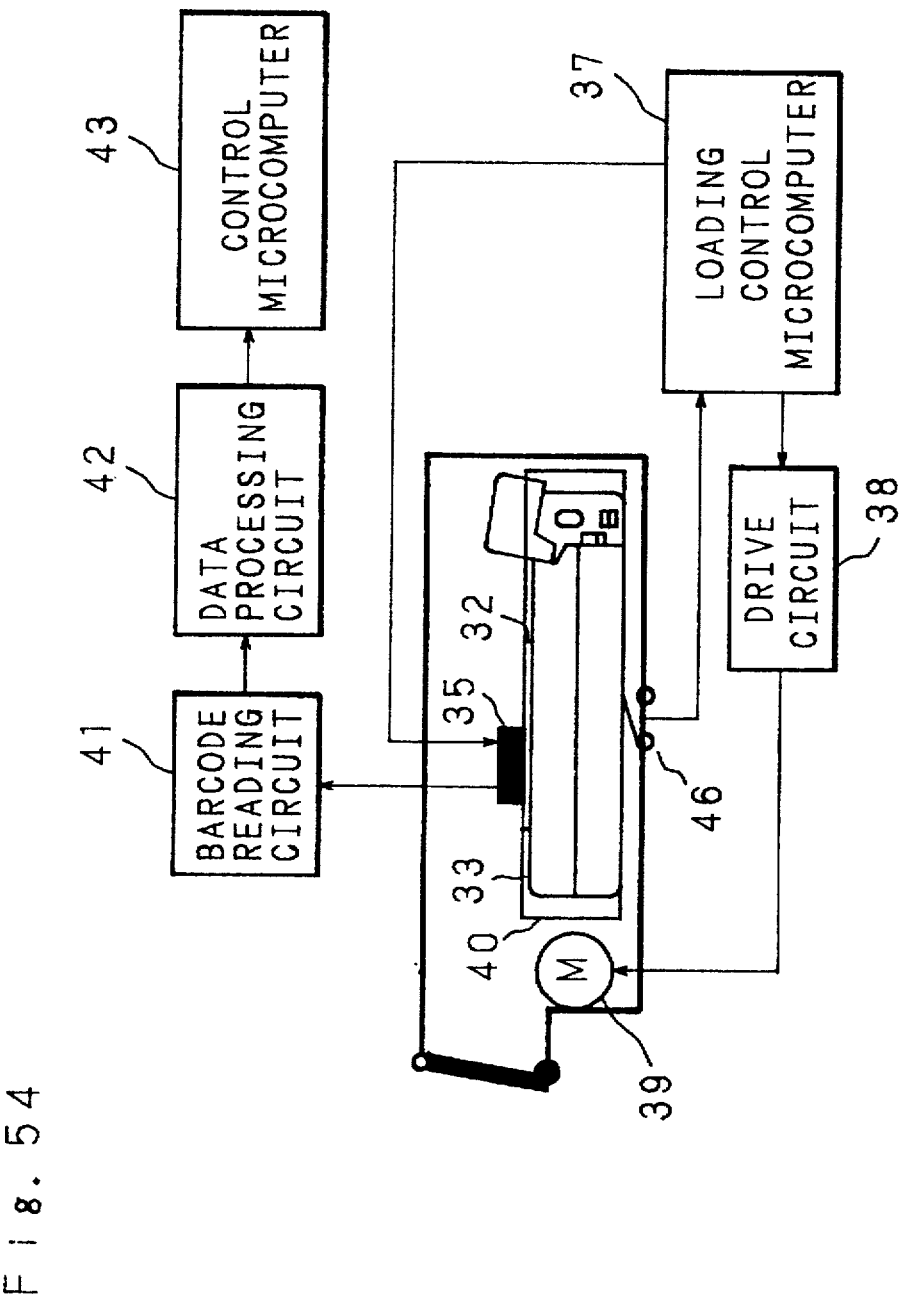
FIG. 54 is a diagram for explaining how the barcode is read after the magnetic tape cassette has been loaded into the machine.

Embodiment 41 of the present invention will be described below. FIGS. 53 and 54 are diagrams illustrating an embodiment of the invention wherein a barcode is read after loading the magnetic tape cassette. In the figures, the same or corresponding parts to those shown in FIGS. 48 to 52 are designated by the same reference numerals to avoid repeated explanation of such parts. The numeral 46 is a switch for detecting the loading complete state of the magnetic tape cassette 33.

The operation of this embodiment will now be described. As shown in FIG. 53, before the magnetic tape cassette 33 is inserted, the scanner 35 is at rest in the upper part rearwardly of the loading device 40 so as not to interfere with the loading action of the loading device 40. When the magnetic tape cassette 33 with the barcode 32 attached thereon is inserted, the loading control microcomputer 37 controls the loading motor 39 to drive the loading device 40 via the drive circuit 38.

When the loading action of the loading device 40 is completed and the magnetic tape cassette 33 is loaded into position, the switch 46 detects this state and sends loading complete information to the loading control microcomputer 37, and the scanner 35 is set ready to read the barcode 32, as shown in FIG. 54. The loading control microcomputer 37 instructs the scanner 35 to start reading the barcode 32, so that the barcode reading circuit 41 coupled to the scanner 35 starts reading the information carried in the barcode 32. The extracted barcode data is converted by the data processing circuit 42, and using the converted data, the control microcomputer 43 controls the recording signal processing circuitry within the VTR 34.

The recording and playback operations within the VTR 34 and control operations of the detail emphasis circuit 1 in processing signals for recording are the same as described in Embodiment 40, and therefore, are not described here.

Embodiment 42

Figure 55:
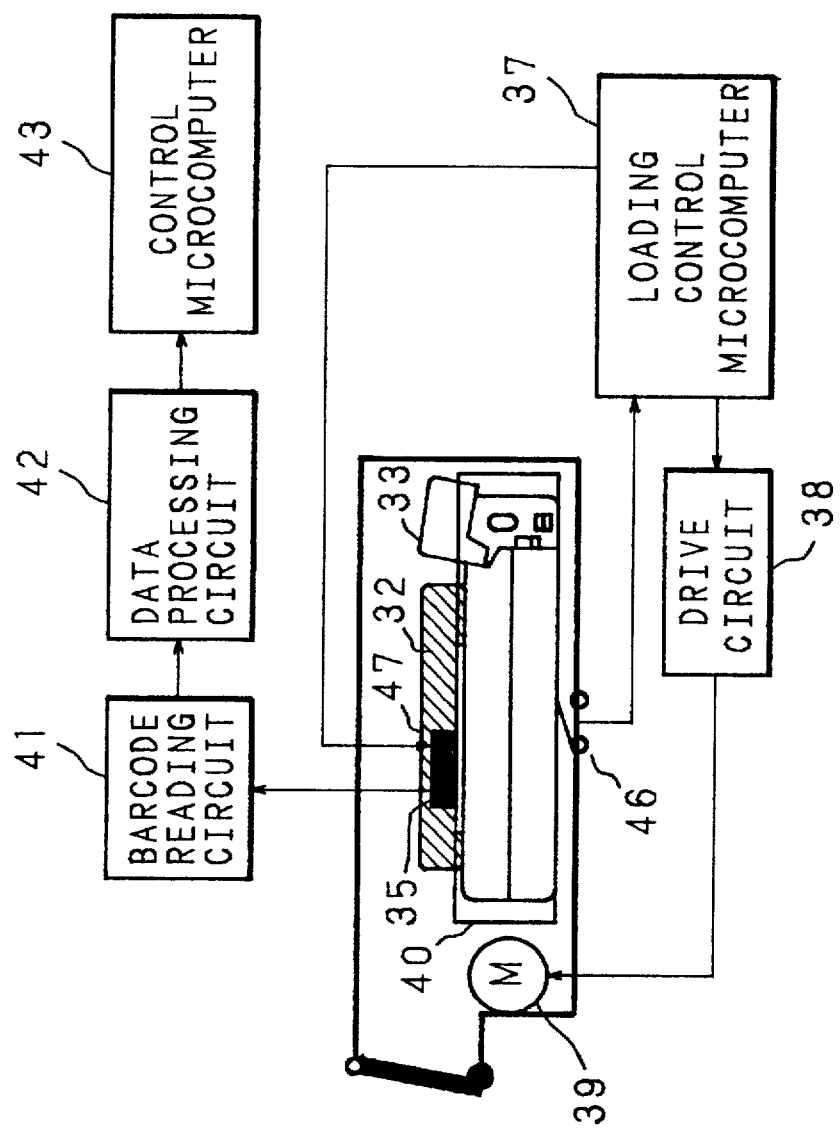
FIG. 55 is a diagram for explaining how the barcode is read after the magnetic tape cassette has been loaded into the machine.

Embodiment 42 of the present invention will be described below. FIG. 55 is a diagram illustrating an embodiment of the invention wherein a barcode is read after loading the magnetic tape cassette. In the figure, the same or corresponding parts to those shown in FIGS. 48 to 54 are designated by the same reference numerals to avoid repeated explanation of such parts. The numeral 47 indicates a cassette stabilizer for holding the magnetic tape cassette 33 firmly in position. As shown in FIG. 55, the scanner 35 is constructed integrally with the cassette stabilizer 47 and holds the magnetic tape cassette 33 firmly in position while reading the information carried in the barcode 32 attached to the magnetic tape cassette 33. Other operations are the same as those described in Embodiment 41, and therefore, are not described here.

Embodiment 43

Figure 56A:
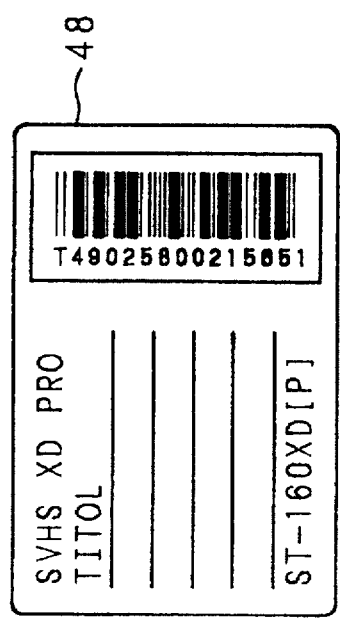
FIG. 56(a) is a diagram showing a cassette label bearing a barcode directly printed thereon.
Figure 56B:
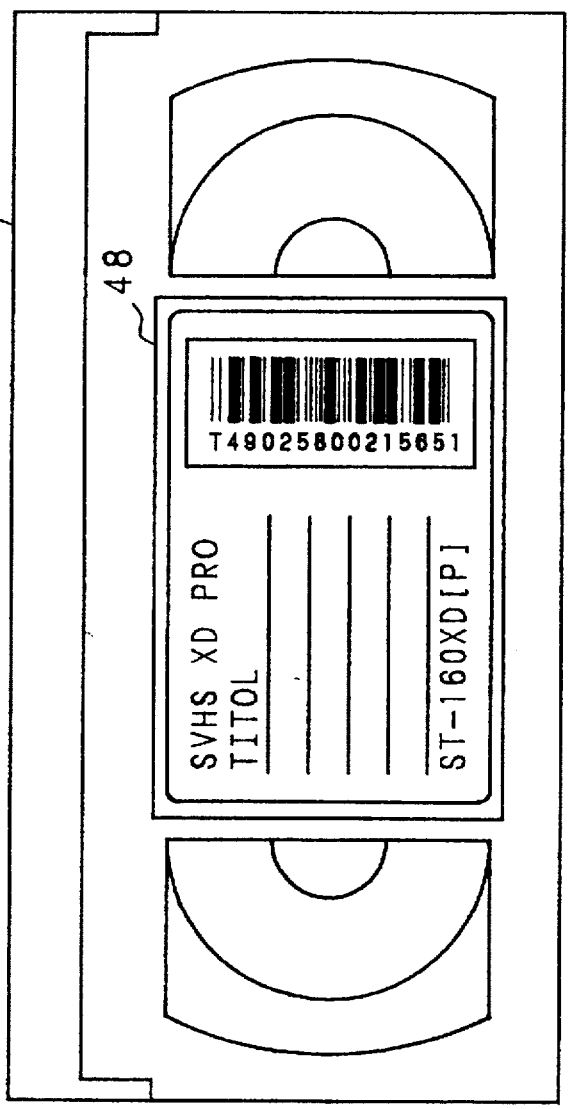
FIG. 56(b) is a diagram showing a magnetic tape cassette on which the cassette label is attached.

Embodiment 43 of the present invention will be described. In Embodiments 40 to 42, the barcode 32 is removed from part A of the packaging material 31 and then attached to the magnetic tape cassette 33. In an alternative method, a cassette label bearing a barcode printed thereon, as shown in FIG. 56(a), may be prepared beforehand, and this label may be applied to the magnetic tape cassette 33, as shown in FIG. 56(b).

Embodiment 44

Figure 57:
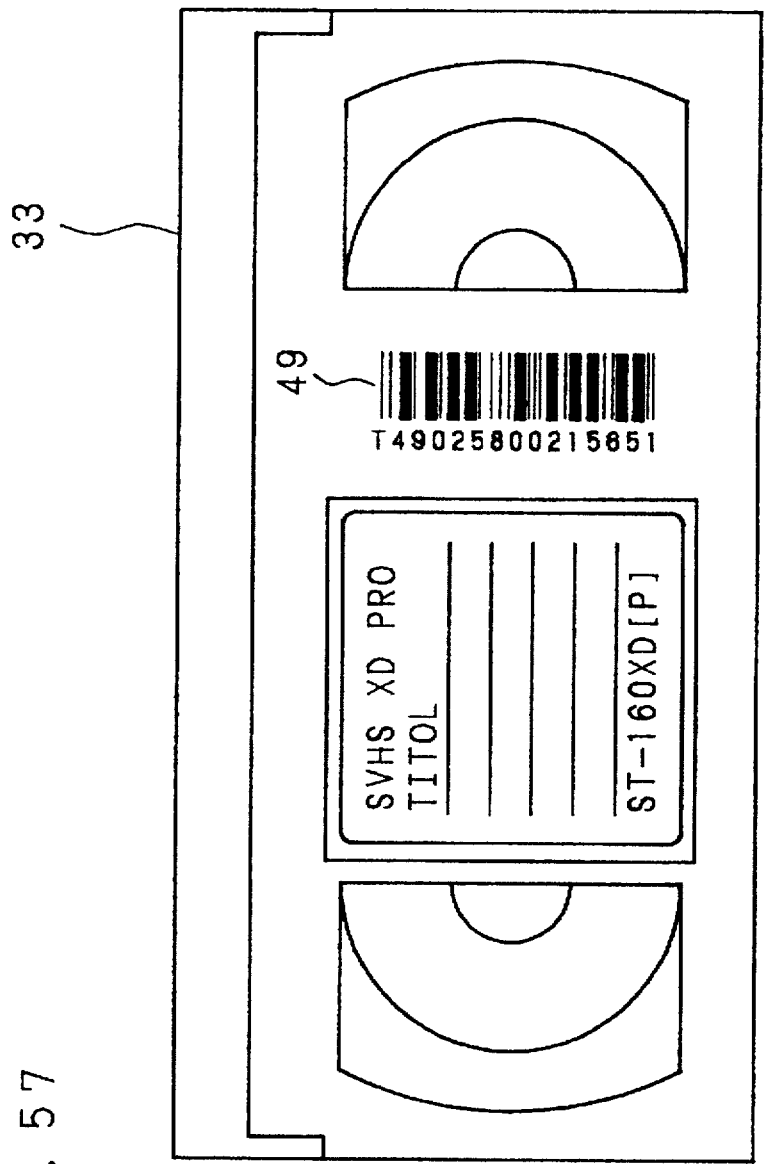
FIG. 57 is a diagram showing a barcode-printed magnetic tape cassette having a barcode directly printed thereon.

Embodiment 44 of the present invention will be described. In Embodiments 40 to 42, the barcode 32 is removed from part A of the packaging material 31 and then attached to the magnetic tape cassette 33. In an alternative method, the barcode may be printed directly on the magnetic tape cassette 33 like the barcode-printed magnetic tape cassette 49 shown in FIG. 57.

Embodiment 45

Figure 58:
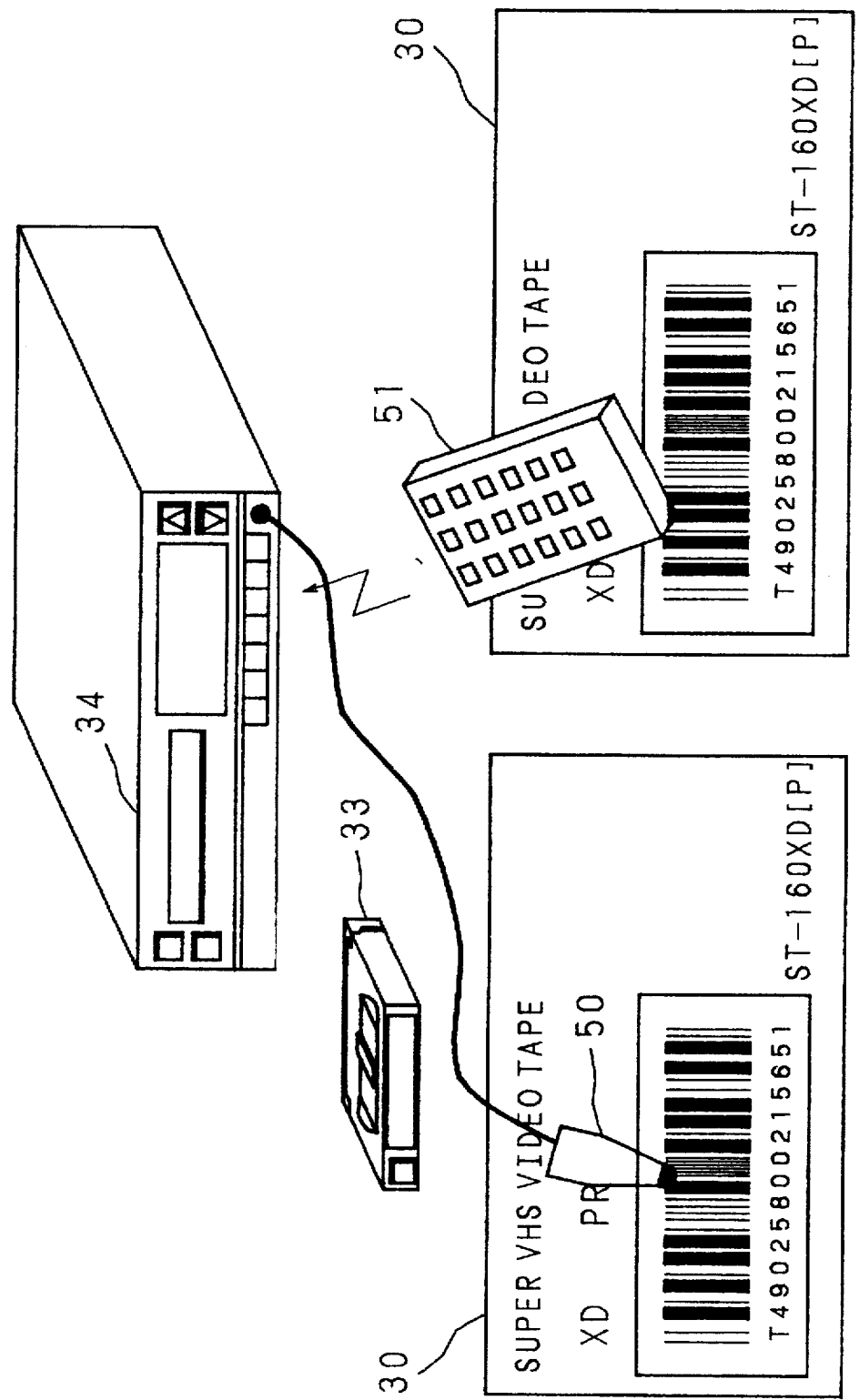
FIG. 58 is a diagram showing how barcode data carried on the packaging of a magnetic tape cassette is input to the VTR.

Embodiment 45 of the present invention will be described below. FIG. 58 is a diagram illustrating an embodiment of the invention wherein barcode information is read and transmitted to the VTR 34 by using a scanner external to the VTR 34. In the figure, the same or corresponding parts to those shown in FIGS. 48 to 52 are designated by the same reference numerals to avoid repeated explanation of such parts. The numeral 50 indicates a barcode scanner externally connected to the VTR 34. As shown in FIG. 58, the barcode scanner 50 reads the barcode information on the packaged magnetic tape cassette 30 and transmits the data to the VTR 34. After that, the unpackaged magnetic tape cassette 33 is loaded into the VTR 34 for recording. In recording, the control microcomputer 43 controls the detail emphasis circuit 1 so that the optimum amount of emphasis is applied to the video signal for recording with the magnetic tape cassette 33. Other operations are the same as described in Embodiment 40, and therefore, are not described here.

Embodiment 46

Embodiment 46 of the present invention will be described below. In FIG. 58, the numeral 51 shows a remote control unit with a built-in barcode scanner for use with the VTR 34. As shown in FIG. 58, the remote control unit 51 with a built-in barcode scanner reads the barcode information on the packaged magnetic tape cassette 30 and transmits the data to the VTR 34 by remote control. After that, the unpackaged magnetic tape cassette 33 is loaded into the VTR 34 for recording. In recording, the control microcomputer 43 controls the detail emphasis circuit 1 so that the optimum amount of emphasis is applied to the video signal for recording with the magnetic tape cassette 33. Other operations are the same as described in Embodiment 40, and therefore, are not described here.

Embodiment 47

In Embodiments 45 and 46, the barcode information is read from the barcode on the packaged magnetic tape cassette 30. In an alternative method, the barcode carried on the packaging material 31 may be read using the barcode scanner 50 or the remote control unit 51 with a built-in barcode scanner after the magnetic tape cassette 33 has been loaded into the VTR 34.

Embodiment 48

Figure 59A:
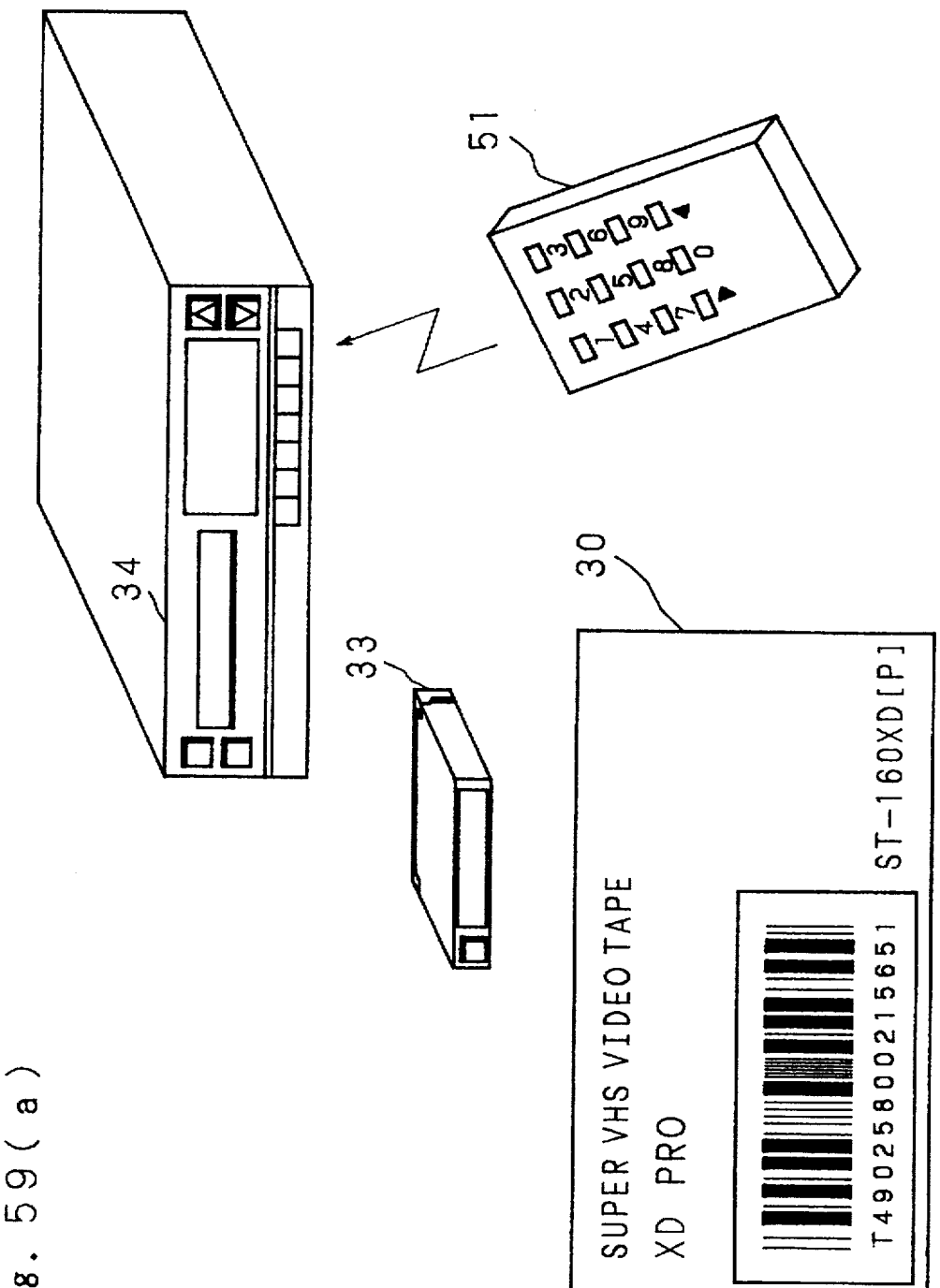
FIGS. 59(a) and 59(b) are diagrams how numeric information at the bottom of the barcode carried on the packaging of a magnetic tape cassette is input to the VTR.

Embodiment 48 of the present invention will be described below. FIG. 59(a) is a diagram illustrating an embodiment of the invention in which the numeric information carried at the bottom of a barcode is input on an external remote control unit for transmission to the VTR 34. In the figure, the same or corresponding parts to those shown in FIGS. 48 to 58 are designated by the same reference numerals to avoid repeated explanation of such parts.

As shown in FIG. 59(a), the numeric information at the bottom of the barcode carried on the packaged magnetic tape cassette 30 is transmitted to the VTR 34 by using the remote control unit 51. After that, the unpackaged magnetic tape cassette 33 is loaded into the VTR 34 for recording. In recording, the control microcomputer 43 controls the detail emphasis circuit 1 so that the optimum amount of emphasis is applied to the video signal for recording with the magnetic tape cassette 33. Other operations are the same as described in Embodiment 40, and therefore, are not described here.

Embodiment 49

Figure 59B:
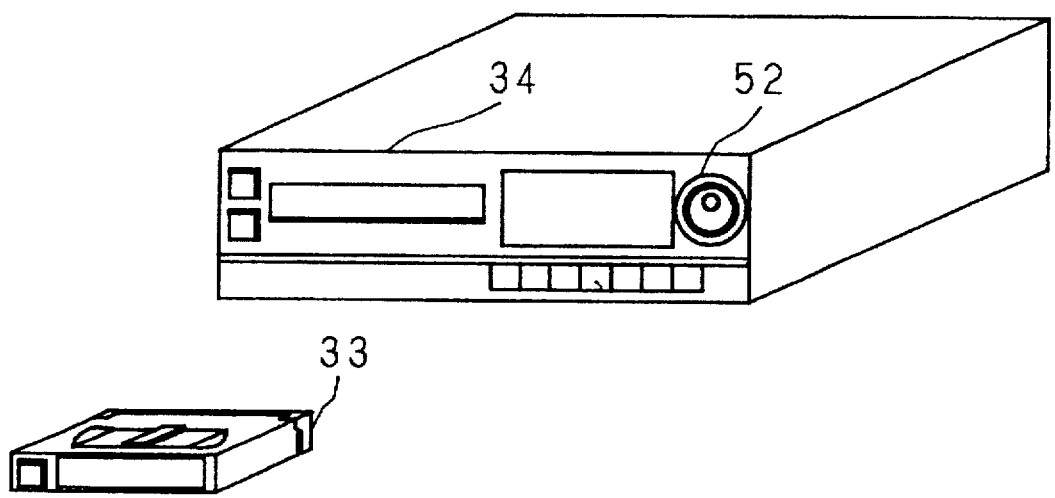

Embodiment 49 of the present invention will be described below. FIG. 59(b) is a diagram illustrating an embodiment of the invention in which the numeric information carried at the bottom of a barcode is input to the VTR 34 by using a jog shuttle dial provided on the VTR 34. In the figure, the jog shuttle dial provided on the VTR 34 is indicated at 52.

As shown in FIG. 59(b), the numeric information at the bottom of the barcode carried on the packaged magnetic tape cassette 30 is input to the VTR 34 by using the jog shuttle dial 52. In this input method, the job shuttle dial 52 is used to increase or decrease the numeric value and moving from one digit to the next. After that, the unpackaged magnetic tape cassette 33 is loaded into the VTR 34 for recording. In recording, the control microcomputer 43 controls the detail emphasis circuit 1 so that the optimum amount of emphasis is applied to the video signal for recording with the magnetic tape cassette 33. Other operations are the same as described in Embodiment 40, and therefore, are not described here.

Embodiment 50

In Embodiments 48 and 49, the numeric information at the bottom of the barcode carried on the packaged magnetic tape cassette 30 is read. In an alternative method, the numeric information at the bottom of the barcode carried on the packaging material 31 may be input using the remote control unit 51 or the jog shuttle dial 52 after the magnetic tape cassette 33 has been loaded into the VTR 34.

Embodiment 51

Figure 60:
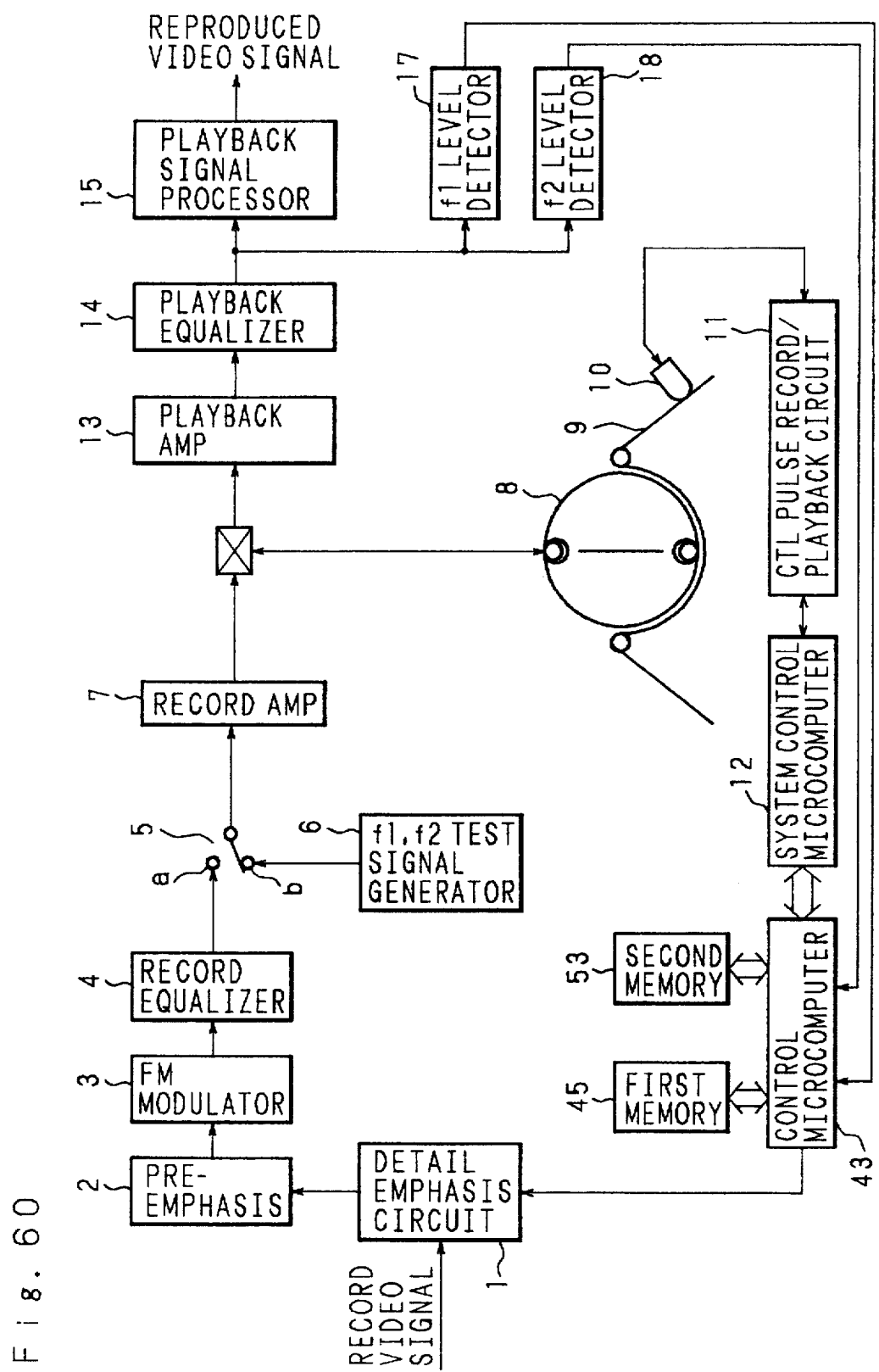
FIG. 60 is a block diagram showing the configuration of another recording signal control apparatus according to the present invention.

Embodiment 51 of the present invention will be described. FIG. 60 is a block diagram showing one embodiment of a recording signal detail control apparatus capable of optimizing recording conditions for a magnetic recording medium when the kind of the magnetic tape used for recording is not one stored in memory. In the figure, the same or corresponding parts to those shown in FIGS. 4 and 52 are designated by the same reference numerals to avoid repeated explanation of such parts. The numeral 53 shows a second memory for storing the level detection results fed from the f1 level detector 17 and f2 level detector 18. FIG. 81 is a flowchart illustrating a sequence of operations according to Embodiment 51.

Figure 61:
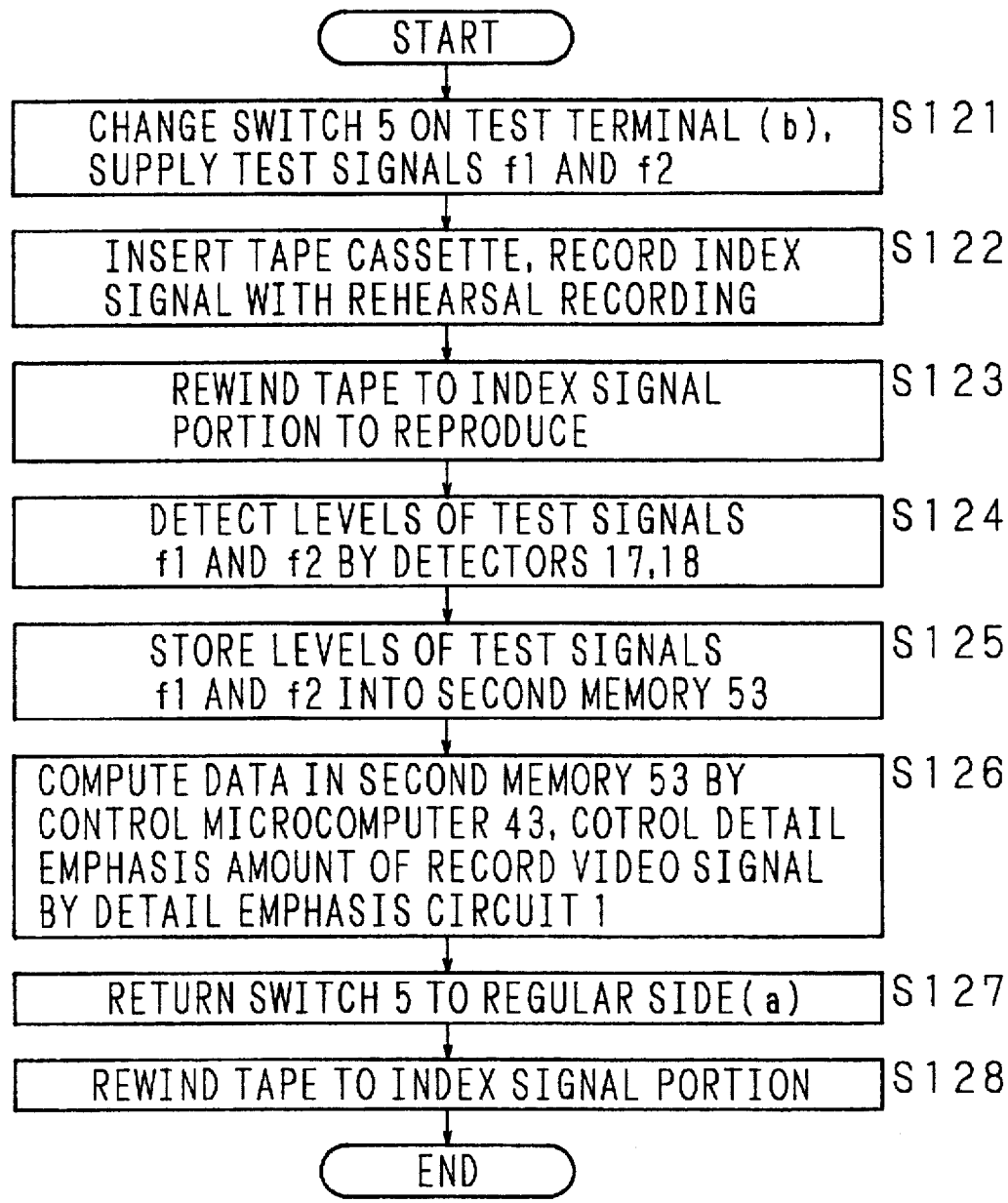
FIG. 61 is a flowchart illustrating a sequence of operations performed in the signal recording control apparatus of the present invention.

The operation of this embodiment will now be described. When, in Embodiments 40 to 50, the kind of the magnetic tape used for recording is not one stored in the first memory 45, the sequence of operations illustrated in the flowchart of FIG. 61 is performed under the control of the control microcomputer 43 to detect the optimum recording conditions for the magnetic tape.

In the flowchart, in test recording the switch 5 is set to connect to the terminal (b) side (test terminal side) so that signals from the FM modulator 3 and the recording equalizer 4 are shut off, and instead, test signals from the f1/f2 test signal generator 6 are supplied via the recording amplifier 7 to the rotating magnetic head 8 for recording on the magnetic tape 9 (step S121). Here, in synchronism with the operation timing of the control microcomputer 48, the CTL pulse recording/playback circuit 11 under control of the system microcomputer 12 generates an index signal which is recorded on the magnetic tape 9 with the prescribed timing (step S122).

After recording is done for a length of time necessary for the measurement of the tape performance, the magnetic tape is rewound to the index signal position, and played back (step S128). The played back test signals are amplified by the playback amplifier 13 and fed to the playback equalizer 14 where signals having the frequency spectra f1 and f2 shown in FIG. 7 or 8 are extracted; then, the f1 test signal level is detected by the f1 level detector 17 and the f2 test signal level detected by the f2 level detector 18 (step S124). Each detection level information is fed to the control microcomputer 43 and the associated characteristic data is stored into the second memory 58 (step S125). Based on the data stored in the second memory 58, the control microcomputer 43 controls the detail emphasis circuit 1 to set the amount of detail emphasis at the optimum value for recording of the video signal (step S126). When the above setting is complete, the switch 5 is set back to the normal recording side (a) (step S127), and the magnetic tape is rewound to the index signal position to complete the test recording (step S128).

Embodiment 52

Figure 62:
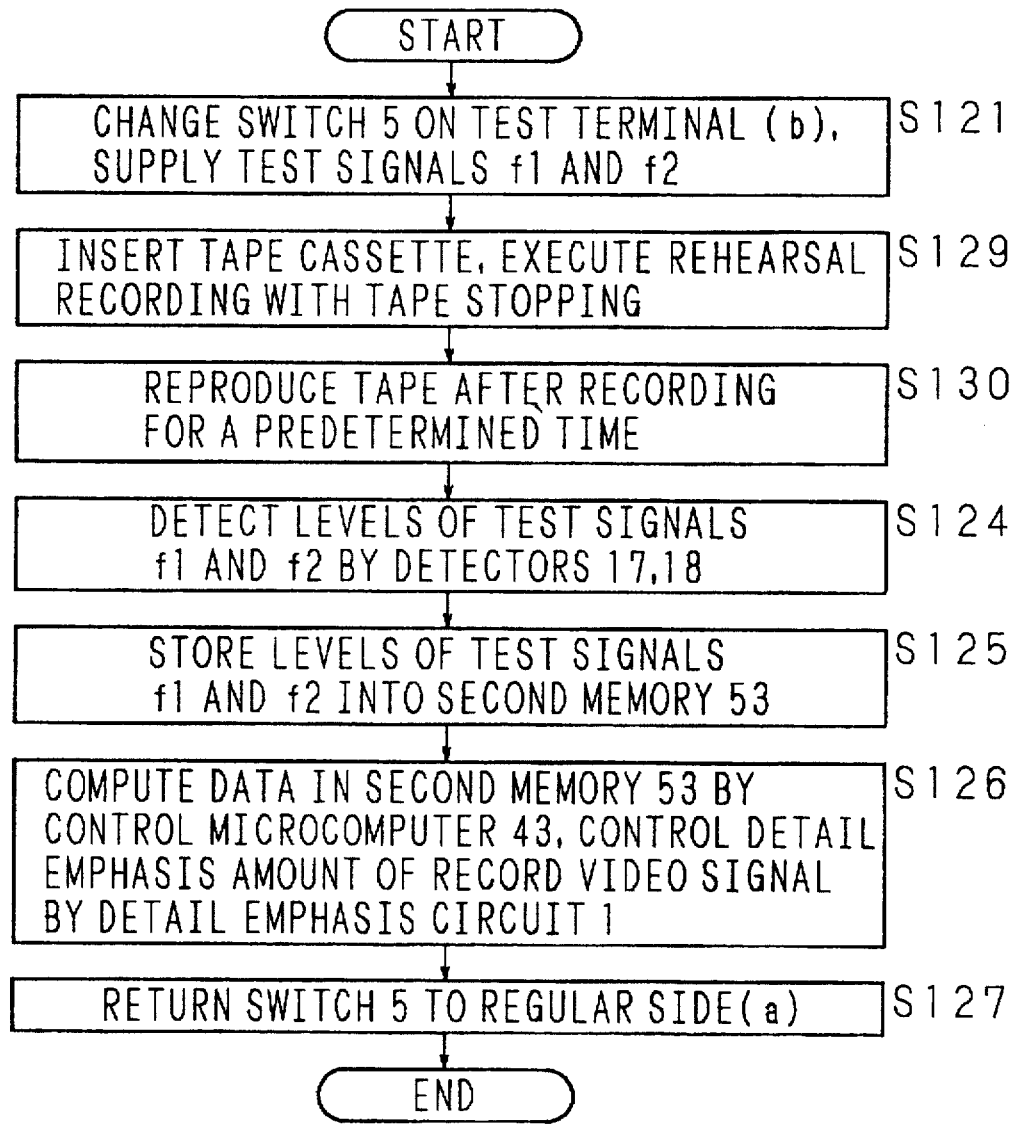
FIG. 62 is a flowchart illustrating a sequence of operations performed in the signal recording control apparatus of the present invention.

Embodiment 52 of the present invention will be described below. The configuration of the apparatus is identical to that of Embodiment 51 shown in FIG. 60. The following describes the operation of Embodiment 52. Embodiment 52 provides the same features as those described in Embodiment 51, the only difference being that, in Embodiment 52, the rehearsal recording is carried out with the magnetic tape held at a stop position. FIG. 62 is a flowchart illustrating a sequence of operations according to Embodiment 52; the same processing steps as those illustrated in FIG. 61 are designated by the same step numbers, and explanation of such steps is omitted herein.

The tape cassette is loaded, and rehearsal recording is carried out with the tape held at a stop position (step S129). After recording for a predetermined length of time, the test signals f1 and f2 are played back (step S130). The processing operations after that are the same as those described in Embodiment 51.

The timings of rehearsal recording and playback performed with the tape held at a stop position are as shown in FIG. 11. Referring to FIG. 11, the test signals as described in the foregoing Embodiment 51 are recorded for one revolution period of the rotating cylinder, and after recording, the test signals are played back for tape simulation. In FIG. 11, the test signal recording period is made equal to one revolution period of the rotating cylinder, but the recording period may be made longer than one revolution period of the rotating cylinder as necessary.

Embodiment 53

Figure 63:
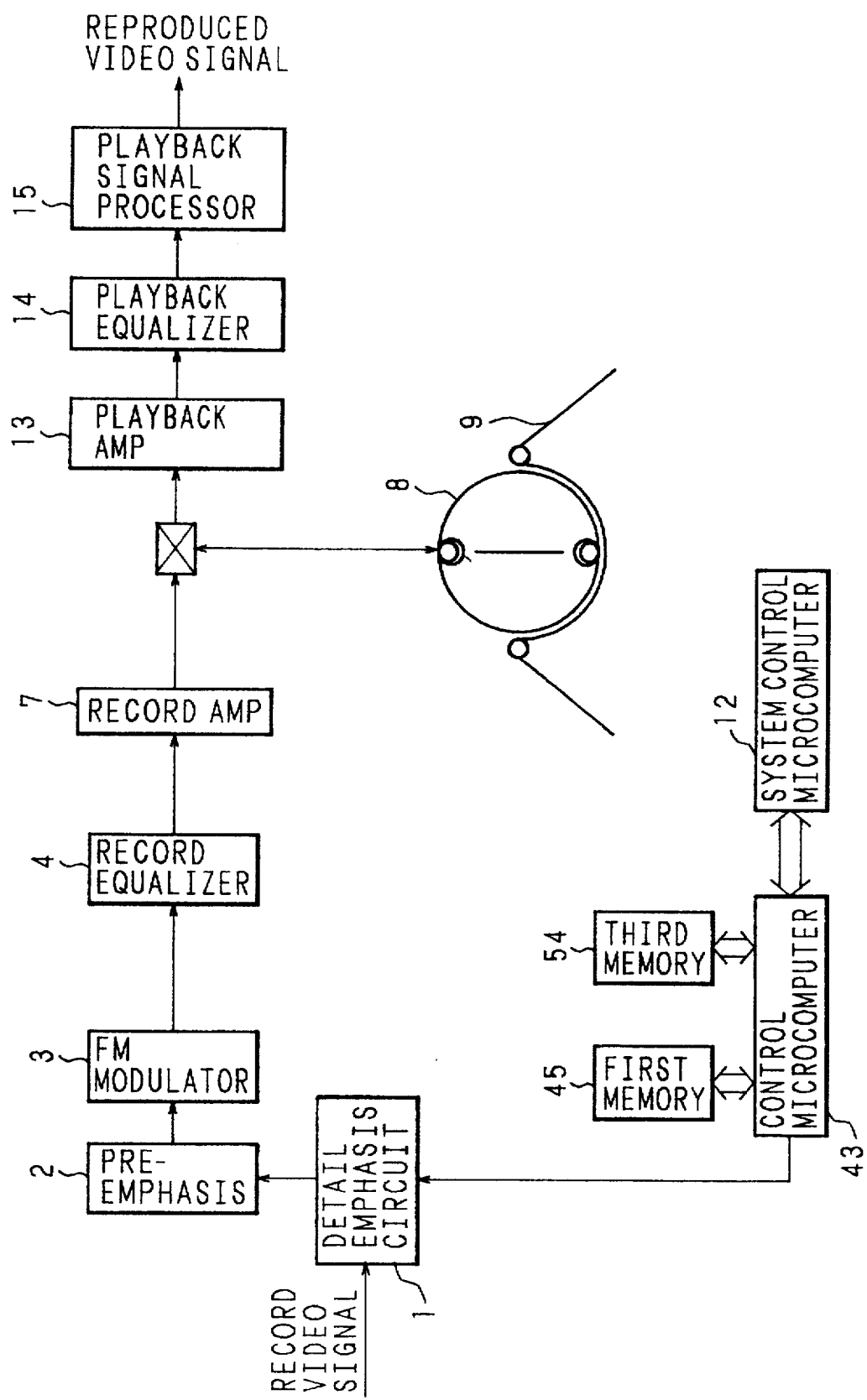
FIG. 63 is a block diagram showing the configuration of another recording signal control apparatus according to the present invention.

Embodiment 53 of the present invention will be described below. FIG. 63 is a block diagram showing one embodiment of a recording signal detail control apparatus capable of optimizing recording conditions for a magnetic recording medium when the kind of the magnetic tape used for recording is not one stored in memory. In the figure, the same or corresponding parts to those shown in FIG. 52 are designated by the same reference numerals to avoid repeated explanation of such parts. The numeral 54 indicates a third memory for storing data based on which data the control microcomputer 43 controls the characteristic of the detail emphasis circuit 1 at such a value that does not cause problems for any magnetic tape.

In the recording signal detail control apparatus capable of optimizing recording conditions for a magnetic recording medium when the kind of the magnetic tape used for recording is not one stored in memory, data stored in the third memory 54 is read out, and based on the thus readout data, the control microcomputer 43 controls the characteristic of the detail emphasis circuit 1 at such a value that does not cause problems for any magnetic tape.

Embodiment 84

Figure 64:
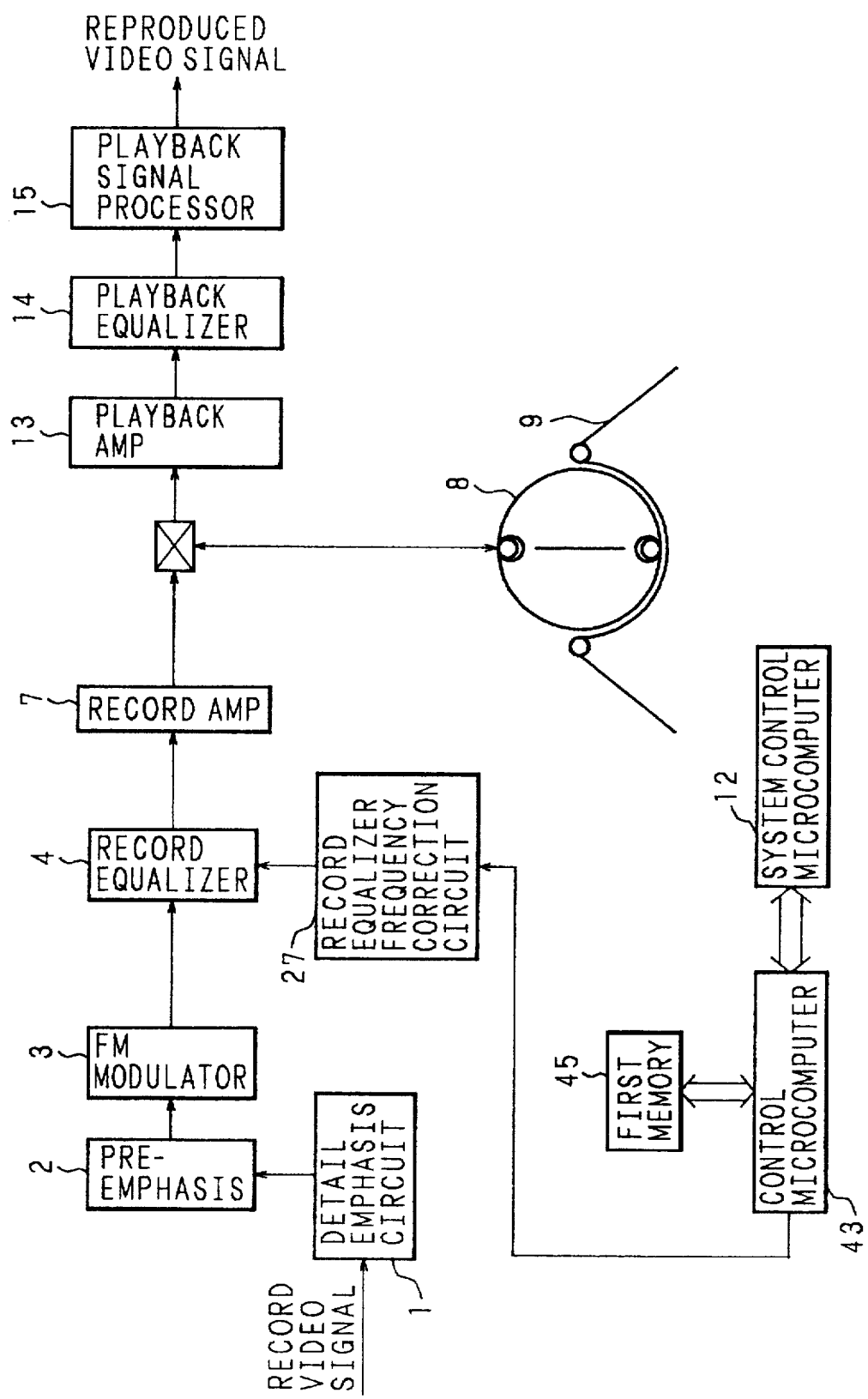
FIG. 64 is a block diagram showing the configuration of another recording signal control apparatus according to the present invention.

Embodiment 54 of the present invention will be described below. FIG. 64 is a block diagram showing one embodiment of a frequency characteristic control apparatus for a recording equalizer frequency control circuit of the invention, capable of optimizing recording conditions for a magnetic recording medium when the kind of the magnetic tape used for recording is not one stored in memory. In the figure, the same or corresponding parts to those shown in FIG. 52 are designated by the same reference numerals to avoid repeated explanation of such parts. The numeral 27 is a recording equalizer frequency correction circuit for controlling the frequency characteristic of the recording equalizer 4 under the control of the control microcomputer 43. In this embodiment, magnetic tape loading and barcode reading operations are the same as those described in Embodiment 40, and therefore, explanation of such operations is not given here.

Furthermore, the standard frequency characteristic of the recording equalizer 4, the playback head output frequency characteristics for tapes A and B when the recording equalizer is set at the standard frequency characteristic, the reproduced video frequency characteristics at the time of the above playback head output frequency characteristics, the corrected frequency characteristics of the recording equalizer for tapes A and B after correction by the recording equalizer frequency correction circuit 27, and the playback video frequency characteristics after correction by the corrected recording equalizer, are the same as shown in FIGS. 27 to 31 previously described.

The operation of this embodiment will now be described. An example of a control operation for controlling the recording signal processing circuitry within the VTR will be explained with reference to FIG. 64. Based on the supplied barcode data, the control microcomputer 43 locates the characteristic data stored in the memory 45 for the magnetic tape cassette 33. In recording, under control of the system microcomputer 12 the incoming video signal is processed by the detail emphasis circuit 1 for detail emphasis, and then fed to the pre-emphasis circuit 2 where recording pre-emphasis is applied. The thus processed signal is converted by the FM modulator 3 into a frequency-modulated wave. The FM wave is then fed to the recording equalizer 4 whose frequency characteristic has been set at the optimum value, as shown in FIG. 30, by the recording equalizer frequency correction circuit 27 under control of the control microcomputer 43. The signal is then passed through the recording amplifier 7 and supplied to the rotating magnetic head 8 for recording on the magnetic tape 9.

In playback, the playback signal played back from the magnetic tape 9 by the rotating magnetic head 8 is amplified by the playback amplifier 13, processed through the playback equalizer 14, and fed to the playback signal processor 15 to reproduce the video signal for output with optimum frequency characteristic as shown in FIG. 31.

Embodiment 55

Embodiment 55 of the present invention will be described. Embodiment 55 is an embodiment in which the barcode reading operation performed after the loading of a magnetic tape cassette in Embodiment 41 (see FIGS. 53 and 54) is incorporated in the control operation of the frequency characteristic control apparatus of Embodiment 54.

Embodiment 56

Embodiment 56 of the present invention will be described. Embodiment 56 is an embodiment in which the barcode reading operation performed after the loading of a magnetic tape cassette in Embodiment 42 (see FIG. 55) is incorporated in the control operation of the frequency characteristic control apparatus of Embodiment 54.

Embodiment 57

Embodiment 57 of the present invention will be described. Embodiment 57 is an embodiment in which the method of Embodiment 43 involving attaching a barcode-printed cassette label 48 to the magnetic tape cassette 33 (see FIG. 56) is applied to Embodiments 54 to 56.

Embodiment 58

Embodiment 58 of the present invention will be described. Embodiment 58 is an embodiment in which the method of Embodiment 44 involving preparing a barcode-printed magnetic tape cassette 49 beforehand is applied to Embodiments 54 to 56.

Embodiment 59

Embodiment 59 of the present invention will be described. Embodiment 59 is an embodiment in which the method of Embodiment 45 involving reading and transmitting barcode information by using the barcode scanner 50 external to the VTR 34 (see FIG. 58) is applied to the frequency characteristic control apparatus of Embodiment 54.

Embodiment 60

Embodiment 60 of the present invention will be described. Embodiment 60 is an embodiment in which the method of Embodiment 46 involving reading barcode information by the barcode scanner and transmitting the barcode information to the VTR 34 by using the remote control unit 51 (see FIG. 58) is applied to the frequency characteristic control apparatus of Embodiment 54.

Embodiment 61

In Embodiments 59 and 60, the barcode carried on the packaging material 31 may be read using the barcode scanner 50 or the remote control unit 51 with a built-in barcode scanner after the magnetic tape cassette 33 has been loaded into the VTR 34, as in Embodiment 47.

Embodiment 62

Embodiment 62 of the present invention will be described. Embodiment 62 is an embodiment in which the method of Embodiment 48 involving transmitting numeric information carried at the bottom of a barcode to the VTR 34 by using the remote control unit 51 external to the VTR 34 (see FIG. 59(a)) is applied to the frequency characteristic control apparatus of Embodiment 54.

Embodiment 63

Embodiment 63 of the present invention will be described. Embodiment 63 is an embodiment in which the method of Embodiment 49 involving inputting numeric information carried at the bottom of the barcode on the packaged magnetic tape cassette 30 into the VTR 34 by using the jog shuttle dial 52 (see FIG. 59(b)) is applied to the frequency characteristic control apparatus of Embodiment 54.

Embodiment 64

In Embodiments 62 and 63, the numeric information at the bottom of the barcode carried on the packaging material 31 may be input using the remote control unit 51 or the jog shuttle dial 52 after the magnetic tape cassette 33 has been loaded into the VTR 34, as in Embodiment 50.

Embodiment 65

Figure 65:
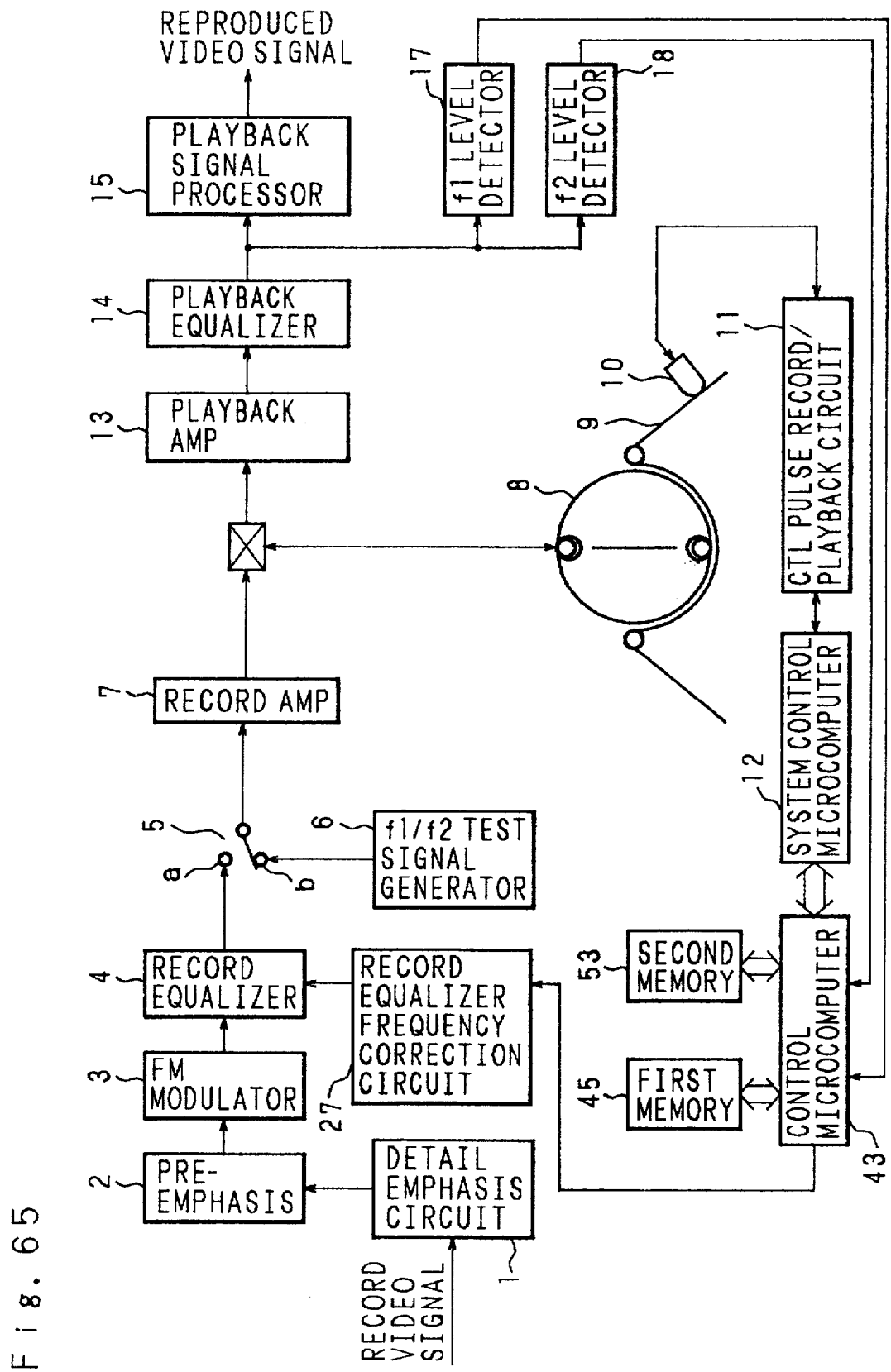
FIG. 65 is a block diagram showing the configuration of another recording signal control apparatus according to the present invention.
Figure 66:
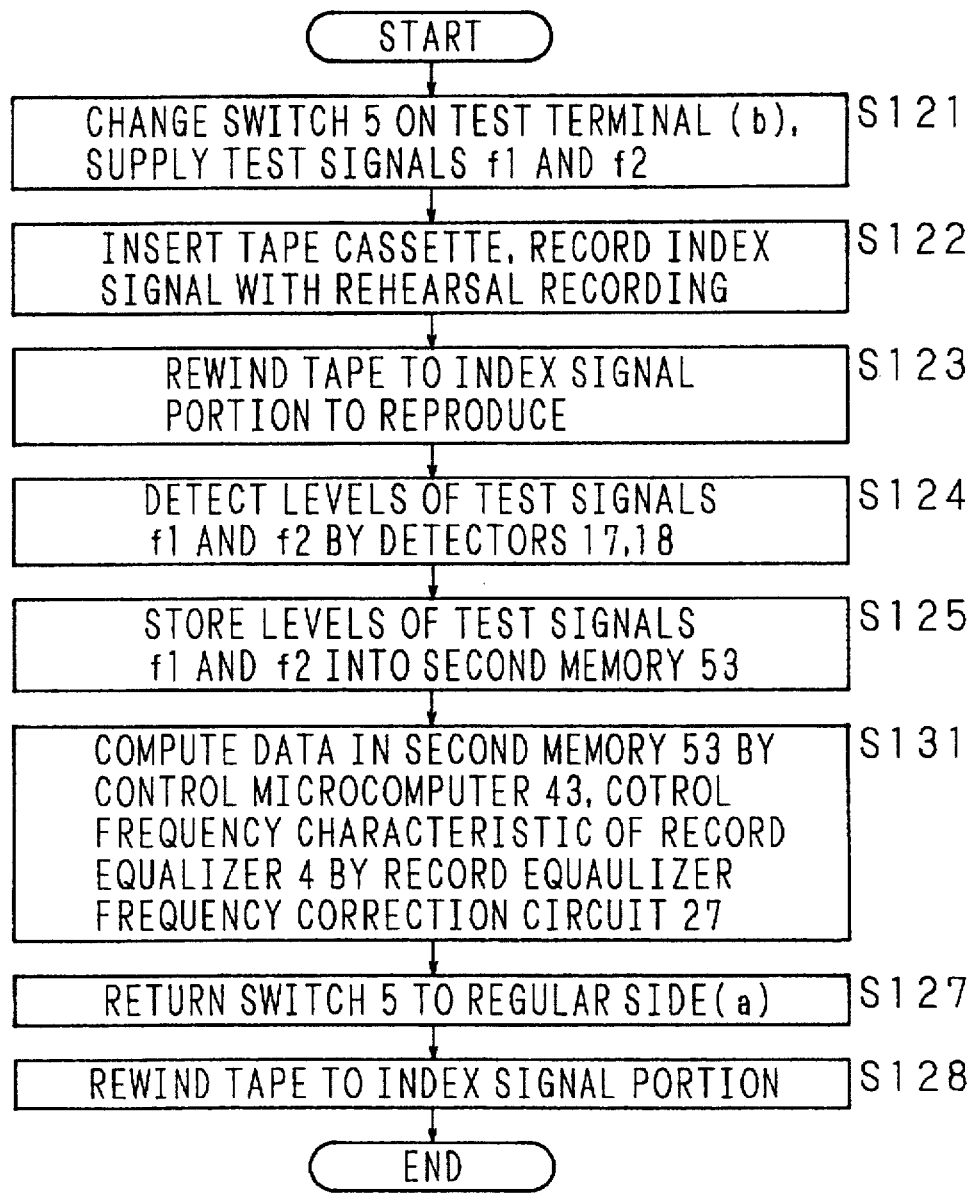
FIG. 66 is a flowchart illustrating a sequence of operations performed in the signal recording control apparatus of the present invention.

Embodiment 65 of the present invention will be described below. FIG. 65 is a block diagram showing one embodiment of the frequency characteristic control apparatus for the recording equalizer, capable of optimizing recording conditions for a magnetic recording medium when the kind of the magnetic tape used for recording is not one stored in memory. In the figure, the same or corresponding parts to those shown in FIGS. 60 and 64 are designated by the same reference numerals to avoid repeated explanation of such parts. FIG. 66 is a flowchart illustrating a sequence of operations according to Embodiment 65, wherein the same processing steps as those illustrated in FIG. 61 are designated by the same step numbers.

The operation of this embodiment will now be described. When, in Embodiments 54 to 64, the kind of the magnetic tape used is not one stored in the first memory 45, the sequence of operations illustrated in the flowchart of FIG. 66 performed under the control of the control microcomputer 43 to detect the optimum recording conditions for the magnetic tape. Of these operations, the same processing operations as performed in Embodiment 51 will not be described here.

In Embodiment 65, signals having the frequency spectra f1 and f2 shown in FIG. 7 or 8 are extracted from the replayed test, signals, and then, the f1 test signal level is detected by the f1 level detector 17 and the f2 test signal level detected by the f2 level detector 18. Each detection level information is supplied to the control microcomputer 43 and the associated characteristic data is stored into the second memory 53. Based on the data stored in the second memory 53, the control microcomputer 43 controls the recording equalizer frequency correction circuit 27, as in Embodiment 54, to control the characteristic frequency of the recording equalizer 4 at the optimum value for the magnetic tape cassette 33 used for recording (step S131).

Embodiment 66

Figure 67:
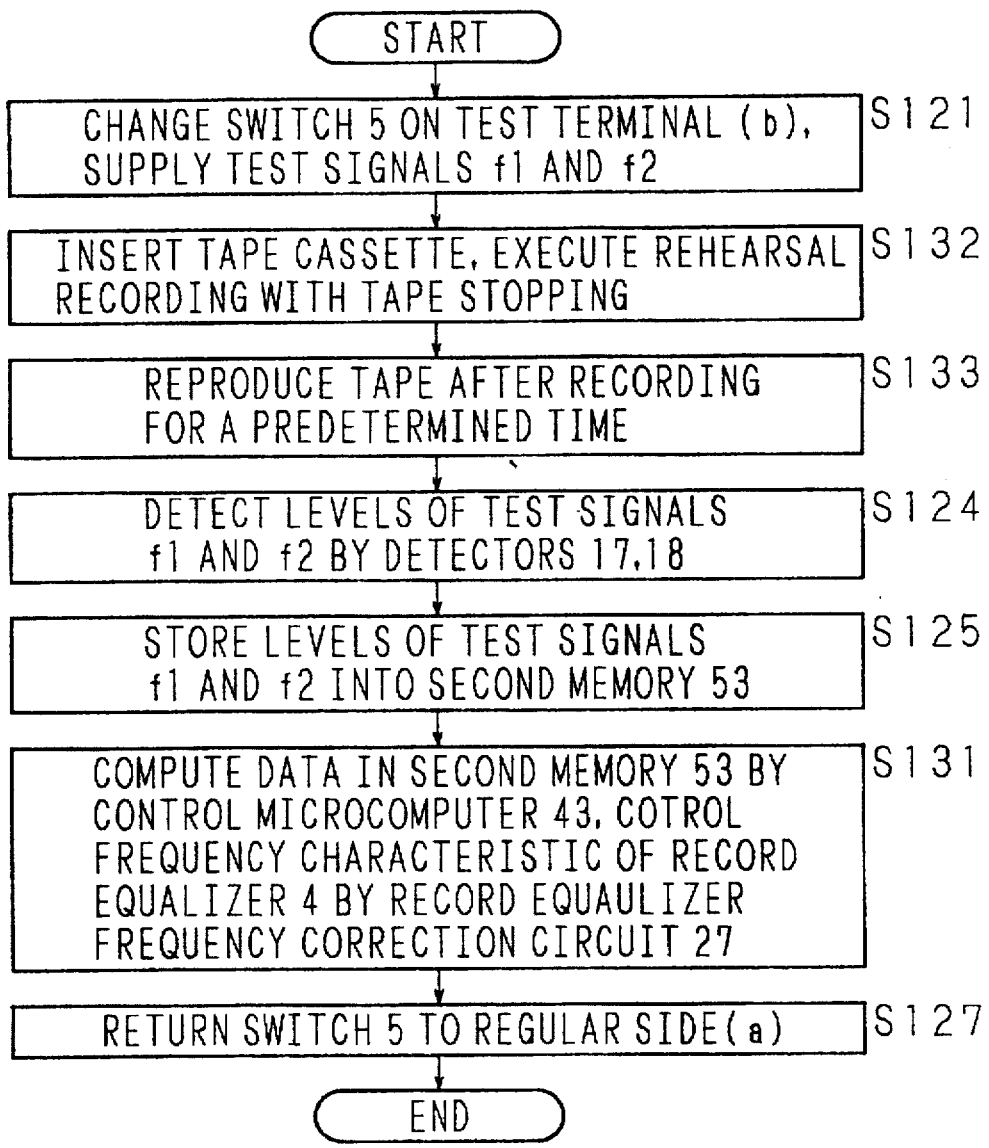
FIG. 67 is a flowchart illustrating a sequence of operations performed in the signal recording control apparatus of the present invention.

Embodiment 66 of the present invention will be described below. The configuration of the apparatus is identical to that of Embodiment 65 shown in FIG. 65. The following describes the operation of Embodiment 66. Embodiment 66 provides the same features as those described in Embodiment 65, the only difference being that, in Embodiment 66, the rehearsal recording is carried out with the magnetic tape held at a stop position. FIG. 67 is a flowchart illustrating a sequence of operations according to Embodiment 66; the same processing steps as those illustrated in FIG. 66 are designated by the same step numbers, and explanation of such steps is omitted herein.

The tape cassette is loaded, and rehearsal recording carried out with the tape held at a stop position (step S132). After recording for a predetermined length of time, the test signals f1 and f2 are replayed (step S133). The processing operations after that are the same as those described in Embodiment 65.

The timings of rehearsal recording and playback performed with the tape held at a stop position are as shown in FIG. 11. Referring to FIG. 117 the test signals as described in the foregoing Embodiment 65 are recorded for one revolution period of the rotating cylinder, and after recording, the test signals are replayed for tape simulation. In FIG. 11, the test signal recording period is made equal to one revolution period of the rotating cylinder, but the recording period may be made longer than one revolution period of the rotating cylinder as necessary.

Embodiment 67

Figure 68:
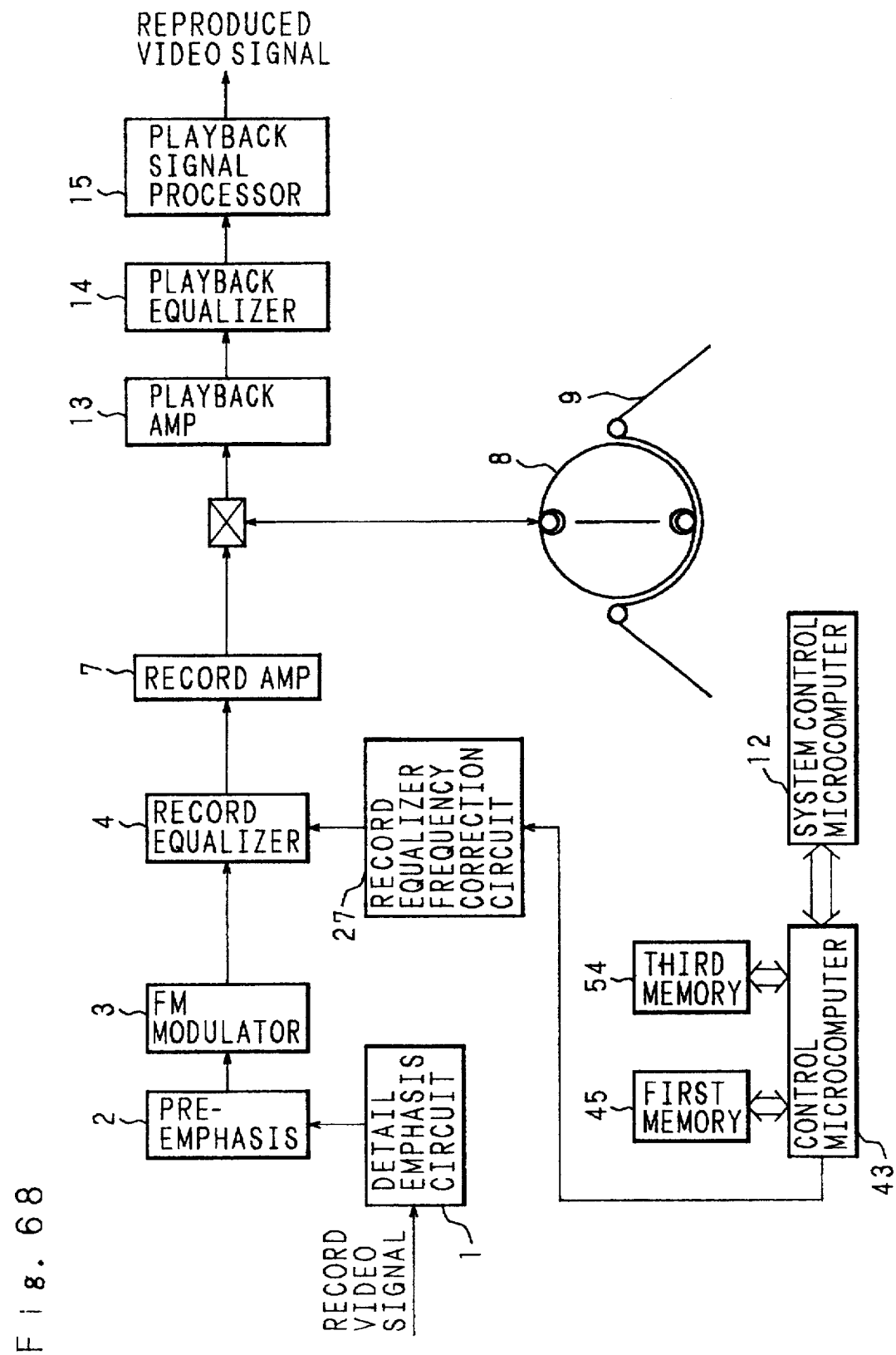
FIG. 68 is a block diagram showing the configuration of another recording signal control apparatus according to the present invention.

Embodiment 67 of the present invention will be described below. FIG. 68 is a block diagram showing one embodiment of the frequency characteristic control apparatus for the recording equalizer, capable of optimizing recording conditions for a magnetic recording medium when the kind of the magnetic tape used for recording is not one stored in memory. In the figure, the same or corresponding parts to those shown in FIG. 64 are designated by the same reference numerals to avoid repeated explanation of such parts. The numeral 54 indicates a third memory for storing data based on which data the control microcomputer 43 controls the recording equalizer frequency correction circuit 27 to control the frequency characteristic of the recording equalizer 4 at such a value that does not cause problems for any magnetic tape.

In the frequency characteristic control apparatus for the recording equalizer capable of optimizing recording conditions for a magnetic recording medium when the kind of the magnetic tape used for recording is not one stored in memory, data stored in the third memory 54 is read out, and based on the thus readout data, the control microcomputer 43 controls the recording equalizer frequency correction circuit 27 to control the frequency characteristic of the recording equalizer 4 at such a value that does not cause problems for any magnetic tape.

Embodiment 68

Figure 69:
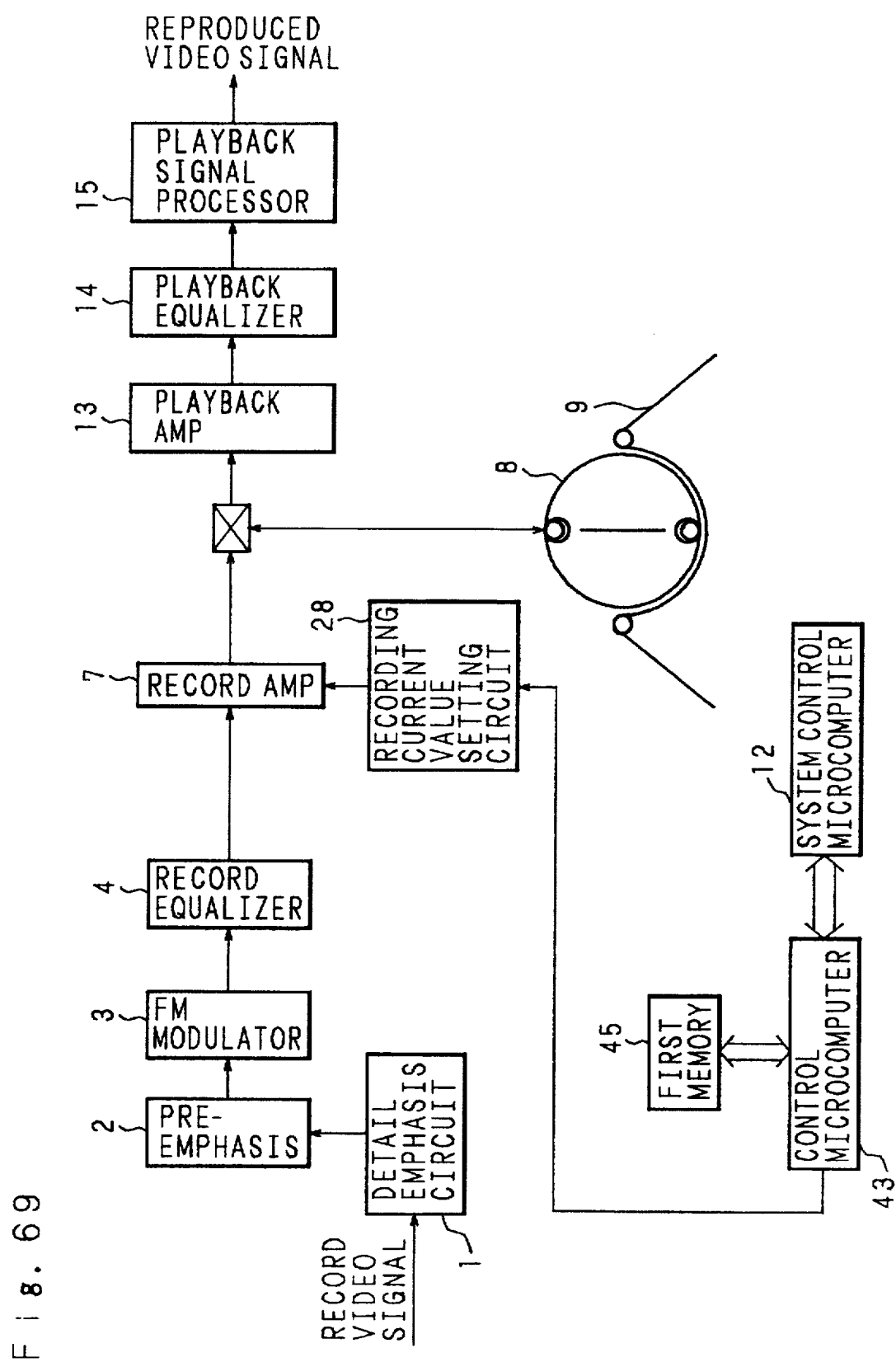
FIG. 69 is a block diagram showing the configuration of another recording signal control apparatus according to the present invention.

Embodiment 68 of the present invention will be described below. FIG. 69 is a block diagram showing a recording current amount control apparatus capable of optimizing recording conditions for a magnetic recording medium according to the present invention. In the figure, the same or corresponding parts to those shown in FIG. 52 are designated by the same reference numerals, and explanation of such parts is not given here. The numeral 28 indicates a recording current value setting circuit for controlling the gain of the recording amplifier 7 under the control of the control microcomputer 43. In this embodiment, the magnetic tape cassette loading and barcode reading operations are the same as described in Embodiment 40, and therefore, will not be described here.

Furthermore, the recording current characteristics representing the playback head output versus the recording current for the f1 and f2 test signals recorded on tapes A and B, and the recording current characteristics when the f1 and f2 test signals have been passed through the recording equalizer set at the standard frequency characteristic shown in FIG. 27, are as shown in FIGS. 38 and 39, respectively.

The operation of this embodiment will now be described. An example of a control operation for controlling the recording signal processing circuitry within the VTR will be explained with reference to FIG. 69. Based on the supplied barcode data, the control microcomputer 43 locates the characteristic data stored in the first memory 45 for the magnetic tape cassette 33. In recording, under control of the system microcomputer 12 the incoming video signal is processed by the detail emphasis circuit 1 for detail emphasis, and then fed to the pre-emphasis circuit 2 where recording pre-emphasis is applied. The thus processed signal is converted by the FM modulator 3 into a frequency-modulated wave whose frequency characteristic is then controlled by the recording equalizer 4. Based on the characteristic data stored in the memory 45 for the magnetic tape cassette 33, the control microcomputer 43 controls the recording current value setting circuit 28 which in turn controls the recording amplifier 7 so that the recording current value is set at IA for tape A and IB for tape B.

Embodiment 69

Embodiment 69 of the present invention will be described. Embodiment 69 is an embodiment in which the barcode reading operation performed after the loading of a magnetic tape cassette in Embodiment 41 (see FIGS. 53 and 54) is incorporated in the control operation of the recording current amount control apparatus of Embodiment 68.

Embodiment 70

Embodiment 70 of the present invention will be described. Embodiment 70 is an embodiment in which the barcode reading operation performed after the loading of a magnetic tape cassette in Embodiment 42 (see FIG. 55) is incorporated in the control operation of the recording current amount control apparatus of Embodiment 68.

Embodiment 71

Embodiment 71 of the present invention will be described. Embodiment 71 is an embodiment in which the method of Embodiment 43 involving attaching a barcode-printed cassette label 48 to the magnetic tape cassette 33 (see FIG. 56) is applied to Embodiments 68 to 70.

Embodiment 72

Embodiment 72 of the present invention will be described. Embodiment 72 is an embodiment in which the method of Embodiment 44 involving preparing a barcode-printed magnetic tape cassette 49 beforehand is applied to Embodiments 68 to 70.

Embodiment 73

Embodiment 73 of the present invention will be described. Embodiment 73 is an embodiment in which the method of Embodiment 45 involving reading and transmitting barcode information by using the barcode scanner 50 external to the VTR 34 (see FIG. 58) is applied to the recording current amount control apparatus of Embodiment 68.

Embodiment 74

Embodiment 74 of the present invention will be described. Embodiment 74 is an embodiment in which the method of Embodiment 46 involving reading barcode information by the barcode scanner and transmitting the barcode information to the VTR 34 by using the remote control unit 51 (see FIG. 58) is applied to the recording current amount control apparatus of Embodiment 68.

Embodiment 75

In Embodiments 73 and 74, the barcode carried on the packaging material 31 may be read using the barcode scanner 50 or the remote control unit 51 with a built-in barcode scanner after the magnetic tape cassette 33 has been loaded into the VTR 34, as in Embodiment 47.

Embodiment 76

Embodiment 76 of the present invention will be described. Embodiment 76 is an embodiment in which the method of Embodiment 48 involving transmitting numeric information carried at the bottom of a barcode to the VTR 34 by using the remote control unit 51 external to the VTR 34 (see FIG. 59(a)) is applied to the recording current amount control apparatus of Embodiment 68.

Embodiment 77

Embodiment 77 of the present invention will be described. Embodiment 77 is an embodiment in which the method of Embodiment 49 involving inputting numeric information carried at the bottom of the barcode on the packaged magnetic tape cassette 30 into the VTR 34 by using the jog shuttle dial 52 (see FIG. 59(b)) is applied to the recording current amount control apparatus of Embodiment 68.

Embodiment 78

In Embodiments 76 and 77, the numeric information at the bottom of the barcode carried on the packaging material 31 may be input using the remote control unit 51 or the jog shuttle dial 52 after the magnetic tape cassette 33 has been loaded into the VTR 34, as in Embodiment 50.

Embodiment 79

Figure 70:
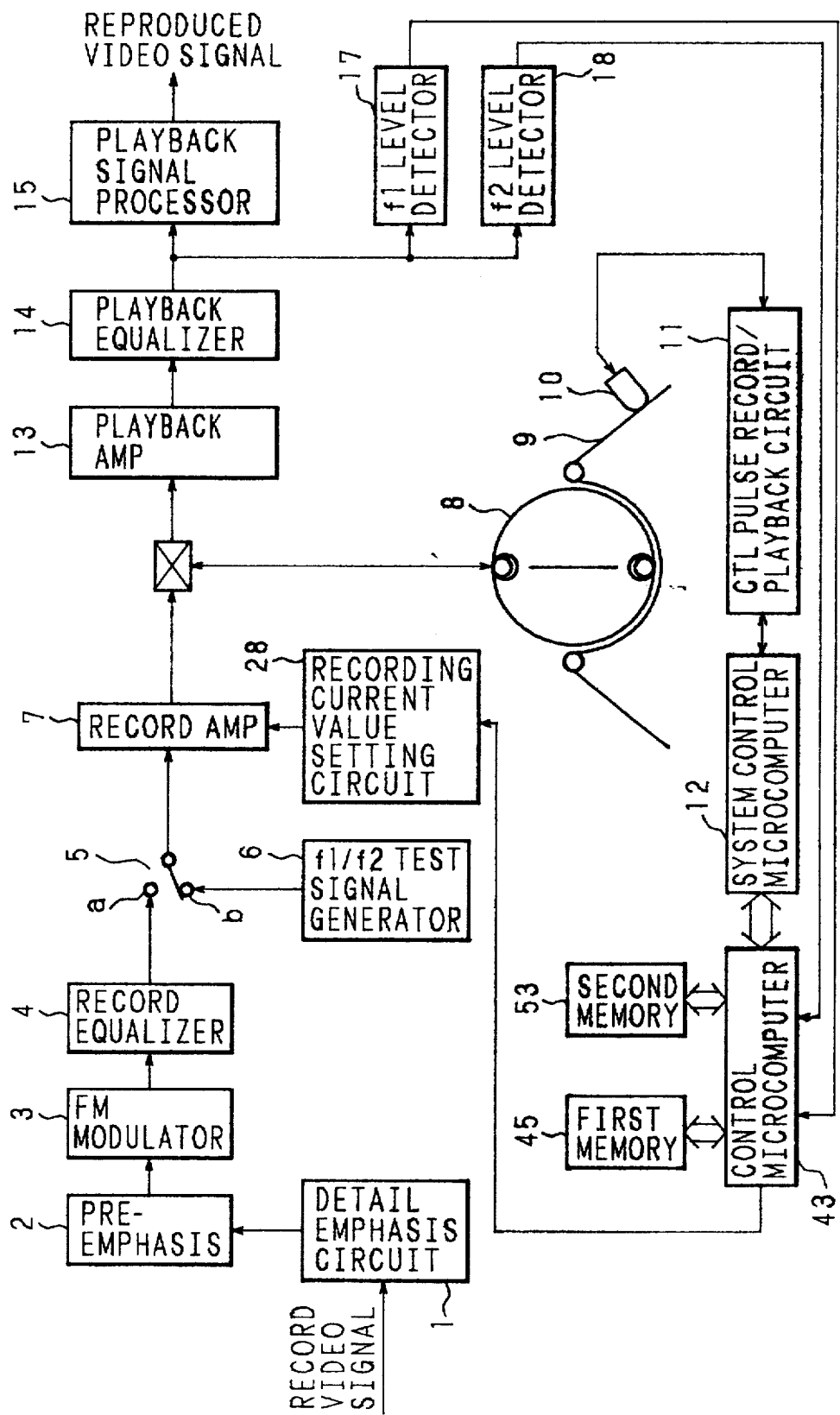
FIG. 70 is a block diagram showing the configuration of another recording signal control apparatus according to the present invention.
Figure 71:
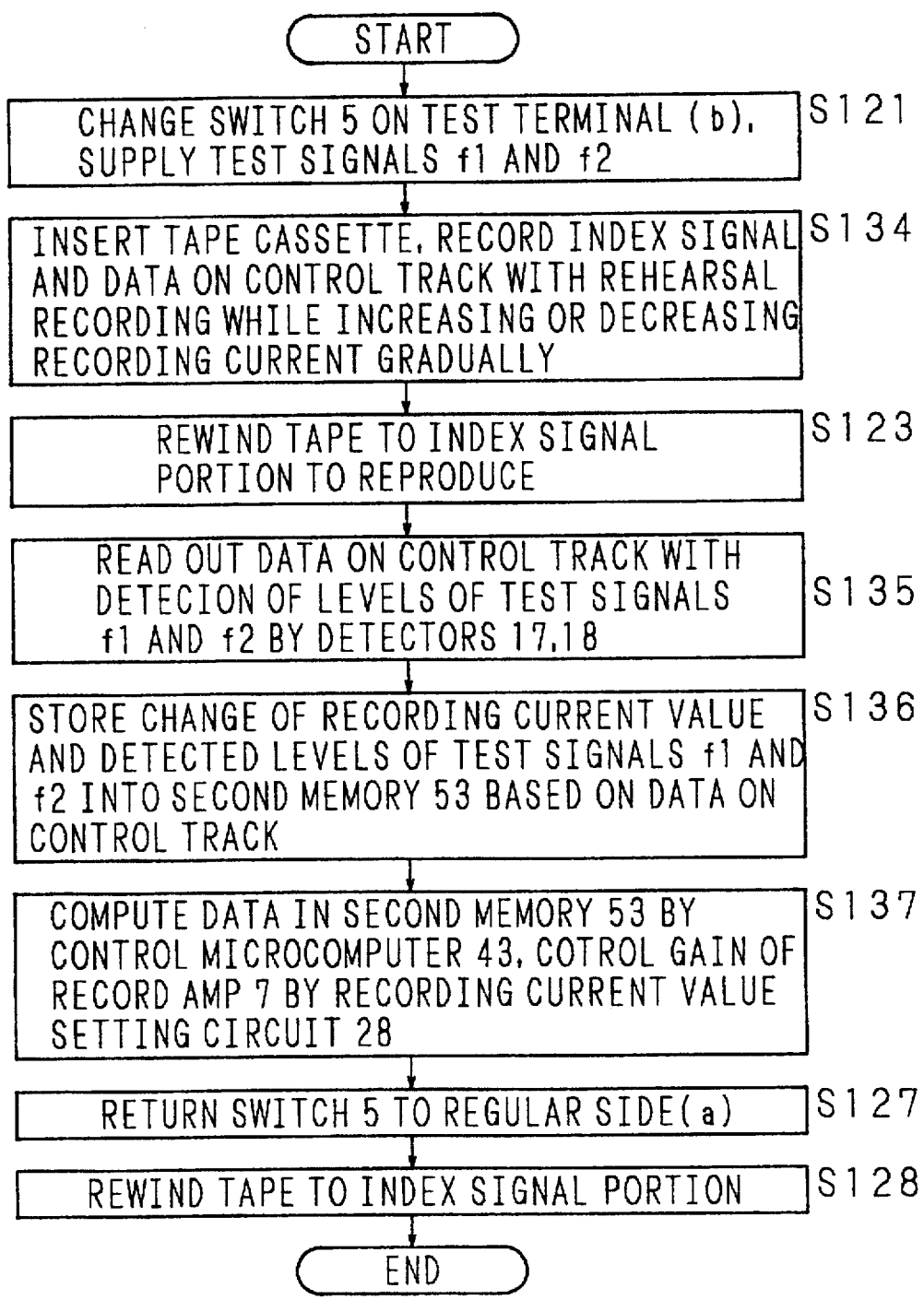
FIG. 71 is a flowchart illustrating a sequence of operations performed in the signal recording control apparatus of the present invention.

Embodiment 79 of the present invention will be described below. FIG. 70 is a block diagram showing one embodiment of the recording current amount control apparatus capable of optimizing recording conditions for a magnetic recording medium when the kind of the magnetic tape used for recording is not one stored in memory. In the figure, the same or corresponding parts to those shown in FIGS. 60 and 69 are designated by the same reference numerals to avoid repeated explanation of such parts. FIG. 71 is a flowchart illustrating a sequence of operations according to Embodiment 79, wherein the same processing steps as those illustrated in FIG. 61 are designated by the same step numbers.

The operation of this embodiment will now be described. When, in Embodiments 68 to 78, the kind of the magnetic tape used is not one stored in the first memory 45, the sequence of operations illustrated in the flowchart of FIG. 71 is performed under the control of the control microcomputer 43 to detect the optimum recording conditions for the magnetic tape. Of these operations, the same processing operations as performed in Embodiment 51 will not be described here.

In recording, the control microcomputer 43 controls the recording current value setting circuit 28 by which the gain of the recording amplifier 7 is gradually increased or decreased to vary the recording current value for the plurality of test signals fed from the f1/f2 test signal generator 6. At the same time, in correspondence to the change of the recording current value, the CTL pulse record/playback circuit 11 under control of the system control microcomputer 12 generates an index signal corresponding to the recording current value and the index signal is thus recorded on the magnetic tape 9 by the control head 10 with the prescribed timing (step S134).

After recording for a length of time necessary for the measurement of the magnetic tape performance, the magnetic tape is rewound to the recording start index signal position, and played back. The test signals thus played back are amplified by the playback amplifier 13 and fed to the playback equalizer 14. The f1 test signal level is detected by the f1 level detector 17 and the f2 test signal level detected by the f2 level detector 18, while at the same time, the index signal indicating the recording current value that was applied for the recording is read from the control track on the magnetic tape 9 by the control head 10 (step S135). The detected levels and the information concerning the recording current values are supplied to the control microcomputer 43 and stored into the second memory 53 (step S136).

When the simulation is completed, the recording current characteristics for the f1 and f2 test signals, stored in the second memory 53, will be as shown in FIG. 38. If frequency characteristic corrections are made by the recording equalizer 4, the obtained data will be as shown in FIG. 39, i.e., the recording current characteristics after passing through the recording equalizer of standard frequency characteristic. For example, in FIG. 39, the O.R.C. value for tape A is IA, and the O.R.C. value for tape B is IB. Based on the data stored in the second memory 53 concerning the result of the simulation of the magnetic tape 9, the control microcomputer 43 controls the recording current value setting circuit 28 to set the gain of the recording amplifier at the optimum value for FM signal recording (step S137).

Embodiment 80

Figure 72:
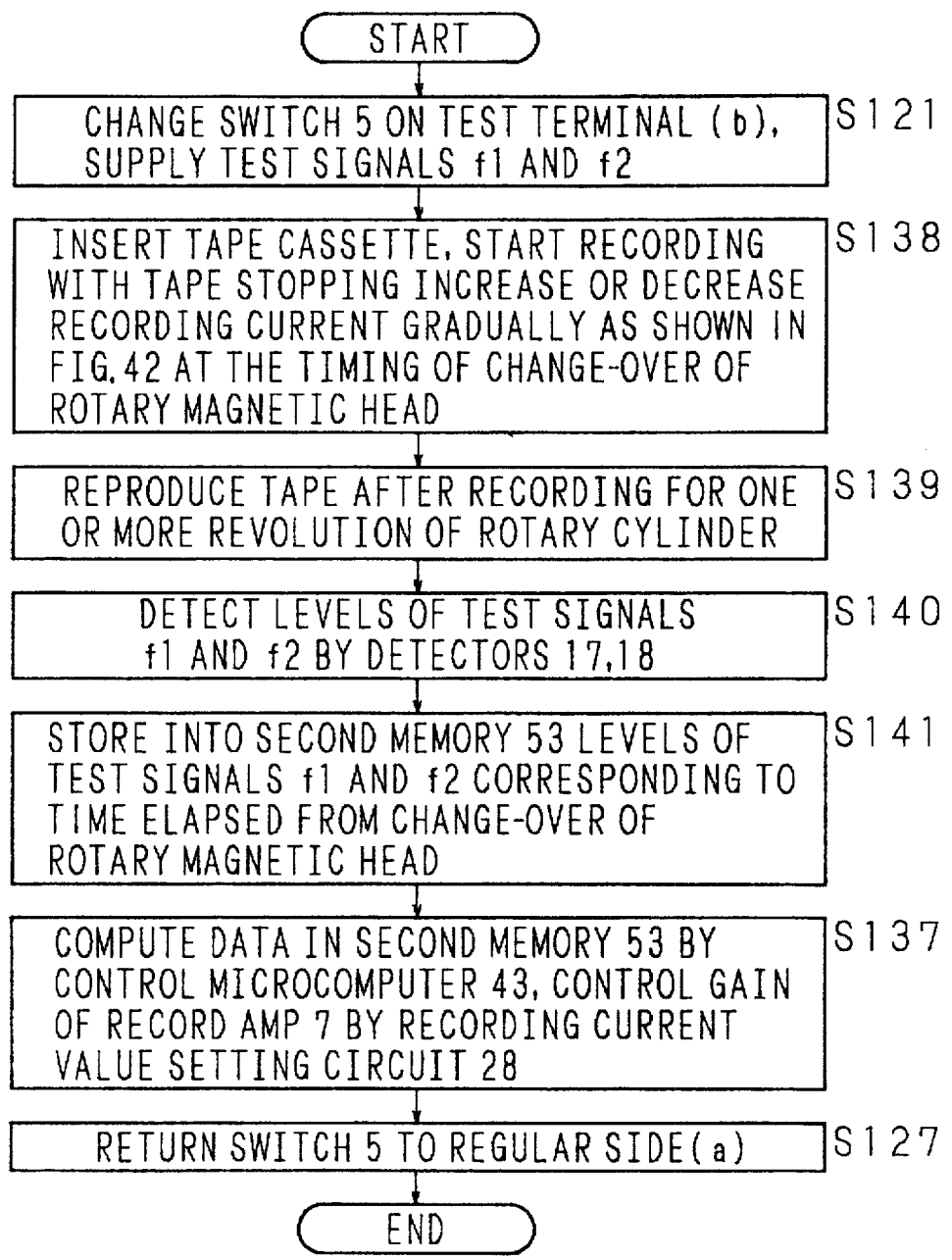
FIG. 72 is a flowchart illustrating a sequence of operations performed in the signal recording control apparatus of the present invention.

Embodiment 80 of the present invention will be described below. The configuration of the apparatus is identical to that of Embodiment 79 shown in FIG. 69. Embodiment 80 provides the same features as described in Embodiment 79, the only difference being that, in Embodiment 80, the rehearsal recording is carried out with the magnetic tape held at a stop position. FIG. 72 is a flowchart illustrating a sequence of operations according to Embodiment 80, wherein the same processing steps as those illustrated in FIG. 71 are designated by the same step numbers and explanation of such steps is not given here. The timings of rehearsal recording and playback carried out with the tape held at a stop position are the same as shown in FIGS. 42(a) to 42(e).

The operation of this embodiment will now be described. Test signals are recorded with the tape held at a stop position while varying the recording current as shown in FIG. 42(c) (step S138). After the recording is complete, the test signals are played back (step S139), and the variations in the reproduction levels of the test signals f1 and f2, as shown in FIGS. 42(d) and 42(e), are detected (step S140). Data measured along the time with the rotating magnetic head change-over timing shown in FIG. 42(a) as the start point are stored in the second memory 53 (step S141). Based on the measured data, the control microcomputer 43 finds elapsed times, t1L, t1R, t2L, and t2R, elapsed from the rotating magnetic head change-over timing until the reproduction level becomes optimum, and from these elapsed times, the control microcomputer 43 calculates elapsed times, t1 and t2, elapsed from the rotating magnetic head change-over timing, and the recording current value O.R.C. at each of the elapsed times. Thus, based on the data stored in the second memory 53 concerning the result of the simulation of the magnetic tape 9, the control microcomputer 43 controls the recording current value setting circuit 28 to set the gain of the recording amplifier 7 at the optimum value for FM signal recording. In FIG. 42, the recording period is made equal to one revolution period of the rotating cylinder, but the recording period may be made longer than one revolution period of the rotating cylinder as necessary.

Embodiment 81

Figure 73:
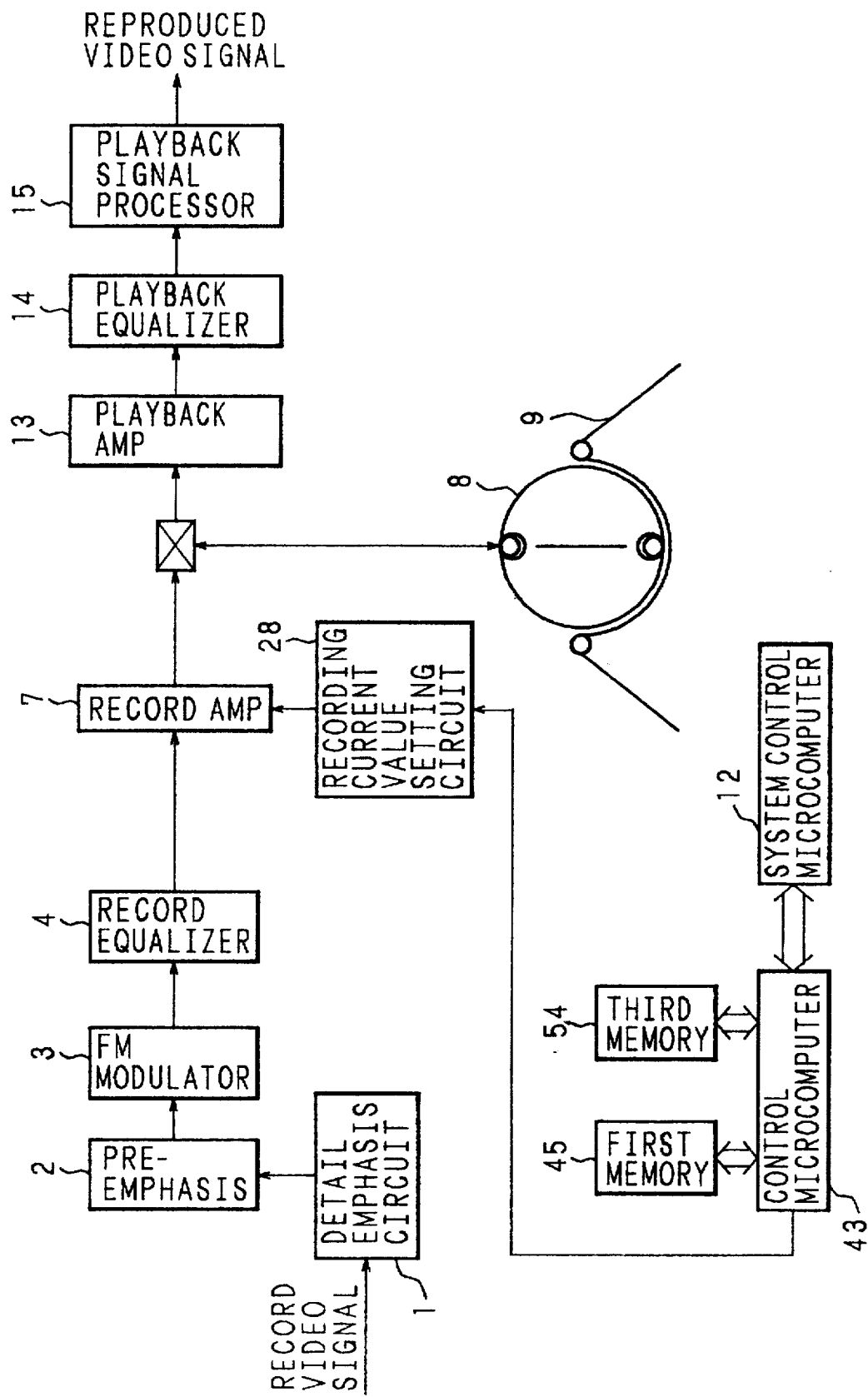
FIG. 73 is a block diagram showing the configuration of another recording signal control apparatus according to the present invention.

Embodiment 81 of the present invention will be described below. FIG. 73 is a block diagram showing one embodiment of the recording current amount control apparatus capable of optimizing recording conditions for a magnetic recording medium when the kind of the magnetic tape used for recording is not one stored in memory. In the figure, the same or corresponding parts to those shown in FIG. 69 are designated by the same reference numerals to avoid repeated explanation of such parts. The numeral 54 indicates a third memory for storing data based on which data the control microcomputer 43 controls the recording current value setting circuit 28 so that the recording current value is set at such a value that does not cause problems for any magnetic tape.

In the recording current amount control apparatus capable of optimizing recording conditions for a magnetic recording medium when the kind of the magnetic tape used recording is not one stored in memory, data stored in the third memory 54 is read out, and based on the thus readout data, the control microcomputer 43 controls the recording current value setting circuit 28 so that the recording current value is set at such a value that does not cause problems for any magnetic tape.

Embodiment 82

Figure 74:
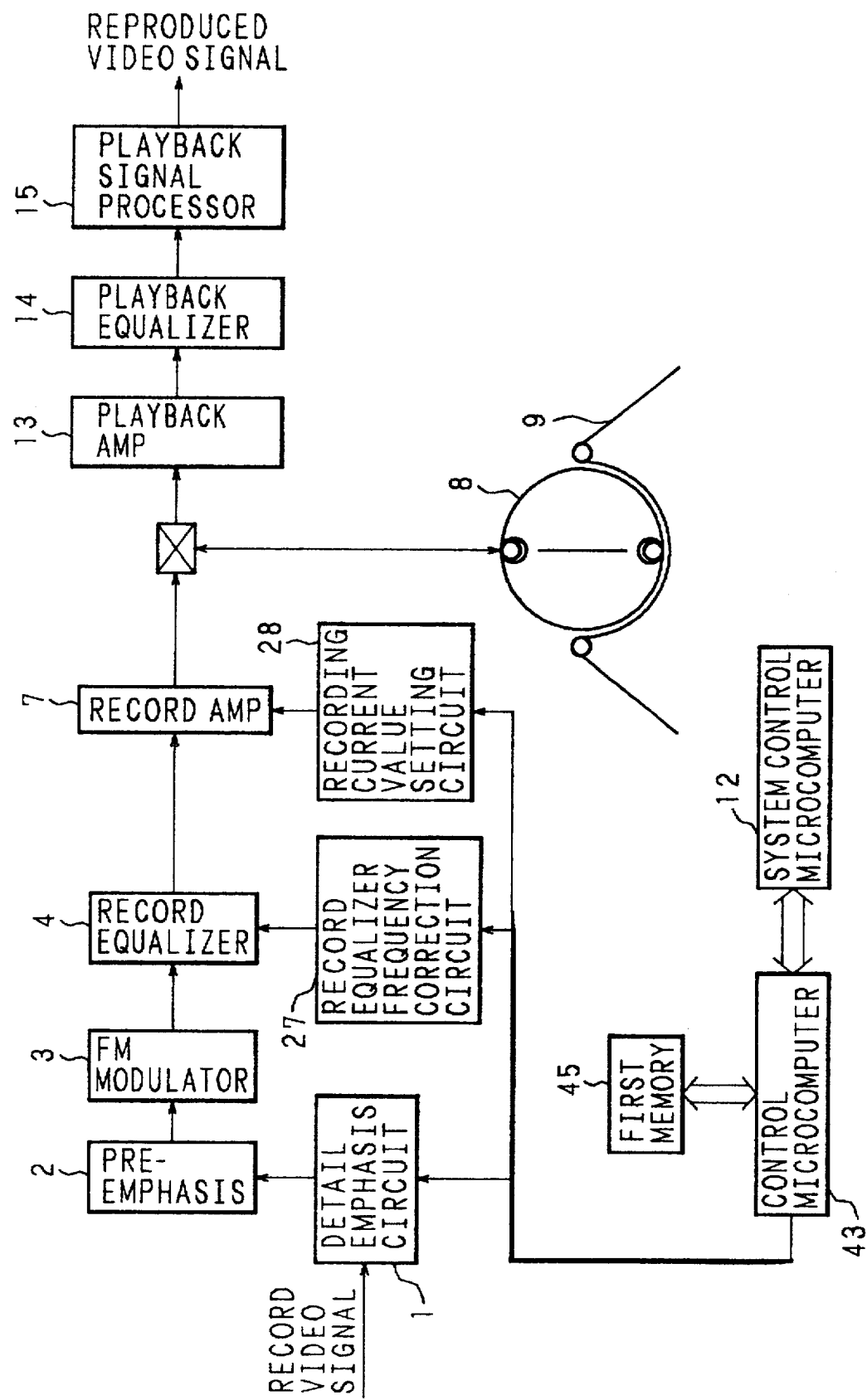
FIG. 74 is a block diagram showing the configuration of another recording signal control apparatus according to the present invention.

Embodiment 82 of the present invention will be described below. FIG. 74 is a block diagram showing a recording signal control apparatus of the invention capable of optimizing recording conditions for a magnetic recording tape. In the figure, the same or corresponding parts to those shown in FIGS. 52, 64, and 69 are designated by the same reference numerals, and explanation of such parts is not given here. The optimum recording current characteristics obtained after the correction of the frequency characteristic of the recording equalizer 4 are as shown in FIG. 40. In this embodiment, magnetic tape cassette loading and barcode reading operations are the same as those described in Embodiment 40, and therefore, explanation of such operations is not given here.

The operation of this embodiment will now be described. Based on the readout barcode data, the control microcomputer 43 identifies the kind of the magnetic tape 9 stored in the first memory 45, reads its associated characteristic data, and controls the detail emphasis circuit 1, the recording equalizer frequency correction circuit 27, and the recording current setting circuit 28, all at the same time or in any combination thereof, so that the amount of emphasis that the detail emphasis circuit 1 applies to the incoming video signal, the frequency characteristic of the recording equalizer 4, and the gain of the recording amplifier for FM signal recording are controlled at the respective optimum values all at the same time or in any combination thereof.

For example, when the frequency characteristic of the recording equalizer 4 and the gain of the recording amplifier 7 are set at the respective optimum values by the recording equalizer frequency correction circuit 27 and the recording current value setting circuit 28, the obtained data will be as shown in FIG. 39, i.e. the recording current characteristics after passing through the recording equalizer of standard frequency characteristic, the O.R.C. being IA for tape A and IB for tape B. Furthermore, if frequency characteristic corrections are made by the recording equalizer 4, the obtained data will be as shown in FIG. 40, i.e., the optimum recording current characteristics obtained after correction of the recording equalizer 4, and further, the recording amplifier 7 controls the recording current characteristics at O.R.C., i.e. at IA and IB, at both frequencies of the f1 and f2 test signals.

Embodiment 83

Embodiment 83 of the present invention will be described. Embodiment 83 is an embodiment in which the barcode reading operation performed after the loading of a magnetic tape cassette in Embodiment 41 (see FIGS. 53 and 54) is incorporated in the control operation of the recording signal control apparatus of Embodiment 82.

Embodiment 84

Embodiment 84 of the present invention will be described. Embodiment 84 is an embodiment in which the barcode reading operation performed after the loading of a magnetic tape cassette in Embodiment 42 (see FIG. 55) is incorporated in the control operation of the recording signal control apparatus of Embodiment 82.

Embodiment 85

Embodiment 85 of the present invention will be described. Embodiment 85 is an embodiment in which the method of Embodiment 43 involving attaching a barcode-printed cassette label 48 to the magnetic tape cassette 33 (see FIG. 56) is applied to Embodiments 82 to 84.

Embodiment 86

Embodiment 86 of the present invention will be described. Embodiment 86 is an embodiment in which the method of Embodiment 44 involving preparing a barcode-printed magnetic tape cassette 49 beforehand is applied to Embodiments 82 to 84.

Embodiment 87

Embodiment 87 of the present invention will be described. Embodiment 87 is an embodiment in which the method of Embodiment 48 involving reading and transmitting barcode information by using the barcode scanner 80 external to the VTR 34 (see FIG. 88) is applied to the recording signal control apparatus of Embodiment 82.

Embodiment 88

Embodiment 88 of the present invention will be described. Embodiment 88 is an embodiment in which the method of Embodiment 46 involving reading barcode information by the barcode scanner and transmitting the barcode information to the VTR 34 by using the remote control unit 51 (see FIG. 58) is applied to the recording signal control apparatus of Embodiment 82.

Embodiment 89

In Embodiments 87 and 88, the barcode carried on the packaging material 31 may be read using the barcode scanner 50 or the remote control unit 51 with a built-in barcode scanner after the magnetic tape cassette 33 has been loaded into the VTR 34, as in Embodiment 47.

Embodiment 90

Embodiment 90 of the present invention will be described. Embodiment 90 is an embodiment in which the method of Embodiment 48 involving transmitting numeric information carried at the bottom of a barcode to the VTR 34 by using the remote control unit 51 external to the VTR 34 (see FIG. 69(a)) is applied to the recording signal control apparatus of Embodiment 82.

Embodiment 91

Embodiment 91 of the present invention will be described. Embodiment 91 is an embodiment in which the method of Embodiment 49 involving inputting numeric information carried at the bottom of the barcode on the packaged magnetic tape cassette 30 into the VTR 34 by using the jog shuttle dial 52 (see FIG. 59(b)) is applied to the recording signal control apparatus of Embodiment 82.

Embodiment 92

In Embodiments 90 and 91, the numeric information at the bottom of the barcode carried on the packaging material 31 may be input using the remote control unit 51 or the jog shuttle dial 52 after the magnetic tape cassette 33 has been loaded into the VTR 34, as in Embodiment 50.

Embodiment 93

Figure 75:
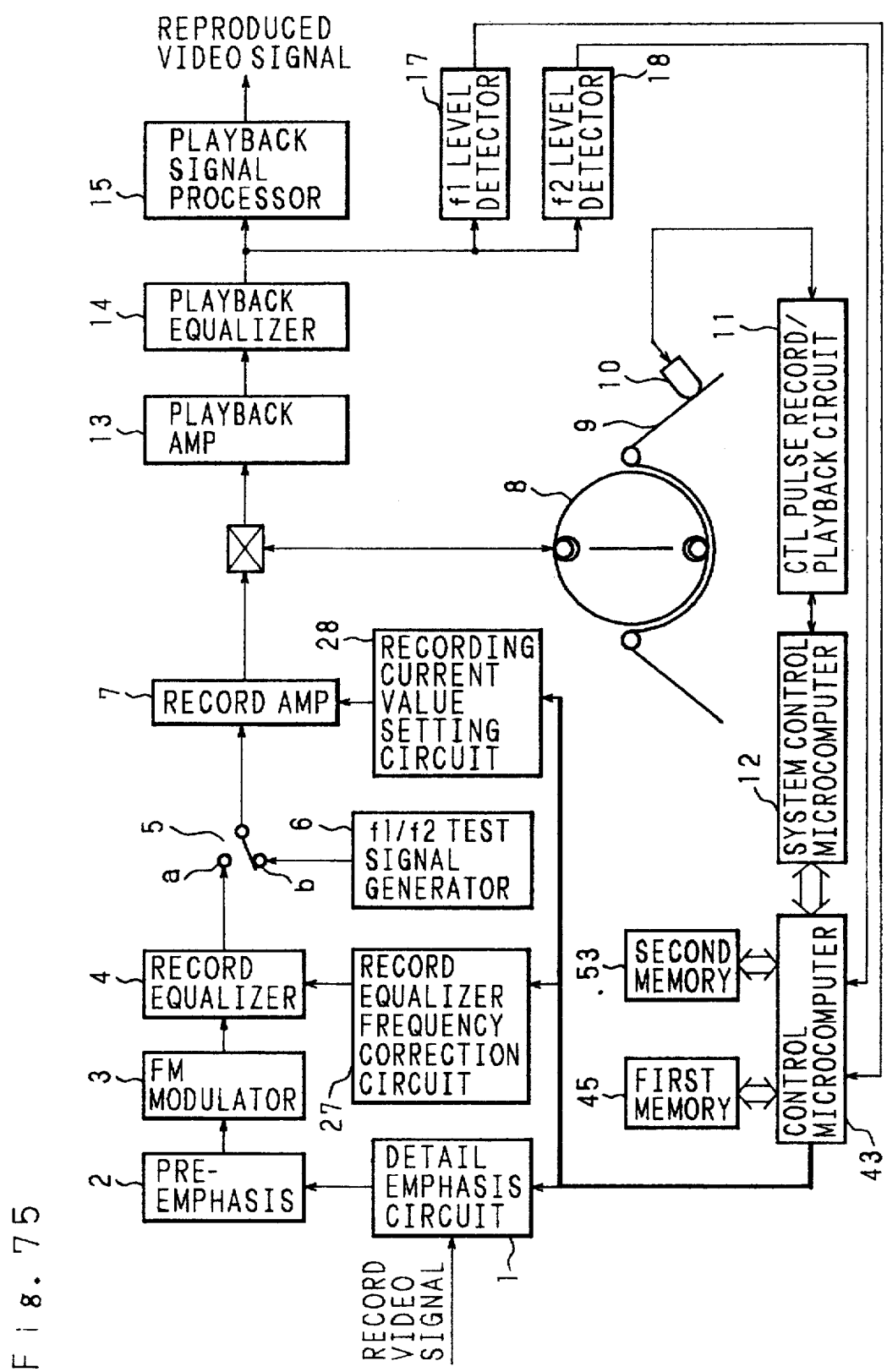
FIG. 75 is a block diagram showing the configuration of another recording signal control apparatus according to the present invention.

Embodiment 93 of the present invention will be described below. FIG. 75 is a block diagram showing one embodiment of the recording signal control apparatus capable of optimizing recording conditions for a magnetic recording medium when the kind of the magnetic tape used for recording is not one stored in memory. In the figure, the same or corresponding parts to those shown in FIGS. 60, 65, and 70 are designated by the same reference numerals, and explanation of such parts is not given here.

The operation of this embodiment will now be described. When, in Embodiments 82 to 92, the kind of the magnetic tape used for recording is not one stored in the first memory 45, a sequence of operations illustrated in the following flowchart are performed under control of the control microcomputer 43 to detect the optimum recording conditions for the magnetic tape. In Embodiment 93, when controlling the recording current value and the detail emphasis amount for signal recording, the processing operations illustrated in the flowchart of FIG. 71 are combined with the steps in the flowchart of FIG. 61 that relate to the control of the detail emphasis amount. Likewise, when controlling the recording current value and the frequency characteristic of the recording equalizer, the processing operations illustrated in the flowchart of FIG. 71 are combined with the steps in the flowchart of FIG. 66 that relate to the control of the frequency characteristic of the recording equalizer. On the other hand, when controlling the detail emphasis amount and the frequency characteristic of the recording equalizer, the processing operations illustrated in the flowchart of FIG. 61 are combined with the steps in the flowchart of FIG. 66 that relate to the control of the frequency characteristic of the recording equalizer. Multiple control operations are thus performed in Embodiment 93.

Furthermore, when all the three factors, i.e. the recording current value, the detail emphasis amount, and the frequency characteristic of the recording equalizer, are to be controlled for signal recording, the processing operations illustrated in the flowchart of FIG. 71 are combined with the steps in the flowchart of FIG. 61 that relate to the control of the detail emphasis amount and also with the steps in the flowchart of FIG. 66 that relate to the control of the frequency characteristic of the recording equalizer. Thus, the control microcomputer 43 controls all or any combination of the detail emphasis circuit 1, the recording equalizer frequency correction circuit 27, and the recording current value setting circuit 28, so that the amount of emphasis that the detail emphasis circuit 1 applies to the incoming video signal, the frequency characteristic of the recording equalizer 4, and the gain of the recording amplifier 7 for FM signal recording, are controlled at the respective optimum values all at the same time or in any combination thereof.

Embodiment 94

Embodiment 94 of the present invention will be described below. The configuration of the apparatus is identical to that of Embodiment 93 shown in FIG. 75. The following describes the operation of this embodiment. Embodiment 94 provides the same features as those in Embodiment 93, the only difference being that in Embodiment 94, the rehearsal recording is carried out with the magnetic tape held at a stop position.

In Embodiment 94, when, in Embodiments 82 to 92, the kind of the magnetic tape used for recording is not one stored in memory, the control microcomputer 43 performs a sequence of operations by combining appropriate steps selected from the flowcharts of FIGS. 62, 67, and 72, to detect the optimum recording conditions for the magnetic tape.

Embodiment 95

Figure 76:
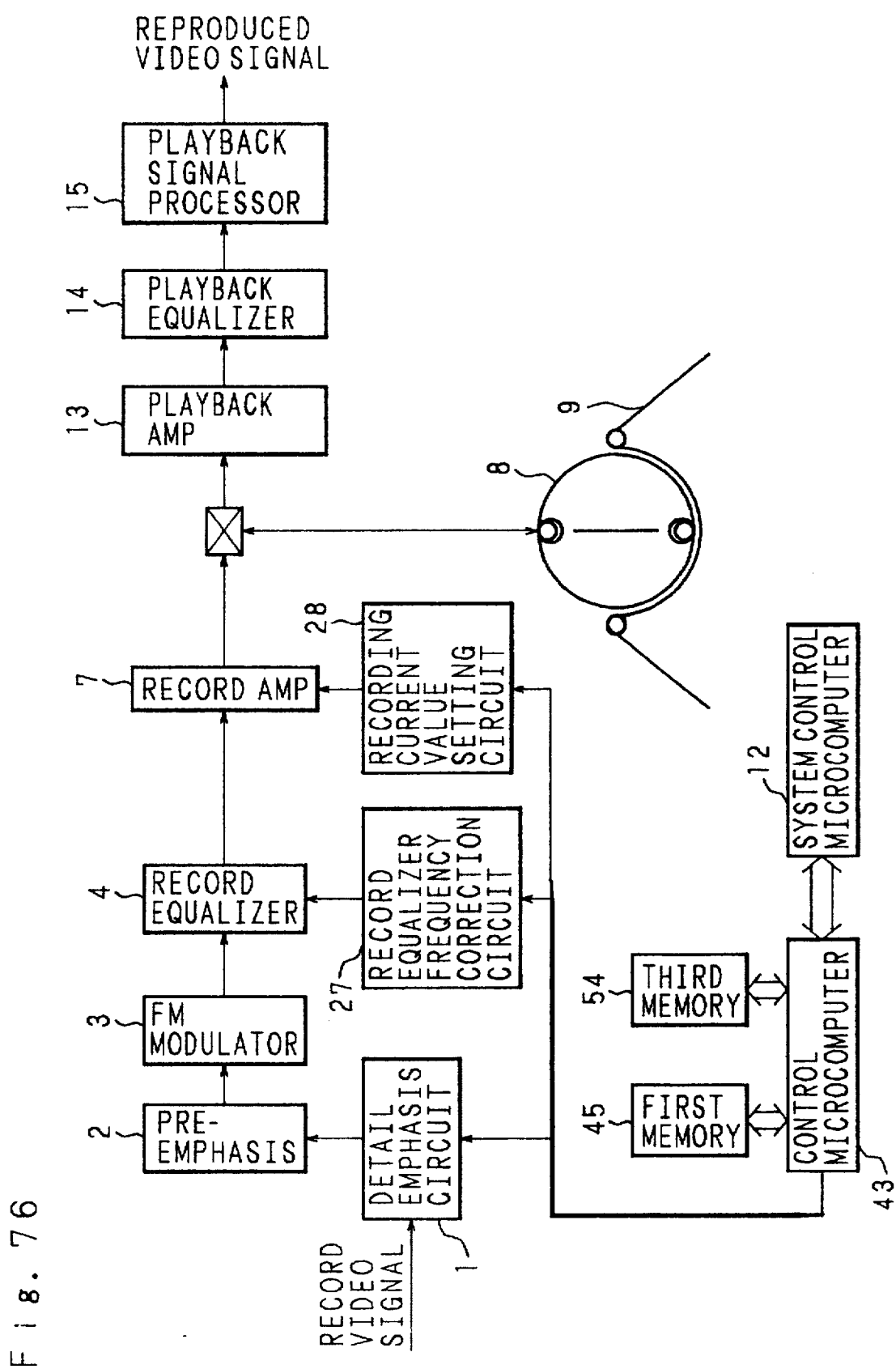
FIG. 76 is a block diagram showing the configuration of another recording signal control apparatus according to the present invention.

Embodiment 95 of the present invention will be described below. FIG. 76 is a block diagram showing one embodiment of the recording signal control apparatus capable of optimizing recording conditions for a magnetic recording medium when the kind of the magnetic tape used for recording is not one stored in memory. In the figure, the same or corresponding parts to those shown in FIG. 74 are designated by the same reference numbers, and explanation of such parts is not given here. The numeral 54 indicates a third memory for storing data based on which data the control microcomputer 43 controls the detail emphasis circuit 1, the recording equalizer frequency correction circuit 27, and the recording current value setting circuit 28 so that the amount of emphasis that the detail emphasis circuit 1 applies to the incoming video signal, the frequency characteristic of the recording equalizer 4, and the gain of the recording amplifier 7 for FM signal recording are controlled at such values that do not cause problems for any magnetic tape.

In the recording signal control apparatus matched to a magnetic recording medium when the kind of the magnetic tape used for recording is not one stored in memory, the control microcomputer 43 reads out the data stored in the third memory 54 and controls the detail emphasis circuit 1, the recording equalizer frequency correction circuit 27, and the recording current value setting circuit 28, all at the same time or in any combination thereof, so that all of the three factors, i.e. the amount of emphasis that the detail emphasis circuit 1 applies to the incoming video signal, the frequency characteristic of the recording equalizer 4, and the gain of the recording amplifier 7 for FM signal recording, or any combination of these factors, are controlled at such values that do not cause problems for any magnetic tape.

Embodiment 96

Embodiment 96 of the present invention will be described. In Embodiments 51, 52, 65, 66, 79, 80, 93, and 94, there is further provided means for inputting the kind of the magnetic tape cassette 33 used for rehearsal recording and for storing the same into the memory 45, so that data is stored in the memory 45 at the end of the tape simulation, thereby adding to the list of magnetic tapes stored in the memory.

Embodiment 97

Figure 77:
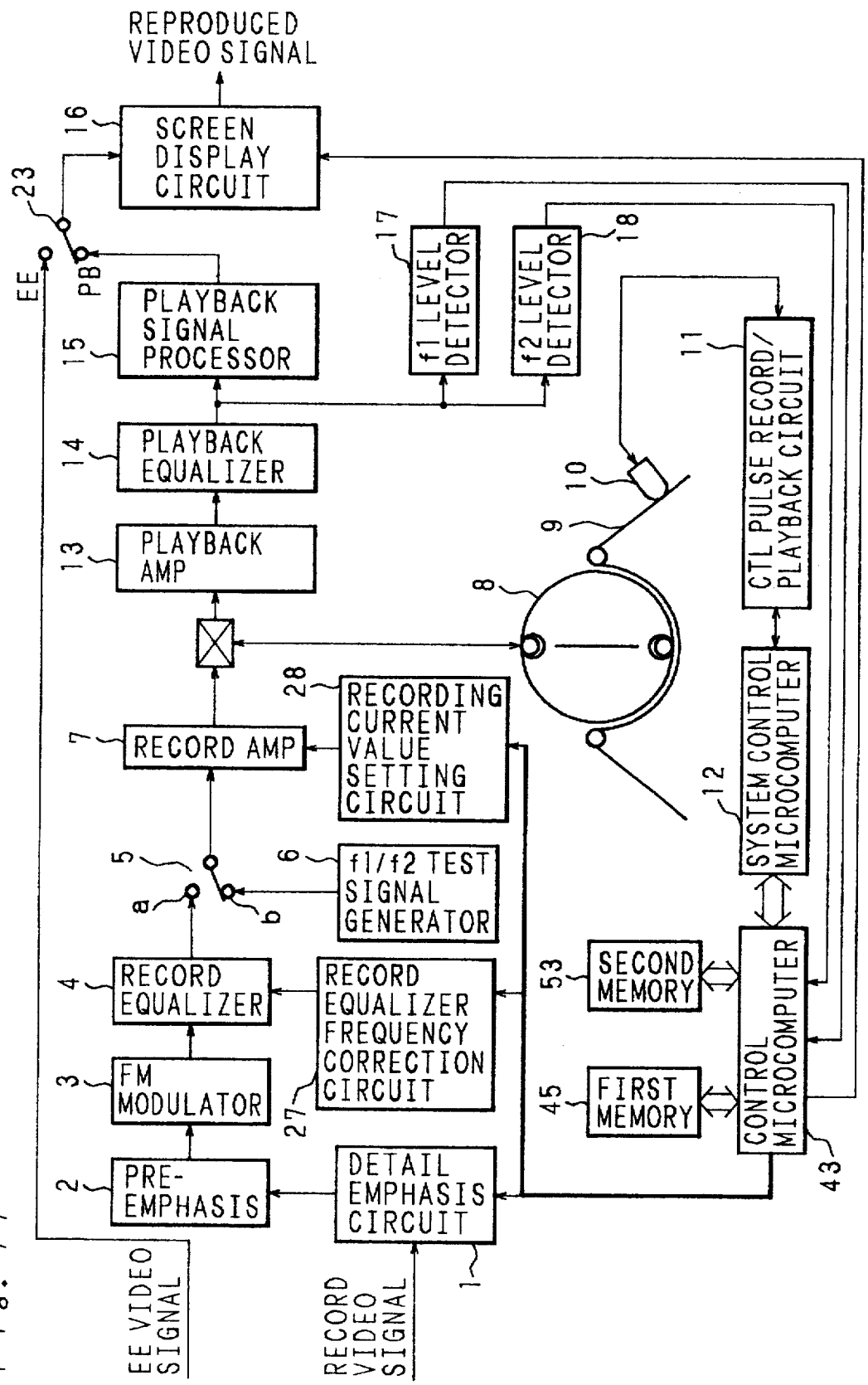
FIG. 77 is a block diagram showing the configuration of another recording signal control apparatus according to the present invention.
Figure 78B:
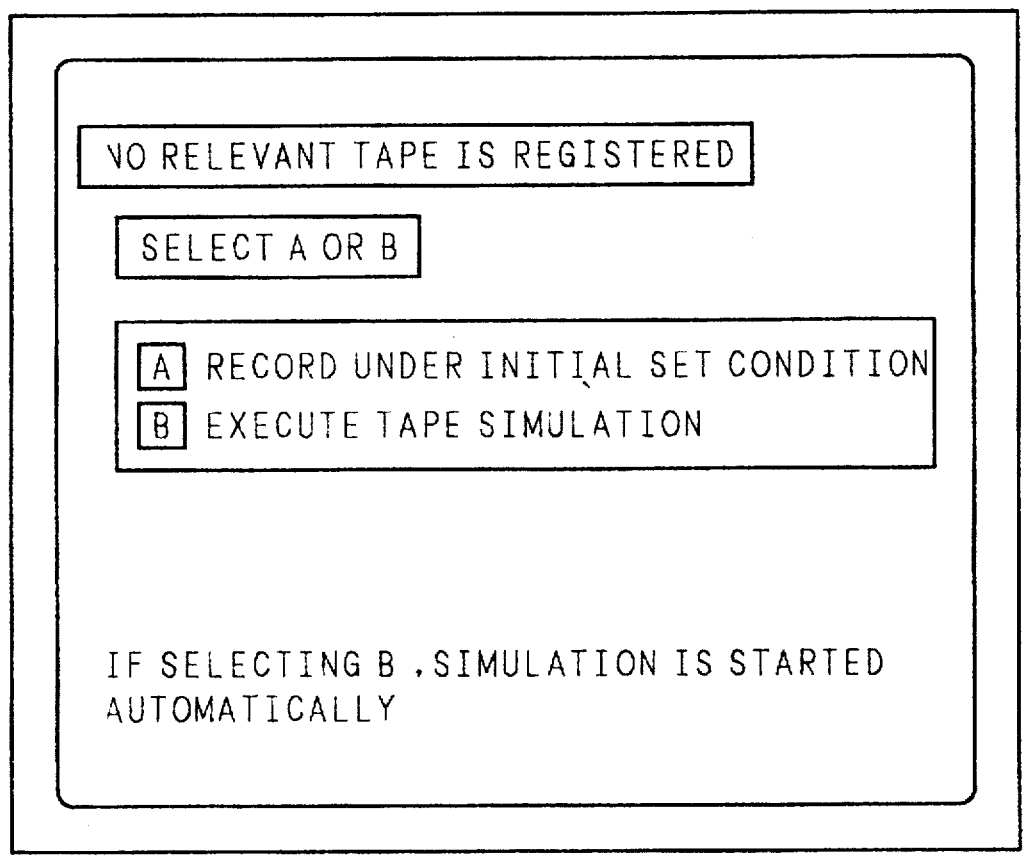

Embodiment 97 of the present invention will be described below. FIG. 77 is a block diagram showing one embodiment of the recording signal control apparatus capable of optimizing recording conditions for a magnetic recording medium and having the function of displaying the kind of the magnetic tape used. In the figure, the same or corresponding parts to those shown in FIG. 75 are designated by the same reference numerals, and explanation of such parts is not given here. The apparatus of this embodiment further comprises a switch 23 for switching between an EE video signal for recording and a PB video signal for playback, and a screen display circuit 16 for outputting information onto a video signal output screen. FIG. 78(a) shows an example of a monitor screen displaying the kind of the magnetic cassette tape 33 used for recording in the recording signal control apparatus of this embodiment.

The operation of this embodiment will now be described. The control microcomputer 43 reads out the kind of the magnetic tape cassette 33 stored in the first memory 45 used in Embodiments 40 to 50, 54 to 64, 68 to 78, and 82 to 92, and sends the readout data to the screen display circuit 16 to display the kind of the magnetic tape cassette used for recording on the monitor screen as shown in FIG. 78(*a*).

Embodiment 98

In Embodiment 97, only one kind of magnetic cassette tape 33 whose data has been read is displayed on the monitor screen as shown in FIG. 78(*a*), but alternatively, more than one kind of magnetic cassette tape 33 previously stored in the first memory 45 may be displayed for selection.

Embodiment 99

In Embodiment 97, since the screen display circuit 16 is placed on the output side of the EE/PB selector switch 23, the kind of the magnetic cassette tape 33 used for recording can be displayed when playing back the tape. On the other hand, if such display in playback is not needed, the screen display circuit 16 may be placed on the EE terminal side of the EE/PB selector switch 23.

Embodiment 100

The screen display device of Embodiment 97 may be adapted to produce a display screen similar to the one shown in FIG. 78(*b*), so that the user can choose whether to carry out the tape simulation of Embodiment 51, 52, 65, 66, 79, 80, 93, or 94, or to perform recording using such initial set values that do not cause problems for any magnetic tape cassette 33 as in Embodiments 53, 67, 81, and 95.

Embodiment 101

Embodiment 101 of the present invention will be described. The configuration described in Embodiment 8 (see FIG. 5) may be employed for the construction of the f1/f2 test signal generator 6 used in Embodiments 51, 52, 65, 66, 79, 80, 93, and 94.

Embodiment 102

Embodiment 102 of the present invention will be described. The configuration described in Embodiment 9 (see FIG. 6) may be employed for the construction of the f1/f2 test signal generator 6 used in Embodiments 51, 52, 65, 66, 79, 80, 93, and 94.

Embodiment 103

In Embodiments 101 and 102, instead of using the sub-carrier frequency of the chroma signals, a signal in the vicinity of 4 MHz available within the VTR, such as the clock signal of a microcomputer, may be used to generate the f1 test signal, as in Embodiment 10.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. In a magnetic recording and reproduction apparatus for recording and reproducing recording signals on a magnetic recording medium, a recording signal control apparatus capable of improving recording conditions for the magnetic recording medium, comprising:

reading means for reading information indicating the magnetic recording medium is a type of magnetic tape;

detail emphasizing means capable of varying an amount of detail emphasis applied to the recording signals;

memory means for storing the different types of at least two magnetic tapes and characteristic data concerning an optimum amount of detail emphasis for each of the at least two magnetic tapes; and control means for controlling the amount of detail emphasis to be applied by said detail emphasizing means at a time of recording of the recording signals, based on the type of magnetic tape read by said reading means and the characteristic data stored in said memory means.

2. The recording signal control apparatus of claim 1, wherein said reading means includes a scanner for reading the information from a barcode attached to a magnetic tape cassette housing the magnetic tape, at the time of loading the magnetic tape cassette into the magnetic recording and reproduction apparatus or after loading the magnetic tape cassette into the magnetic recording and reproduction apparatus.

3. The recording signal control apparatus of claim 2, wherein said scanner also serves as a stabilizer.

4. The recording signal control apparatus of claim 1, wherein said reading means reads the information from a barcode identifying the type of the magnetic tape, located on a cassette label, attached to a magnetic tape cassette housing the magnetic tape.

5. A magnetic tape cassette, with a barcode attached thereon, used with said recording signal control apparatus of claim 1, wherein a barcode identifying the type of the magnetic tape used for recording is carried on a prescribed portion of the magnetic tape cassette.

6. The recording signal control apparatus of claim 1, further comprising:

means for generating a plurality of test signals of different frequencies when the type of the magnetic tape used for recording is not stored in said memory means;

recording means for recording the plurality of test signals on recording tracks on the magnetic tape;

means for automatically rewinding recorded portions after recording for a predetermined length of time and for replaying the recorded portions;

detecting means for detecting a level of each of the plurality of replayed test signals;

second memory means for storing the detected test signal levels; and recognizing means for recognizing a characteristic of the magnetic tape from the detected test signal levels stored in said second memory means, wherein, based on the characteristic of said magnetic tape, said control means controls the amount of detail emphasis at an optimum value for recording.

7. The recording signal control apparatus of claim 6, further comprising:

means for storing in said memory means the optimum amount of detail emphasis for the recording of recording signals on the magnetic tape; and means for storing the type of the magnetic tape in said memory means.

8. The recording signal control apparatus of claim 1, further comprising:

means for generating a plurality of test signals of different frequencies when the type of the magnetic tape used for recording is not stored in said memory means;

recording means for recording the plurality of test signals on recording tracks on the magnetic tape;

means for automatically rewinding recorded portions after recording for a predetermined length of time and for replaying the recorded portions while holding the magnetic tape in a stop position;

detecting means for detecting a level of each of the plurality of replayed test signals;

second memory means for storing the detected test signal levels; and recognizing means for recognizing a characteristic of said magnetic tape from the detected test signal levels stored in said second memory means, wherein, based on the characteristic of the magnetic tape, said control means controls the amount of detail emphasis at an optimum value for recording.

9. The recording signal control apparatus of claim 1, further comprising:

third memory means for storing data for an amount of detail emphasis that does not cause problems for recording signals on any type of magnetic tape, wherein when the type of the magnetic tape used for recording is not stored in said memory means, said control means controls the amount of detail emphasis at an optimum value for recording, based on the data stored in said third memory means.

10. The recording signal control apparatus of claim 1, further comprising:

means for displaying the type of the magnetic tape used for recording.

11. In a magnetic recording and reproduction apparatus for recording and reproducing recording signals on a magnetic recording medium, a recording signal control apparatus capable of improving recording conditions for the magnetic recording medium, comprising:

external reading means for reading a barcode carried on packaging of a magnetic tape cassette and identifying a type of magnetic tape as the magnetic recording medium used for recording;

means for transmitting the type of magnetic tape read by said reading means to the magnetic recording and reproduction apparatus;

detail emphasizing means capable of varying an amount of detail emphasis applied to the recording signals;

memory means for storing the different types of at least two magnetic tapes and characteristic data concerning an optimum amount of detail emphasis for each of the at least two magnetic tapes; and control means for controlling the amount of detail emphasis to be applied by said detail emphasizing means at the time of recording of the recording signals, based on the type of magnetic tape transmitted from said transmitting means and the characteristic data stored in said memory means.

12. In a magnetic recording and reproduction apparatus for recording and reproducing recording signals on a magnetic recording medium, a recording signal control apparatus capable of improving recording conditions for the magnetic recording medium, comprising:

input means for inputting directly into the magnetic recording and reproduction apparatus a numeric value on a barcode carried on the packaging of a magnetic tape cassette which identifies a type of magnetic tape as the magnetic recording medium used for recording;

detail emphasizing means capable of varying an amount of detail emphasis applied to the recording signals;

memory means for storing the different types of at least two magnetic tapes and characteristic data concerning an optimum amount of detail emphasis for each of the at least two magnetic tapes; and control means for controlling the amount of detail emphasis to be applied by said detail emphasizing means at the time of recording of the recording signals, based on the type of magnetic tape input from said input means and the characteristic data stored in said memory means.

13. In a magnetic recording and reproduction apparatus for recording and reproducing recording signals on a magnetic recording medium, a recording signal control apparatus capable of improving recording conditions for the magnetic recording medium, comprising:

reading means for reading information indicating the magnetic recording medium is a type of magnetic tape;

recording equalizer means capable of varying a frequency characteristic of an FM recording signal for recording;

memory means for storing the different types of at least two magnetic tapes and characteristic data optimized for each of the at least two magnetic tapes; and control means for controlling the frequency characteristic of said recording equalizer means for recording of the FM recording signal, based on the type of magnetic tape read by said reading means and the characteristic data stored in said memory means.

14. The recording signal control apparatus of claim 13, wherein said reading means includes a scanner for reading the information from a barcode attached to a magnetic tape cassette housing the magnetic tape at the time of loading the magnetic tape cassette into the magnetic recording and reproduction apparatus or after loading the magnetic tape cassette into the magnetic recording and reproduction apparatus.

15. The recording signal control apparatus of claim 14, wherein said scanner also serves as a stabilizer.

16. The recording signal control apparatus of claim 13, wherein said reading means reads the information from a barcode identifying the type of the magnetic tape located on a cassette label attached to a magnetic tape cassette housing the magnetic tape.

17. A magnetic tape cassette, with a barcode attached thereon, used with said recording signal control apparatus of claim 13, the barcode identifying the type of the magnetic tape used for recording is carried on a prescribed portion of the magnetic tape cassette.

18. The recording signal control apparatus of claim 13, further comprising:

means for generating a plurality of test signals of different frequencies when the type of the magnetic tape used for recording is not stored in said memory means;

recording means for recording the plurality of test signals on recording tracks on the magnetic tape;

means for automatically rewinding recorded portions after recording for a predetermined length of time and for replaying the recorded portions;

detecting means for detecting a level of each of the plurality of relayed test signals;

second memory means for storing the detected test signal levels; and recognizing means for recognizing a characteristic of said magnetic tape from the detected test signal levels stored in said second memory means, wherein, based on the characteristic of said magnetic tape, said control means controls the frequency characteristic of said recording equalizer means for recording of the FM recording signal.

19. The recording signal control apparatus of claim 18, further comprising:
means for storing in said memory means the frequency characteristic data of said recording equalizer means optimized for recording with the magnetic tape; and
means for storing the type of the magnetic tape in said memory means.

20. The recording signal control apparatus of claim 13, further comprising:
means for generating a plurality of test signals of different frequencies when the type of the magnetic tape used for recording is not stored in said memory means;
recording means for recording the plurality of test signals on recording tracks on the magnetic tape;
means for automatically rewinding recorded portions after recording for a predetermined length of time and for replaying the recorded portions while holding the magnetic tape in a stop position;
detecting means for detecting the level of each of the plurality of replayed test signals;
second memory means for storing the detected test signal levels; and
recognizing means for recognizing a characteristic of said magnetic tape from the detected test signal levels stored in said second memory means,
wherein, based on the characteristic of the magnetic tape, said control means controls the frequency characteristic of said recording equalizer means for recording of the FM recording signal.

21. The recording signal control apparatus of claim 13, further comprising:
third memory means for storing frequency characteristic data of said recording equalizer means that does not cause problems for recording the FM recording signal on any type of magnetic tape,
wherein when the type of the magnetic tape used for recording is not stored in said memory means, said control means controls the frequency characteristic of said recording equalizer means for recording of the FM recording signal, based on the data stored in said third memory means.

22. The recording signal control apparatus of claim 13, further comprising:
means for displaying the type of the magnetic tape used for recording.

23. In a magnetic recording and reproduction apparatus for recording and reproducing recording signals on a magnetic recording medium, a recording signal control apparatus capable of improving recording conditions for the magnetic recording medium, comprising:
external reading means for reading a barcode on packaging of a magnetic tape cassette which identifies a type of magnetic tape as the magnetic recording medium used for recording;
means for transmitting the type of magnetic tape read by said reading means to the magnetic recording and reproduction apparatus;
recording equalizer means capable of varying a frequency characteristic of an FM recording signal for recording;
memory means for storing the different types of at least two magnetic tapes and characteristic data of said recording equalizer means optimized for each of the at least two magnetic tapes; and
control means for controlling the frequency characteristic of said recording equalizer means for recording of the FM recording signal, based on the type of magnetic tape transmitted from said transmitting means and the characteristic data stored in said memory means.

24. In a magnetic recording and reproduction apparatus for recording and reproducing recording signals on a magnetic recording medium, a recording signal control apparatus capable of improving recording conditions for the magnetic recording medium, comprising:
input means for inputting directly into the magnetic recording and reproduction apparatus a numeric value on a barcode carried on the packaging of a magnetic tape cassette which identifies a type of magnetic tape as the magnetic recording medium used for recording;
recording equalizer means capable of varying a frequency characteristic of an FM recording signal for recording;
memory means for storing the different types of at least two magnetic tapes and characteristic data of said recording equalizer means optimized for each of the at least two magnetic tapes; and
control means for controlling the frequency characteristic of said recording equalizer means for recording of the FM recording signal, based on the type of magnetic tape input from said input means and the characteristic data stored in said memory means.

25. In a magnetic recording and reproduction apparatus for recording and reproducing recording signals on a magnetic recording medium, a recording signal control apparatus capable of improving recording conditions for the magnetic recording medium, comprising:
reading means for reading information indicating the magnetic recording medium is a type of magnetic tape;
recording amplifier means capable of varying an amount of recording current for recording an FM recording signal;
memory means for storing the different types of at least two magnetic tapes and characteristic data concerning an optimum amount of recording current for recording with each of the at least two magnetic tapes; and
control means for controlling the amount of recording current based on the type of magnetic tape read by said reading means and the characteristic data stored in said memory means.

26. The recording signal control apparatus of claim 25, wherein
said reading means includes a scanner for reading the information from a barcode attached to a magnetic tape cassette housing the magnetic tape at the time of loading the magnetic tape cassette into the magnetic recording and reproduction apparatus or after loading the magnetic tape cassette into the magnetic recording and reproduction apparatus.

27. The recording signal control apparatus of claim 26, wherein
said scanner also serves as a stabilizer.

28. The recording signal control apparatus of claim 25, wherein said reading memory reads the information from
a barcode identifying the type of the magnetic tape located on a cassette label attached to a magnetic tape cassette housing the magnetic tape.

29. A magnetic tape cassette, with a barcode attached thereon, used with said recording signal control apparatus of claim 25, the barcode identifying the type of the magnetic tape used for recording is carried on a prescribed portion of the magnetic tape cassette.

30. The recording signal control apparatus of claim 25, further comprising:

test signal generating means for generating a plurality of test signals of different frequencies when the type of the magnetic tape used for recording is not stored in said memory means;

recording means for recording the plurality of test signals on recording tracks of the magnetic tape while gradually increasing or decreasing the recording current;

means for recording data corresponding to variations of the recording current amount onto a control track on the magnetic tape;

means for automatically rewinding recorded portions after recording for a predetermined length of time and for replaying the recorded portions;

detecting means for detecting a level of each of the plurality of replayed test signals;

second memory means for storing variations in the detected test signal levels and variations in the recording current amount;

means for calculating an optimum recording current value for the magnetic tape from the variations of the detected test signal levels and the variation of the recording current amount; and control means for controlling the recording current amount for the magnetic tape based on the optimum recording current value.

31. The recording signal control apparatus of claim 30, further comprising:

means for storing the optimum recording current value in said memory means; and means for storing the type of said magnetic tape into said memory means.

32. The recording signal control apparatus of claim 25, further comprising:

means for generating a plurality of test signals of different frequencies when the type of the magnetic tape used for recording is not stored in said memory means;

recording means for recording the plurality of test signals on recording tracks on the magnetic tape while gradually increasing or decreasing the recording current for every half-revolution cycle corresponding to a rotating magnetic head change-over timing;

means for automatically replaying recorded portions after recording for a predetermined length of time while holding the magnetic tape in a stop position;

detecting means for detecting a level of each of the plurality of replayed test signals;

means for reading data concerning the recording current amount recorded for a duration of time elapsed from the rotating magnetic head change-over timing;

second memory means for storing variations in the detected test signal levels and variations in the recording current amount;

means for calculating an optimum recording current value for the magnetic tape from the variations of the detected test signal levels and the variation of the recording current amount; and control means for controlling the recording current amount for the magnetic tape based on the optimum recording current value.

33. The recording signal control apparatus of claim 25, further comprising:

third memory means for storing recording current amount data that does not cause problems for recording with any type of magnetic tape, wherein when the type of the magnetic tape used for recording is not stored in said memory means, said control means controls the recording current amount at the time of recording based on the recording current amount data stored in said third memory.

34. The recording signal control apparatus of claim 25, further comprising:

means for displaying the type of the magnetic tape used for recording.

35. In a magnetic recording and reproduction apparatus for recording and reproducing recording signals on a magnetic recording medium, a recording signal control apparatus capable of improving recording conditions for the magnetic recording medium, comprising:

external reading means for reading a barcode carried on packaging of a magnetic tape cassette and identifying a type of magnetic tape as the magnetic recording medium used for recording;

means for transmitting the type of magnetic tape read by said reading means to the magnetic recording and reproduction apparatus;

recording amplifier means capable of varying a value of a recording current for recording of an FM recording signal;

memory means for storing the different types of at least two magnetic tapes and characteristic data concerning an optimum amount of recording current for recording with each of the at least two magnetic tapes; and control means for controlling the recording current amount based on the type of magnetic tape transmitted from said transmitting means and the characteristic data stored in said memory means.

36. In a magnetic recording and reproduction apparatus for recording and reproducing recording signals on a magnetic recording medium, a recording signal control apparatus capable of improving recording conditions for the magnetic recording medium, comprising:

input means for inputting directly into the magnetic recording and reproduction apparatus a numeric value on a barcode carried on the packaging of a magnetic tape cassette which identifies a type of magnetic tape as the magnetic recording medium used for recording;

recording amplifier means capable of varying a value of recording current for recording of an FM recording signal;

memory means for storing the different types of at least two magnetic tapes and characteristic data concerning the optimum amount of recording current for recording with each of the at least two magnetic tapes; and control means for controlling the recording current amount based on the type of magnetic tape input from said input means and the characteristic data stored in said memory means.

* * * * *